(12) United States Patent
Komatsu et al.

(10) Patent No.: US 8,637,601 B2
(45) Date of Patent: Jan. 28, 2014

(54) FLUORINE-CONTAINING POLYMER HAVING HETEROAROMATIC RING

(75) Inventors: Yuzo Komatsu, Settsu (JP); Haruhiko Mohri, Settsu (JP); Hirokazu Aoyama, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/540,927

(22) Filed: Jul. 3, 2012

(65) Prior Publication Data

US 2012/0271005 A1  Oct. 25, 2012

Related U.S. Application Data

(62) Division of application No. 12/278,613, filed as application No. PCT/JP2007/051916 on Feb. 5, 2007, now Pat. No. 8,236,887.

(30) Foreign Application Priority Data

Feb. 7, 2006 (JP) ................................. 2006-030286

(51) Int. Cl.
*C08K 3/04* (2006.01)

(52) U.S. Cl.
USPC ............ 524/516; 524/612; 526/245; 526/246

(58) Field of Classification Search
USPC ........................ 524/516, 612; 526/245, 246
See application file for complete search history.

(56) References Cited

U.S. PATENT DOCUMENTS

| | | | |
|---|---|---|---|
| 3,692,569 A * | 9/1972 | Grot et al. ................. | 428/319.7 |
| 2005/0004253 A1 | 1/2005 | Araki et al. | |
| 2005/0143517 A1* | 6/2005 | Schmidt ........................ | 524/612 |
| 2006/0266981 A1 | 11/2006 | Asaka et al. | |
| 2007/0179263 A1 | 8/2007 | Koh et al. | |

FOREIGN PATENT DOCUMENTS

| | | | |
|---|---|---|---|
| EP | 1975157 A1 | | 10/2008 |
| JP | 2005-29655 | * | 2/2005 |
| JP | 2005-29655 A | | 2/2005 |
| JP | 2005-176428 A | | 6/2005 |
| JP | 2005-527667 | * | 9/2005 |
| JP | 2005-527667 A | | 9/2005 |
| WO | 02/093249 A1 | | 11/2002 |
| WO | 2005/085181 A1 | | 9/2005 |

* cited by examiner

*Primary Examiner* — Peter D. Mulcahy
*Assistant Examiner* — Henry Hu
(74) *Attorney, Agent, or Firm* — Sughrue Mion, PLLC

(57) ABSTRACT

There is provided a fluorine-containing polymer having an ionic group which has a heteroaromatic ring and is useful as a material comprising various heteroaromatic ring compounds having a stable fluorine-containing heteroaromatic ring, and further fluorine-containing polymer having a heteroaromatic ring which is useful as a starting material of the above-mentioned polymer or a curing agent. Also, there is provided a fluorine-containing polymer having a heteroaromatic ring such as imidazole in its side chain, a polymer salt thereof, and a polymer composition comprising such a polymer and a polymer salt and a nano filler.

8 Claims, No Drawings

FLUORINE-CONTAINING POLYMER HAVING HETEROAROMATIC RING

CROSS REFERENCE TO RELATED APPLICATIONS

This is a divisional application of U.S. application Ser. No. 12/278,613, filed Aug. 7, 2008, which is a 371 of PCT/JP2007/051916 filed Feb. 5, 2007, which claims priority from JP 2006-030286 filed Feb. 7, 2006. The above-noted applications are incorporated herein by reference in their entirety.

TECHNICAL FIELD

The present invention relates to a fluorine-containing polymer having heteroaromatic ring, which is useful for a starting material for preparing a fluorine-containing polymer having ionic heteroaromatic ring which can be used as an ionic liquid, for a curing agent such as an epoxy resin or a polyurethane resin and for dispersing metal at a nano level and further relates to a fluorine-containing polymer having ionic heteroaromatic ring.

BACKGROUND ART

Liquid salts of imidazole compounds have ionic conductivity, flame retardance, non-volatility, high polarity and solubility, and by making use of these properties, are expected to be used as electrolytes for fuel cell, secondary battery, capacitor, dye-sensitized solar cell and electrochromic device, or as ionic liquids having various functions useful for reaction media, catalyst, and chemical separation and reprocessing of nuclear fuel.

There are many examples of use of ionic liquids immobilized with a polymer. For example, JP11-306859A discloses a solid polymer electrolyte, a process for preparing the solid polymer electrolyte, and a lithium secondary battery and an electric double layer capacitor using the solid polymer electrolyte. Electric conductivity thereof is as high as $10^{-3}$ S·cm$^{-1}$ which is usable for practical application. This patent publication says that by use of an ionic liquid, a solid polymer electrolyte comprising a fluorine-containing polymer, an imidazolium salt and a lithium salt is stable even in the air containing moisture, and since it does not contain a conventional electrolytic solution, namely an organic solvent, there is no problem with leakage and evaporation of a solution and a solid polymer electrolyte having high reliability and durability can be prepared. In addition, U.S. Pat. No. 5,296,318 discloses that fluorine-containing polymers are useful for electrolyte application.

Further, for example, J. Fuller et al. discloses, in J. Electrochem. Soc. (1997), 144(4), L67 to L70, a gel electrolyte in the form of rubber comprising an ionic liquid comprising a vinylidene fluoride/hexafluoropropylene copolymer and 1-ethyl-3-methylimidazolinium-trifurate or tetrafluoroborate as base components.

Also, J. Fuller et al. have made investigation with respect to a mixture comprising an ionic liquid or other imidazolinium salt and a vinylidene fluoride/hexafluoropropylene copolymer (Molten Salt Forum 5-6 (1998) 605-608). This mixture shows high electric conductivity, thermal stability and dimensional stability for applications to batteries, fuel cells and highly conductive polymer electrolytes.

Further, JP2005-176428A proposes an actuator element operable in the air or in vacuo by using a gel of carbon nanotube and ionic liquid as an active layer having conductivity and expandability and using a layer comprising an ionic liquid and a fluorine-containing polymer such as a vinylidene fluoride/hexafluoropropylene copolymer, polyvinylidene fluoride or perfluorosulfonic acid (NAFION: trademark of Du Pont) as a conductive layer.

From these examples, it is obvious that fluorine-containing polymers are useful as materials for polymer electrolytes. However since ionic liquids are inherently not compatible with fluorine-containing polymers, at present, fluorine-containing polymers used for these applications are limited only to polymers comprising vinylidene fluoride as a monomer unit.

JP2005-530894A discloses an electrolyte for an electro-optical device comprising an ionic liquid, and it is described that the electrolyte can be used for a solid film of electrochromic polymer. Though there is no description as to a polymer to be used, it can be considered that a fluorine-containing polymer having good electrochemical physical properties and optical transparency can be 1.5 used together with an ionic liquid.

In a mixture comprising a nonionic polymer and an ionic liquid, in order to make improvement in solving a problem that ion density is not high, JP2005-527667A discloses a process for preparing a cationic non-fluorine-containing polymer having amidinium group and a composition comprising an ionic liquid. However it is difficult to adopt such a process and composition since preparation of a polymer is carried out by a polymer reaction of a prepolymer and increase in a reaction ratio and refining are difficult. Also it is difficult to apply the mentioned process to preparation of a fluorine-containing polymer having heteroaromatic ring because synthesis of a fluorine-containing prepolymer is difficult.

With respect to fluorine-containing ionic liquids, for example, JP2003-62467A discloses an ionic liquid composition comprising 1-(2,2,2-trifluoroethyl-3-methylimidazolium trifluoromethanesulfonate. V. V. Rudyuk et al., J. Fluorine Chem., 125, pp. 1465-1471 (2004) discloses that after conversion of an imidazole compound into a potassium salt, when the potassium salt is allowed to react with $CF_2=CFCl$ under refluxing in dimethylacetamide, an imidazole compound in which N—K groups of the imidazole compound have been converted to N—CF=CFCl groups and N—CF$_2$CFCl groups can be obtained. Further, it is disclosed in Y. L. Yagupolskii et al., J. Fluorine Chem., 126, pp. 669-672 (2005) and U.S. Pat. No. 2,861,990 that a pyrrole compound or an indole compound is allowed to react with fluoroalkene such as $CF_2=CF_2$, $CF_2=CFCl$ or $CF_2=CFCF_3$ in the presence of metallic potassium or metallic sodium, and a pyrrole compound or an indole compound, in which N—H groups thereof are added to fluoroalkene, can be obtained.

Further, for ionization of an obtained imidazole compound having a fluoroalkyl group, there is employed a method of anion exchange by substitution reaction of the compound with methyl iodide as disclosed in Y. L. Yagupolskii et al., J. Fluorine Chem., 126, pp. 669-672 (2005).

However, these are all compounds having no polymerizable group.

DISCLOSURE OF INVENTION

The present inventors have so far developed a process for preparing a fluorine-containing compound having heteroaromatic ring at high yield, and in the midst of the development, have obtained a novel fluorine-containing compound having heteroaromatic ring having polymerizable group. As a result of further trials for polymerization, the present invention has been completed.

Namely, the present invention relates to a fluorine-containing polymer (1) having a number average molecular weight of from 500 to 1,000,000 and represented by the formula (1):

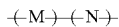 (1)

in which the structural unit M is a structural unit derived from a fluorine-containing ethylenic monomer and represented by the formula (M):

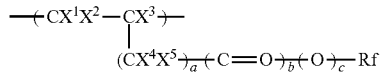 (M)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group, in which —Y (Y is:

where

is a moiety forming a heteroaromatic ring together with a nitrogen atom, and the whole or a part of its hydrogen atoms may be replaced by the same or different organic groups) is bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit N is a structural unit derived from a monomer copolymerizable with the fluorine-containing ethylenic monomer providing the structural unit M, and
the structural unit M and the structural unit N are contained in amounts of from 0.1 to 100% by mole and from 0 to 99.9% by mole, respectively.

The present invention also relates to a fluorine-containing polymer having an ionic group which has a number average molecular weight of from 500 to 1,000,000 and is represented by the formula (2):

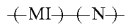 (2)

in which the structural unit MI is a structural unit derived from a fluorine-containing ethylenic monomer and represented by the formula (MI):

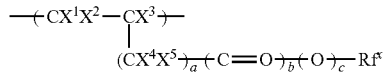 (MI)

wherein $X^1$ and $X^2$ are the same or different and each is H or F; $X^3$ is H, F, $CH_3$ or $CF_3$; $X^4$ and $X^5$ are the same or different and each is H, F or $CF_3$; $Rf^x$ is an organic group, in which —$Y^a$ ($Y^a$ is:

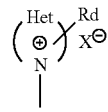

where

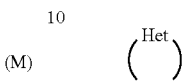

is a moiety forming a heteroaromatic ring together with a nitrogen atom, and the whole or a part of its hydrogen atoms may be replaced by the same or different organic groups; Rd is H or a monovalent organic group; X is a counter anion) is bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1,
the structural unit N is a structural unit derived from a monomer copolymerizable with the fluorine-containing ethylenic monomer providing the structural unit MI, and
the structural unit MI and the structural unit N are contained in amounts of from 0.1 to 100% by mole and from 0 to 99.9% by mole, respectively.

It is preferable that —$Y^a$ is:

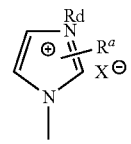

wherein $R^a$s are the same or different, and each is halogen atom, a functional group or an organic group and may be present or may not be present, and when $R^a$s are present, the whole or a part of hydrogen atoms of the heteroaromatic ring are substituted by them; Rd is H or a monovalent organic group; X is a counter anion, since it is easy to adjust dispersibility of metal particles and carbon material, compatibility of the ionic compound, dispersibility of carbon material, adhesion to other material, electrical properties, mechanical properties and thermal properties.

It is preferable that —$Y^a$ is bonded to a trunk chain and/or an end of a side chain of $Rf^x$, from the viewpoint that characteristics of the heteroaromatic ring are easily exhibited.

It is preferable that the structural unit MI is a structural unit MI1 derived from a fluorine-containing ethylenic monomer and represented by the formula (MI1):

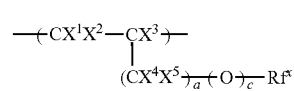 (MI1)

wherein $X^1$, $X^2$, $X^3$, $X^4$, $X^5$, $Rf^x$, a and c are as defined in the formula (MI).

More specifically, there are, for example, a structural unit MI2 derived from a fluorine-containing ethylenic monomer and represented by the formula (MI2):

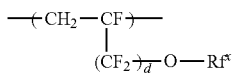

wherein $Rf^x$ is as defined in the formula (MI); d is an integer of 1 to 20, a structural unit MI3 derived from a fluorine-containing ethylenic monomer and represented by the formula (MI3):

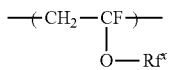
(MI3)

wherein $Rf^B$ is as defined in the formula (MI),
a structural unit MI4 derived from a fluorine-containing ethylenic monomer and represented by the formula (MI4):

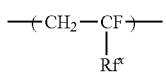
(MI4)

wherein $Rf^x$ is as defined in the formula (MI), and
a structural unit MI5 derived from a fluorine-containing ethylenic monomer and represented by the formula (MI5):

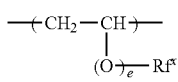
(MI5)

wherein $Rf^x$ is as defined in the formula (MI); e is 0 or 1.

The present invention also relates to a polymer composition comprising (I) the fluorine-containing polymer (1) having heteroaromatic ring of the present invention and/or the fluorine-containing polymer (2) having ionic group of the present invention and (II) a nano filler.

BEST MODE FOR CARRYING OUT THE INVENTION

The fluorine-containing polymer (1) of the present invention is the fluorine-containing polymer having a number average molecular weight of from 500 to 1,000,000 and represented by the formula (1):

(1)

in which the structural unit M is a structural unit derived from a fluorine-containing ethylenic monomer and represented by the formula (M):

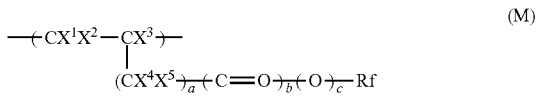
(M)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group, in which —Y (Y is:

where

is a moiety forming a heteroaromatic ring together with a nitrogen atom, and the whole or a part of its hydrogen atoms may be replaced by the same or different organic groups) is bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1,
the structural unit N is a structural unit derived from a monomer copolymerizable with the fluorine-containing ethylenic monomer providing the structural unit M, and
the structural unit M and the structural unit N are contained in amounts of from 0.1 to 100% by mole and from 0 to 99.9% by mole, respectively.

Preferable examples of —Y which is one of the features of the fluorine-containing polymer (1) of the present invention are groups having an imidazole skeleton, a pyrrole skeleton, a pyrazole skeleton, a 1,2,3-triazole skeleton, a 1,2,4-triazole skeleton, an indole skeleton, a benzimidazole skeleton, a benzotriazole skeleton, a purine skeleton, a purine derivative skeleton or a carbazole skeleton from the viewpoint of easy synthesis and availability.

For example, there are exemplified the following groups of the formulas (Y1-1) to (Y1-7).

A group having an imidazole skeleton represented by the formula (Y1-1):

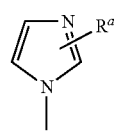

wherein $R^a$s are the same or different, and each is halogen atom, a functional group or an organic group and may be present or may not be present, and when $R^a$s are present, the whole or a part of hydrogen atoms of the heteroaromatic ring are substituted by them, a group having a pyrrole skeleton represented by the formula (Y1-2):

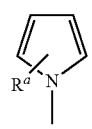

wherein $R^a$s are the same or different, and each is halogen atom, a functional group or an organic group and may be present or may not be present, and when $R^a$s are present, the whole or a part of hydrogen atoms of the heteroaromatic ring are substituted by them,
a group having a pyrazole skeleton represented by the formula (Y1-3):

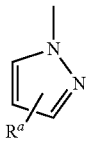

wherein $R^a$s are the same or different, and each is halogen atom, a functional group or an organic group and may be present or may not be present, and when $R^a$s are present, the whole or a part of hydrogen atoms of the heteroaromatic ring are substituted by them, a group having a triazole skeleton represented by the formula (Y1-4):

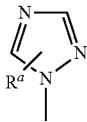

wherein $R^a$s are the same or different, and each is halogen atom, a functional group or an organic group and may be present or may not be present, and when $R^a$s are present, the whole or a part of hydrogen atoms of the heteroaromatic ring are substituted by them, a group having an indole skeleton represented by the formula (Y1-5):

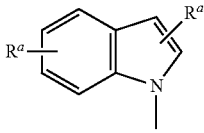

wherein $R^a$s are the same or different, and each is halogen atom, a functional group or an organic group and may be present or may not be present, and when $R^a$s are present, the whole or a part of hydrogen atoms of the heteroaromatic ring and/or the aromatic ring are substituted by them, a group having a purine skeleton represented by the formula (Y1-6):

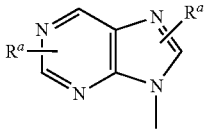

wherein $R^a$s are the same or different, and each is halogen atom, a functional group or an organic group and may be present or may not be present, and when $R^a$s are present, the whole or a part of hydrogen atoms of the heteroaromatic ring and/or the aromatic ring are substituted by them, and a group having a purine derivative skeleton represented by the formula (Y1-7):

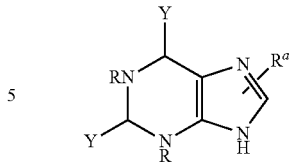

wherein $R^a$ is halogen atom, a functional group or an organic group and may be present or may not be present, and when $R^a$ is present, the whole or a part of hydrogen atoms of the heteroaromatic ring are substituted by $R^a$; R and R' are the same or different and each is hydrogen atom, an alkyl group, an arylalkyl group, an organosilicon group, an alkoxy group or a carboxyester group; Ys are the same or different and each is =O, —NRR', —OR, F or $F_2$, and in addition, groups explained infra are exemplified.

Examples of $R^a$ are, for instance, groups raised below.

(1) Halogen Atoms:

There are preferably fluorine atom and chlorine atom, especially fluorine atom.

(2) Functional Groups:

Examples are carboxyl group (—COOH), carboxylic acid ester group (—COOR), nitrile group (—CN), amino group (—$NH_2$), alkylamino group (—$NR_2$, —NHR), carboxamide group (—$CONR_2$, —CONHR), alkyl ether group (—OR), silyl ether group (—$OSiR_3$), thiol group (—SH), thioether group (—SR) and nitro group, preferably carboxylic acid ester group, nitrile group, amino group, alkylamino group, carboxamide group, alkyl ether group, silyl ether group, thiol group and thioether group. In addition, carboxyl group (—COOH), carboxylic acid ester group (—COOR), nitrile group (—CN), amino group (—$NH_2$), alkylamino group (—$NR_2$, —NHR), carboxamide group (—$CONR_2$, —CONHR), alkyl ether group (—OR), silyl ether group (—$OSiR_3$), thiol group (—SH), thioether group (—SR) and nitro group are allowable as a substituent to be bonded to the benzene ring (Rs are the same or different, and are preferably monovalent hydrocarbon groups).

(3) Organic Groups:

(3-1) Linear or branched alkyl groups in which a part of or the whole of hydrogen atoms may be substituted by halogen atoms, preferably fluorine atoms. The number of carbon atoms is preferably 1 to 1,000.

(3-2) Alkyl groups substituted by functional group such as carboxyl group, hydroxyl group, nitrile group, amino group, alkylamino group, carboxylic acid ester group, carboxamide group, alkyl ether group, silyl ether group, thiol group, thioether group or nitro group. The number of carbon atoms is preferably 1 to 20.

(3-3) Aryl groups which may be substituted.

(3-4) Alkyl groups having ether bond in which a part of or the whole of hydrogen atoms may be substituted by halogen atoms, preferably fluorine atoms. The number of carbon atoms is preferably 1 to 1,000.

(3-5) Alkoxy groups in which a part of or the whole of hydrogen atoms may be substituted by halogen atoms, preferably fluorine atoms. The number of carbon atoms is preferably 1 to 1,000.

In the following Tables 1 to 13, definitions of substituents are effective only in the corresponding tables. Figures showing the number of atoms are not represented especially by small letters. Further Ph is an abbreviation of phenyl.

Among them, from the viewpoint of usefulness as a starting material for an ionic material, an imidazole group represented by the formula (Y1-1):

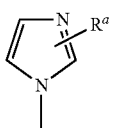

is preferable.

Examples of the groups having an imidazole skeleton of the formula (Y1-1) are, for instance, groups having $R^{a1}$ and shown in Table 1.

TABLE 1

Imidazole

| Compound No. | $R^{a1}$ | | |
|---|---|---|---|
| A1-1-1 | H | H | H |
| 2 | F | H | H |
| 3 | F | F | H |
| 4 | F | F | F |
| 5 | CF3 | H | H |
| 6 | CF3 | F | H |
| 7 | C2F5 | H | H |
| 8 | CHF2CF2 | H | H |
| 9 | CF3CHFCF2 | H | H |
| 10 | CH3 | H | H |
| 11 | CH3 | F | H |
| 12 | CH3 | CH3 | H |
| 13 | Ph | H | H |
| 14 | CH2OR | H | H |
| 15 | COOR | H | H |
| 16 | CH2COOH | H | H |

Examples of the groups having a pyrrole skeleton of the formula (Y1-2) are, for instance, groups having $R^{a2}$ and shown in Table 2.

TABLE 2

Pyrrole

| Comound No. | $R^{a2}$ | | | |
|---|---|---|---|---|
| A1-2-1 | H | H | H | H |
| 2 | F | H | H | H |
| 3 | F | F | H | H |
| 4 | F | F | F | H |
| 5 | F | F | F | F |
| 6 | CF3 | H | H | H |
| 7 | CF3 | F | H | H |
| 8 | CF3 | F | F | H |
| 9 | C2F5 | H | H | H |
| 10 | CH3 | H | H | H |
| 11 | CH3 | F | H | H |
| 12 | CH3 | CH3 | H | H |
| 13 | Ph | H | H | H |
| 14 | Ph | F | H | H |
| 15 | CH2OR | H | H | H |
| 16 | COOR | H | H | H |
| 17 | Cl | H | H | H |

Examples of the groups having a pyrazole skeleton of the formula (Y1-3) are, for instance, compounds having $R^{a3}$ and shown in Table 3.

TABLE 3

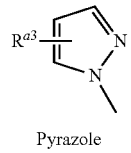

Pyrazole

| Compound No. | $R^{a3}$ | | |
|---|---|---|---|
| A1-3-1 | H | H | H |
| 2 | F | H | H |
| 3 | F | F | H |
| 4 | F | F | F |
| 5 | CF3 | H | H |
| 6 | CF3 | F | H |
| 7 | C2F5 | H | H |
| 8 | CHF2CF2 | H | H |
| 9 | CF3CHFCF2 | H | H |
| 10 | CH3 | H | H |
| 11 | CH3 | F | H |
| 12 | CH3 | CH3 | H |
| 13 | Ph | H | H |
| 14 | Ph | F | H |
| 15 | CH2OR | H | H |
| 16 | COOR | H | H |

Examples of the groups having a triazole skeleton of the formula (Y1-4) are, for instance, groups having a 1,2,4-triazole skeleton having $R^{a4}$ and shown in Table 4.

TABLE 4

Triazole

| Compound No. | $R^{a4}$ | |
|---|---|---|
| A1-4-1 | H | H |
| 2 | F | H |
| 3 | F | F |
| 4 | CF3 | H |
| 5 | CF3 | F |
| 6 | C2F5 | H |
| 7 | CHF2CF2 | H |
| 8 | CF3CHFCF2 | H |
| 9 | CH3 | H |
| 10 | CH3 | CH3 |
| 11 | Ph | H |
| 12 | Ph | F |
| 13 | CH2OR | H |
| 14 | COOR | H |
| 15 | Cl | H |

Examples of the groups having an indole skeleton of the formula (Y1-5) are, for instance, groups having $R^{a5}$ and $R^{a6}$ and shown in Table 5.

TABLE 5

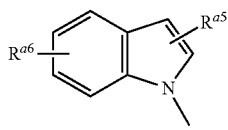

Indole

| Compound No. | $R^{a6}$ | | | | $R^{a5}$ | |
|---|---|---|---|---|---|---|
| A1-5-1 | H | H | H | H | H | H |
| 2 | F | H | H | H | H | H |
| 3 | F | F | H | H | H | H |
| 4 | H | H | H | H | F | H |
| 5 | F | H | H | H | F | H |
| 6 | H | H | H | H | CH3 | H |
| 7 | COOR | H | H | H | H | H |
| 8 | COOR | F | H | H | H | H |
| 9 | H | H | H | H | COOR | H |
| 10 | F | H | H | H | COOR | H |

Examples of the groups having a purine skeleton of the formula (Y1-6) are, for instance, groups having $R^{a7}$ and $R^{a8}$ and shown in Table 6.

TABLE 6

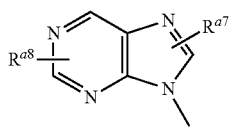

Purine

| Compound No. | $R^{a8}$ | $R^{a7}$ | |
|---|---|---|---|
| A1-6-1 | H | H | H |
| 2 | F | H | H |
| 3 | F | F | H |
| 4 | H | H | F |
| 5 | F | H | F |
| 6 | H | H | CF3 |
| 7 | H | H | CH3 |
| 8 | COOR | H | H |
| 9 | CH3 | H | H |
| 10 | Ph | H | H |
| 11 | CH3 | H | H |
| 12 | OR | H | H |

Examples of the groups having a purine derivative skeleton of the formula (Y1-7) are, for instance, groups having $R^{a9}$ and shown in Table 7.

TABLE 7

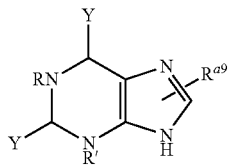

Purine Derivative
R or R' = H, CH3, Si(CH3)3,
Si(CH3)2tBu, Si(iPr)3, SiEt3,
CH2Ph, C(Ph)3, CH3CO,
COOMe, COOtBu

| Compound No. | Y | | $R^{a9}$ |
|---|---|---|---|
| A1-7-1 | =O | =O | H |
| 2 | =O | =O | CH3 |

TABLE 7-continued

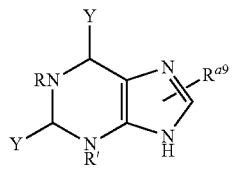

Purine Derivative
R or R' = H, CH3, Si(CH3)3,
Si(CH3)2tBu, Si(iPr)3, SiEt3,
CH2Ph, C(Ph)3, CH3CO,
COOMe, COOtBu

| Compound No. | Y | | $R^{a9}$ |
|---|---|---|---|
| 3 | =O | =O | Ph |
| 4 | =O | =O | OR |
| 5 | =O | =O | F |
| 6 | =O | OR | H |
| 7 | =O | F | H |
| 8 | =O | F2 | H |
| 9 | =O | F2 | Ph |
| 10 | =O | F2 | OR |
| 11 | =O | F2 | F |

Examples of other groups are, for instance, groups having a benzimidazole skeleton shown in Table 8, groups having a 1,2,3-triazole skeleton shown in Table 9, groups having a tetrazole skeleton shown in Table 10, groups having an isoindole skeleton shown in Table 11, groups having an indazole skeleton shown in Table 12, groups having a benzotriazole skeleton shown in Table 13 and groups having a carbazole skeleton shown in Table 14.

TABLE 8

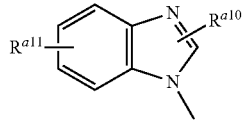

Benzimidazole

| Compound No. | $R^{a11}$ | | | | $R^{a10}$ |
|---|---|---|---|---|---|
| A1-8-1 | H | H | H | H | H |
| 2 | F | H | H | H | H |
| 3 | F | F | H | H | H |
| 4 | H | H | H | H | F |
| 5 | F | H | H | H | F |
| 6 | H | H | H | H | CF3 |
| 7 | F | H | H | H | CF3 |
| 8 | H | H | H | H | CH3 |
| 9 | COOR | H | H | H | H |
| 10 | Ph | H | H | H | H |
| 11 | H | H | H | H | COOR |
| 12 | F | H | H | H | COOR |
| 13 | F | F | H | H | COOR |

TABLE 9

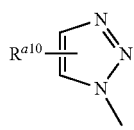

Triazole

| Compound No. | $R^{a10}$ | |
|---|---|---|
| A1-9-1 | H | H |
| 2 | F | H |
| 3 | F | F |
| 4 | CF3 | H |
| 5 | CF3 | F |
| 6 | C2F5 | H |
| 7 | CHF2CF2 | H |
| 8 | CF3CHFCF2 | H |
| 9 | CH3 | H |
| 10 | CH3 | CH3 |
| 11 | Ph | H |
| 12 | CH2OR | H |
| 13 | COOR | H |
| 14 | COOR | F |

TABLE 10

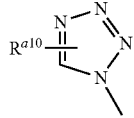

Tetrazole

| Compound No. | $R^{a10}$ |
|---|---|
| A1-10-1 | H |
| 2 | F |
| 3 | CF3 |
| 4 | C2F5 |
| 5 | CHF2CF2 |
| 6 | CF3CHFCF2 |
| 7 | CH3 |
| 8 | Ph |
| 9 | CH2OR |
| 10 | COOR |

TABLE 11

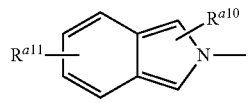

Isoindole

| Compound No. | $R^{a11}$ | | | | $R^{a10}$ | |
|---|---|---|---|---|---|---|
| A1-11-1 | H | H | H | H | H | H |
| 2 | F | H | H | H | H | H |
| 3 | F | F | H | H | H | H |
| 4 | H | H | H | H | F | H |
| 5 | H | H | H | H | F | F |
| 6 | H | H | H | H | CH3 | H |
| 7 | COOR | H | H | H | H | H |
| 8 | COOR | H | H | H | F | F |
| 9 | H | H | H | H | COOR | H |

TABLE 12

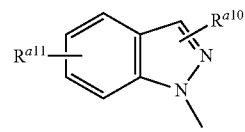

Indazole

| Compound No. | $R^{a11}$ | | | | $R^{a10}$ |
|---|---|---|---|---|---|
| A1-12-1 | H | H | H | H | H |
| 2 | F | H | H | H | H |
| 3 | F | F | H | H | H |
| 4 | H | H | H | H | F |
| 5 | F | H | H | H | F |
| 6 | H | H | H | H | CF3 |
| 7 | F | H | H | H | CF3 |
| 8 | H | H | H | H | CH3 |
| 9 | CF3 | H | H | H | H |
| 10 | COOR | H | H | H | H |
| 11 | Ph | H | H | H | H |
| 12 | H | H | H | H | COOR |

TABLE 13

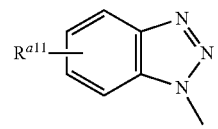

Benzotriazole

| Compound No. | $R^{a11}$ | | | |
|---|---|---|---|---|
| A1-13-1 | H | H | H | H |
| 2 | F | H | H | H |
| 3 | F | F | H | H |
| 4 | F | F | F | H |
| 5 | F | F | F | F |
| 6 | COOR | H | H | H |
| 7 | CH3 | H | H | H |
| 8 | Ph | H | H | H |
| 9 | OR | H | H | H |

TABLE 14

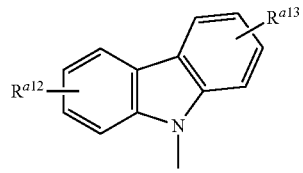

Carbazole

| Compound No. | $R^{a12}$ | | | | $R^{a13}$ | | |
|---|---|---|---|---|---|---|---|
| A1-14-1 | H | H | H | H | H | H | H |
| 2 | F | H | H | H | H | H | H |
| 3 | F | H | H | F | H | H | H |
| 4 | F | F | H | F | F | H | H |
| 5 | F | H | H | H | H | H | H |
| 6 | F | F | F | F | F | F | F |
| 7 | F | F | F | H | H | H | H |
| 8 | CF3 | H | H | H | H | H | H |
| 9 | CF3 | H | H | CF3 | H | H | H |
| 10 | COOR | H | H | H | H | H | H |
| 11 | COOR | H | H | COOR | H | H | H |
| 12 | Ph | H | H | H | H | H | H |
| 13 | Ph | H | H | Ph | H | H | H |

It is preferable that —Y is bonded to a trunk chain and/or an end of a side chain of Rf, from the viewpoint that characteristics of the heteroaromatic ring are easily exhibited. The number of Ys is at least one, and is not limited particularly, and is preferably from 1 to 3 since a skeleton having more Ys costs high.

The portion of Rf other than Y is a divalent or more group defined by deleting Y from a fluorine-containing alkyl group having 1 to 40 carbon atoms or a divalent or more group defined by deleting Y from a fluorine-containing alkyl group having 2 to 100 carbon atoms and ether bond.

Among them, preferable are those having:
a group of the formula (b-1):

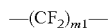

wherein m1 is an integer of 1 to 10,000,
a group of the formula (b-2):

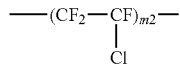

wherein m2 is an integer of 1 to 10,000, a group of the formula (b-3):

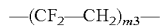

wherein m3 is an integer of 1 to 10,000,
a group of the formula (b-4):

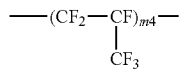

wherein m4 is an integer of 1 to 3,000, and/or
a group of the formula (b-5):

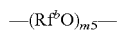

wherein $Rf^b$ is a linear or branched alkylene group having fluorine atom; m5 is an integer of 1 to 100. Especially preferable is one having the perfluoroalkylene group having a branched chain of the formula (b-4) and/or the fluoroether unit of the formula (b-5) since a liquid state is easily showed at room temperature.

The fluorine-containing polymer (1) of the present invention can be prepared by the following processes.
(Preparation Process 1)
A method of singly polymerizing a monomer (m) providing the above-mentioned structural unit M or copolymerizing the monomer (m) with a monomer (n) providing the structural unit N and being copolymerizable with the monomer (m) (polymerization method).
(Preparation Process 2)
A method of subjecting a compound having a heteroaromatic ring and a polymer or a copolymer having a functional group-containing structural unit being convertible to the structural unit M by a reaction with the compound having a heteroaromatic ring to high molecular reaction (high molecular reaction method).

In the preparation process 1, firstly, the structural unit M, the monomer (m) providing it, and the monomer (n) providing the structural unit N and being copolymerizable with the monomer (m) are explained below.

The structural unit M is a structural unit derived from a fluorine-containing ethylenic monomer and represented by the formula (M):

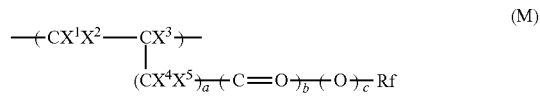

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group, in which —Y (Y is:

where

is a moiety forming a heteroaromatic ring together with a nitrogen atom, and the whole or a part of its hydrogen atoms may be replaced by the same or different organic groups) is bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1.

The monomer (m) providing the structural unit M is a fluorine-containing ethylenic monomer represented by the formula (m):

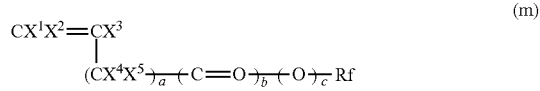

wherein $X^1$, $X^2$, $X^3$, $X^4$, $X^5$, Rf, a, b and c are as defined in the formula (M).

The structural unit M is preferably a structural unit M1 represented by the formula (M1):

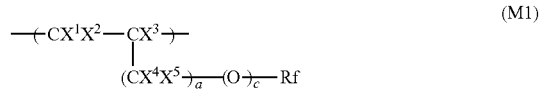

wherein $X^1$, $X^2$, $X^3$, $X^4$, $X^5$, Rf, a and c are as defined in the formula (M).

A monomer (m1) providing this structural unit M1 is a fluorine-containing ethylenic monomer represented by the formula (m1):

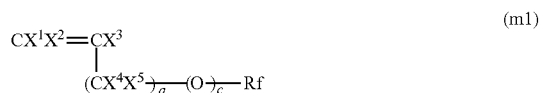

wherein $X^1$, $X^2$, $X^3$, $X^4$, $X^5$, Rf, a and c are as defined in the formula (M1).

Preferable examples of the structural unit M1 and the monomer (m1) are as follows. In the structural formulas of the following examples, Ys are the above-mentioned groups having a heteroaromatic ring structure unless otherwise specified.

A structural unit M2 represented by the formula (M2):

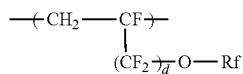

wherein Rf is as defined in the formula (M); d is an integer of 1 to 20, and a fluorine-containing ethylenic monomer (m2) providing the structural unit M2 and represented by the formula (m2):

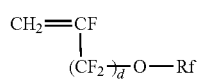

wherein Rf and d are as defined in the formula (M2).

Examples thereof are:
$CH_2$=$CFCF_2O[CF(CF_3)CF_2O]_nCHFCF_2$—Y (n is 0 or an integer of 1 to 20),
$CH_2$=$CFCF_2O(CF_2CF_2O)_nCHFCF_2$—Y (n is 0 or an integer of 1 to 20),
$CH_2$=$CFCF_2O(CH_2CF_2CF_2O)_nCHZCF_2$—Y (Z is H or F; n is 0 or an integer of 1 to 20),
and the like, and more specifically there are:
$CH_2$=$CFCF_2OCHFCF_2$—Y,
$CH_2$=$CFCF_2OCF(CF_3)CF_2OCHFCF_2$—Y,
$CH_2$=$CFCF_2OCF(CF_3)CF_2OCF(CF_3)CF_2OCHFCF_2$—Y,
$CH_2$=$CFCF_2O[CF(CF_3)CF_2O]_nCHFCF_2$—Y (n is an integer of 3 to 8),
$CH_2$=$CFCF_2O(CF_2CF_2O)_nCHFCF_2$—Y (n is 0 or an integer of 1 to 8),
$CH_2$=$CFCF_2O(CH_2CF_2CF_2O)_nCH_2CF_2$—Y (n is 0 or an integer of 1 to 8),
$CH_2$=$CFCF_2O(CH_2CF_2CF_2O)_nCHFCF_2$—Y (n is 0 or an integer of 1 to 8),
and the like.

A structural unit represented by the formula (M3):

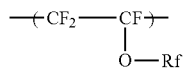

wherein Rf is as defined in the formula (M), and a fluorine-containing ethylenic monomer (m3) providing the structural unit M3 and represented by the formula (m3):

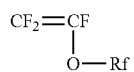

wherein Rf is as defined in the formula (M3).

Examples thereof are:
$CF_2$=$CFO[CF_2CF(CF_3)O]_n(CF_2)_mCHFCF_2$—Y (n is 0 or an integer of 1 to 20; m is 0 or an integer of 1 to 20),
$CF_2$=$CFO(CF_2CF_2O)_n(CF_2)_mCHFCF_2$—Y (n is 0 or an integer of 1 to 20; m is 0 or an integer of 1 to 20),
$CF_2$=$CFO(CH_2)_lCF(CF_3)[OCF_2CF(CF_3)]_n(CF_2)_mCHFCF_2$—Y (n is 0 or an integer of 1 to 10; m is 0 or an integer of 1 to 10; l is 0 or an integer of 1 to 6),
$CF_2$=$CFO(CH_2)_l(CF_2)_m(Rf^B)_nCHZCF_2$—Y (Z is H or F; $Rf^B$ is $CF_2$, $CF_2CFCl$, $CF_2CF(CF_3)$ or $CF_2CH_2$; m is 0 or an integer of 1 to 10; n is 0 or an integer of 1 to 10; l is 0 or an integer of 1 to 4),
$CF_2$=$CFO(CH_2)_l(Rf^B)_n(CF_2)_mCHZCF_2$—Y (Z is H or F; $Rf^B$ is $CF_2$, $CF_2CFCl$, $CF_2CF(CF_3)$ or $CF_2CH_2$; m is 0 or an integer of 1 to 10; n is 0 or an integer of 1 to 10; l is 0 or an integer of 1 to 4),
and the like, and more specifically there are:
$CF_2$=$CFOCHFCF_2$—Y, $CF_2$=$CFOCF_2CHFCF_2$—Y,
$CF_2$=$CFOCF_2CF_2CHFCF_2$—Y,
$CF_2$=$CFOCF_2CF_2CF_2CF_2CHFCF_2$—Y,
$CF_2$=$CFOCF_2CF_2CF_2CF_2CF_2CF_2CHFCF_2$—Y,
$CF_2$=$CFOCF_2CF(CF_3)OCHFCF_2$—Y,
$CF_2$=$CFOCF_2CF(CF_3)OCF_2CHFCF_2$—Y,
$CF_2$=$CFOCF_2CF(CF_3)OCF_2CF_2CHFCF_2$—Y,
$CF_2$=$CFOCF_2CF(CF_3)OCF_2CF_2CF_2CF_2CHFCF_2$—Y,
$CF_2$=$CFO[CF_2CF(CF_3)O]_nCHFCF_2$—Y (n is an integer of 1 to 8),
$CF_2$=$CFO[CF_2CF(CF_3)O]_nCF_2CHFCF_2$—Y (n is an integer of 1 to 8),
$CF_2$=$CFO[CF_2CF(CF_3)O]_nCF_2CF_2CHFCF_2$—Y (n is an integer of 1 to 8),
$CF_2$=$CFO[CF_2CF(CF_3)O]_nCF_2CF_2CF_2CF_2CHFCF_2$—Y (n is an integer of 1 to 8),
$CF_2$=$CFOCF_2CF_2OCHFCF_2$—Y,
$CF_2$=$CFOCF_2CF_2OCF_2CHFCF_2$—Y,
$CF_2$=$CFOCF_2CF_2OCF_2CF_2CHFCF_2$—Y,
$CF_2$=$CFOCF_2CF_2OCF_2CF_2CF_2CF_2CHFCF_2$—Y,
$CF_2$=$CFO(CF_2CF_2O)_nCHFCF_2$—Y (n is an integer of 1 to 8),
$CF_2$=$CFO(CF_2CF_2O)_nCF_2CHFCF_2$—Y (n is an integer of 1 to 8),
$CF_2$=$CFO(CF_2CF_2O)_nCF_2CF_2CHFCF_2$—Y (n is an integer of 1 to 8),
$CF_2$=$CFO(CF_2CF_2O)_nCF_2CF_2CF_2CF_2CHFCF_2$—Y (n is an integer of 1 to 8),
$CF_2$=$CFO(CH_2)_nCHFCF_2$—Y (n is an integer of 1 to 4),
$CF_2$=$CFO(CH_2)_nCF_2CHFCF_2$—Y (n is an integer of 1 to 4),
$CF_2$=$CFO(CH_2)_nCF_2CF_2CHFCF_2$—Y (n is an integer of 1 to 4),
$CF_2$=$CFO(CH_2)_nCF_2CF_2CF_2CHFCF_2$—Y (n is an integer of 1 to 4),
$CF_2$=$CFOCH_2CH_2CF_2CH_2(CF_2)_nCHFCF_2$—Y (n is 0 or an integer of 1 to 20),
$CF_2$=$CFOCF_2CF_2(CFClCF_2)_m(CF_2)_lCHFCF_2$—Y (m is an integer of 1 to 3; l is 0 or an integer of 1 to 4),
$CF_2$=$CFO(CH_2)_n(CFClCF_2)_m(CF_2)_lCHFCF_2$—Y (n is 0 or an integer of 1 to 4; m is an integer of 1 or 2; l is 0 or an integer of 1 to 4),
$CF_2$=$CFOCF(CF_3)(CF_2)_lCHFCF_2$—Y (l is 0 or an integer of 1 to 10),
$CF_2$=$CFO(CH_2)_n(CF_2CH_2)_m(CF_2)_lCHFCF_2$—Y (n is 0 or an integer of 1 to 4; m is 0 or an integer of 1 to 4; l is 0 or an integer of 1 to 4),
$CF_2$=$CFO(CH_2)_n(CF_2)_l(CH_2CF_2)_mCH_2CF_2$—Y (n is 0 or an integer of 1 to 4; m is 0 or an integer of 1 to 4; l is 0 or an integer of 1 to 4),
and the like.

A structural unit represented by the formula (M4):

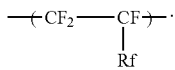
(M4)

wherein Rf is as defined in the formula (M), and a fluorine-containing ethylenic monomer (m4) represented by the formula (m4):

(m4)

wherein Rf is as defined in the formula (M4).

Examples thereof are:
$CF_2=CF(CF_2)_m(CH_2)_lO[CF(CF_3)CF_2O]_nCHFCF_2$—Y (n is 0 or an integer of 1 to 10; m is 0 or an integer of 1 to 20; l is 0 or an integer of 1 to 6),
$CF_2=CF(CF_2)_m(CH_2)_lO(CF_2CF_2O)_nCHFCF_2$—Y (n is 0 or an integer of 1 to 10; m is 0 or an integer of 1 to 20; l is 0 or an integer of 1 to 6),
$CF_2=CF(CF_2CH_2)_l(CF_2)_n(CH_2CF_2)_mCHZCF_2$—Y (Z is H or F; l is 0 or an integer of 1 to 6; n is 0 or an integer of 1 to 10; m is 0 or an integer of 1 to 6),
$CF_2=CF(CF_2)_l(CH_2CF_2)_n(CF_2)_mCHZCF_2$—Y (Z is H or F; l is 0 or an integer of 1 to 10; n is 0 or an integer of 1 to 10; m is 0 or an integer of 1 to 10),
$CF_2=CF(CF_2)_l(CF_2CH_2)_n(CF_2)_mCHZCF_2$—Y (Z is H or F; l is 0 or an integer of 1 to 10; n is 0 or an integer of 1 to 10; m is 0 or an integer of 1 to 10),
$CF_2=CF(CF_2)_l(Rf^B)_n(CF_2)_mCHZCF_2$—Y (Z is H or F; $Rf^B$ is $CF_2CFCl$ or $CF_2CF(CF_3)$; l is 0 or an integer of 1 to 8; m is 0 or an integer of 1 to 8; n is an integer of 1 to 5),
and the like, and more specifically, there are:
$CF_2=CFCHFCF_2$—Y, $CF_2=CFCF_2CHFCF_2$—Y,
$CF_2=CFCF_2CF_2CHFCF_2$—Y,
$CF_2=CFCF_2CF_2CF_2CF_2CHFCF_2$—Y,
$CF_2=CF(CF_2)_nCF(CF_3)CHFCF_2$—Y (n is 0 or an integer of 1 to 8),
$CF_2=CF(CF_2)_nCF(CF_3)CH_2CF_2$—Y (n is 0 or an integer of 1 to 8),
$CF_2=CFCF_2CH_2CHFCF_2$—Y,
$CF_2=CFCF_2CH_2CF_2CF_2CHFCF_2$—Y,
$CF_2=CFCH_2CF_2$—Y, $CF_2=CFCF_2CH_2CF_2$—Y,
$CF_2=CFCF_2CF_2CH_2CF_2$—Y,
$CF_2=CFCH_2CF_2CH_2CF_2$—Y,
$CF_2=CF(CF_2)_n(CH_2CF_2)_mCHFCF_2$—Y (n is 0 or an integer of 1 to 10; m is an integer of 1 to 5),
$CF_2=CFCF_2OCHFCF_2$—Y,
$CF_2=CFCF_2CF_2OCHFCF_2$—Y,
$CF_2=CFCF_2CF_2CF_2OCHFCF_2$—Y,
$CF_2=CFCF_2OCF(CF_3)CF_2OCHFCF_2$—Y,
$CF_2=CFCF_2OCF(CF_3)CF_2OCF(CF_3)CF_2OCHFCF_2$—Y,
$CF_2=CFCF_2O[CF(CF_3)CF_2O]_nCHFCF_2$—Y (n is an integer of 3 to 8),
$CF_2=CFCF_2CF_2OCF(CF_3)CF_2OCHFCF_2$—Y,
$CF_2=CFCF_2OCF(CF_3)CF_2OCF(CF_3)CF_2OCF(CF_3)CF_2OCHFCF_2$—Y,
$CF_2=CFCF_2CF_2O[CF(CF_3)CF_2O]_nCHFCF_2$—Y (n is an integer of 3 to 8),
$CF_2=CFCH_2O(CF_2CF_2O)_nCHFCF_2$—Y (n is an integer of 1 to 8),
$CF_2=CFCF_2CF_2O(CF_2CF_2O)_nCHFCF_2$—Y (n is an integer of 1 to 8),
$CF_2=CFCH_2OCHFCF_2$—Y,
$CF_2=CFCF_2CH_2OCHFCF_2$—Y,
$CF_2=CFCF_2CF_2CF_2CH_2OCHFCF_2$—Y,
and the like.

A structural unit M5 represented by the formula (M5):

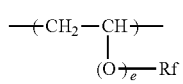
(M5)

wherein Rf is as defined in the formula (M); e is 0 or 1, and a fluorine-containing ethylenic monomer (m5) represented by the formula (m5):

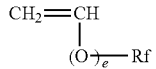
(m5)

wherein Rf and e are as defined in the formula (M5).

Examples thereof are:
$CH_2=CH(CF_2)_nCHZCF_2$—Y (Z is H or F; n is 0 or an integer of 1 to 20),
$CH_2=CH(CF_2)_n(CH_2CF_2)_mCH_2CF_2$—Y (n is 0 or an integer of 1 to 20; m is an integer of 1 to 10),
$CH_2=CH(CF_2CH_2)_m(CF_2)_nCHFCF_2$—Y (n is 0 or an integer of 1 to 20; m is an integer of 1 to 10),
$CH_2=CH(CF_2CH_2)_l(CF_2)_n(CH_2CF_2)_mCH_2CF_2$—Y (n is 0 or an integer of 1 to 20; m is 0 or an integer of 1 to 10; l is 0 or an integer of 1 to 10),
$CH_2=CH(CF_2)_l(Rf^B)_n(CF_2)_mCHZCF_2$—Y (Z is H or F; $Rf^B$ is $CH_2$, $CF_2CFCl$ or $CF_2CF(CF_3)$; l is 0 or an integer of 1 to 8; m is 0 or an integer of 1 to 8; n is an integer of 1 to 5),
$CH_2=CHO(CH_2)_k(CF_2)_nCHZCF_2$—Y (Z is H or F; n is 0 or an integer of 1 to 20; k is 0 or an integer of 1 to 6),
$CH_2=CHO(CH_2)_k(CF_2)_n(CH_2CF_2)_mCH_2CF_2$—Y (n is 0 or an integer of 1 to 20; m is an integer of 1 to 10; k is 0 or an integer of 1 to 6),
$CH_2=CHO(CH_2)_k(CF_2CH_2)_l(CF_2)_n(CH_2CF_2)_mCH_2CF_2$—Y (l is an integer of 1 to 10; n is an integer of 1 to 20; m is an integer of 1 to 10; k is 0 or an integer of 1 to 6),
$CH_2=CH(CH_2)_k(Rf^B)_n(CF_2)_mCHZCF_2$—Y (Z is H or F; $Rf^B$ is $CF_2CFCl$ or $CF_2CF(CF_3)$; k is 0 or an integer of 1 to 8; m is 0 or an integer of 1 to 8; n is an integer of 1 to 5),
and the like, and more specifically, there are, for example,
$CH_2=CHCHFCF_2$—Y, $CH_2=CHCF_2CHFCF_2$—Y,
$CH_2=CHCF_2CF_2CF_2CHFCF_2$—Y,
$CH_2=CH(CF_2)_nCHFCF_2$—Y (n is 0 or an integer of 1 to 10),
$CH_2=CHCF_2CF_2CH_2CF_2$—Y,
$CH_2=CHCF_2CF_2CF_2CF_2CH_2CF_2$—Y,
$CH_2=CH(CF_2)_nCH_2CF_2$—Y (n is 0 or an integer of 1 to 10),
$CH_2=CHCF_2CH_2CF_2CF_2CH_2CF_2$—Y,
$CH_2=CHCF_2CH_2CF_2CF_2CF_2CF_2CH_2CF_2$—Y,
$CH_2=CHCF_2CH_2(CF_2)_nCH_2CF_2$—Y (n is 0 or an integer of 1 to 10),
$CH_2=CHCF(CF_3)CF_2CHFCF_2$—Y,
$CH_2=CHCF(CF_3)CF_2CF_2CF_2CHFCF_2$—Y,
$CH_2=CHCF(CF_3)(CF_2)_nCHFCF_2$—Y (n is 0 or an integer of 1 to 10), $CH_2=CHCF_2CF(Cl)CHFCF_2-Y$, $CH_2=CHCF_2CF(Cl)CF_2CF_2CHFCF_2-Y$,
$CH_2=CHCF(Cl)CF_2CHFCF_2-Y$, $CH_2=CHCF(Cl)CF_2CF_2CF_2CHFCF_2-Y$,
$CH_2=CHOCF_2CHFCF_2-Y$,
$CH_2=CHOCF_2CF_2CHFCF_2-Y$,
$CH_2=CHOCF_2CF_2CF_2CHFCF_2-Y$,
$CH_2=CHO(CF_2)_nCHFCF_2-Y$ (n is 0 or an integer of 1 to 10),
$CH_2=CHOCH_2CHFCF_2-Y$,
$CH_2=CHOCH_2CF_2CHFCF_2-Y$,
$CH_2=CHOCH_2(CF_2)_nCF_2CHFCF_2-Y$ (n is 0 or an integer of 1 to 10),
$CH_2=CHOCH_2CH_2CHFCF_2-Y$,
$CH_2=CHOCH_2CH_2CF_2CF_2CHFCF_2-Y$,
$CH_2=CHOCH_2CH_2(CF_2)_nCHFCF_2-Y$ (n is 0 or an integer of 1 to 10),
and the like.

Examples of the monomer (m) other than those exemplified above are, for instance, as follows.
$CH_2=CF(CF_2)_n(Rf^B)_mCHZ^2CF_2-Y$ ($Rf^B$ is $CH_2$, $CF_2CFCl$, $CF_2CF(CF_3)$ or $CF_2CH_2$; $Z^2$ is H or F; m is 0 or an integer of 1 to 8; n is 0 or an integer of 1 to 10),
$CX_2=CZ^1-C_6X_4-(Rf^B)_m(CF_2)_nCHZ^2CF_2-Y$ (X is H or F; $Z^1$ is H, F, $CH_3$ or $CF_3$; $Z^2$ is H or F; $Rf^B$ is $CH_2$, $CF_2CFCl$, $CF_2CF(CF_3)$ or $CF_2CH_2$; m is 0 or an integer of 1 to 8; n is 0 or an integer of 1 to 10),
$CX_2=CZ^1-C_6X_4-O-(CH_2)_l(Rf^B)_m(CF_2)_nCHZ^2CF_2-Y$ (X is H or F; $Z^1$ is H, F, $CH_3$ or $CF_3$; $Z^2$ is H or F; $Rf^B$ is $CF_2CFCl$, $CF_2CF(CF_3)$ or $CF_2CH_2$; n is 0 or an integer of 1 to 10; m is 0 or an integer of 1 to 8; l is an integer of 1 to 4),
$CX_2=CZ^1-C_6X_4-OCO-(Rf^B)_m(CF_2)_nCHZ^2CF_2-Y$ (X is H or F; $Z^1$ is H, F, $CH_3$ or $CF_3$; $Z^2$ is H or F; $Rf^B$ is $CF_2CFCl$, $CF_2CF(CF_3)$ or $CF_2CH_2$; n is 0 or an integer of 1 to 10; m is 0 or an integer of 1 to 8),
$CX_2=CZ^1-C_6X_4-CO_2-(CH_2)_l(Rf^B)_m(CF_2)_nCHZ^2CF_2-Y$ (X is H or F; $Z^1$ is H, F, $CH_3$ or $CF_3$; $Z^2$ is H or F; $Rf^B$ is $CF_2CFCl$, $CF_2CF(CF_3)$ or $CF_2CH_2$; n is 0 or an integer of 1 to 10; m is 0 or an integer of 1 to 8; l is an integer of 1 to 4),
$CX_2=CZ^1-O-C_6X_4-O-(CH_2)_l(CF_2)_nCHZ^2CF_2-Y$ (X is H or F; $Z^1$ is H, F, $CH_3$ or $CF_3$; $Z^2$ is H or F; n is 0 or an integer of 1 to 10; l is an integer of 1 to 4),
$CX_2=CZ^1-O-C_6X_4-(CF_2)_nCHZ^2CF_2-Y$ (X is H or F; $Z^1$ is H, F, $CH_3$ or $CF_3$; $Z^2$ is H or F; n is 0 or an integer of 1 to 10),
$CX_2=CZ^1-O-C_6X_4-OCO-(CF_2)_nCHZ^2CF_2-Y$ (X is H or F; $Z^1$ is H, F, $CH_3$ or $CF_3$; $Z^2$ is H or F; n is 0 or an integer of 1 to 10),
$CX_2=CZ^1-O-C_6X_4-CO_2-(CH_2)_l(CF_2)_nCHZ^2CF_2-Y$ (X is H or F; $Z^1$ is H, F, $CH_3$ or $CF_3$; $Z^2$ is H or F; n is 0 or an integer of 1 to 10; l is an integer of 1 to 4),
$CX_2=CZ^1-CO_2-(CH_2)_l(Rf^B)_m(CF_2)_nCHZ^2CF_2-Y$ (X is H or F; $Z^1$ is H, F, $CH_3$ or $CF_3$; $Z^2$ is H or F; $Rf^B$ is $CF_2CFCl$, $CF_2CF(CF_3)$ or $CF_2CH_2$; n is 0 or an integer of 1 to 10; m is 0 or an integer of 1 to 8; l is an integer of 1 to 4),
$CX_2=CZ^1-C(=O)S-(CH_2)_l(Rf^B)_m(CF_2)_nCHZ^2CF_2-Y$ (X is H or F; $Z^1$ is H, F, $CH_3$ or $CF_3$; $Z^2$ is H or F; $Rf^B$ is $CF_2CFCl$, $CF_2CF(CF_3)$ or $CF_2CH_2$; n is 0 or an integer of 1 to 10; m is 0 or an integer of 1 to 8; l is an integer of 1 to 4), and
$CX_2=CZ^1-O-CO_2-(CH_2)_l(Rf)_m(CF_2)_nCHZ^2CF_2-Y$ (X is H or F; $Z^1$ is H, F, $CH_3$ or $CF_3$; $Z^2$ is H or F; $Rf^B$ is $CF_2CFCl$, $CF_2CF(CF_3)$ or $CF_2CH_2$; n is 0 or an integer of 1 to 10; m is 0 or an integer of 1 to 15; l is an integer of 1 to 4).

More specifically there are the following monomers.
$CH_2=CFCHFCF_2-Y$, $CH_2=CFCF_2CHFCF_2-Y$,
$CH_2=CFCF_2CF_2CHFCF_2-Y$,
$CH_2=CF(CF_2)_nCHFCF_2-Y$ (n is an integer of 3 to 10),
$CH_2=CFCH_2CF_2-Y$, $CH_2=CFCH_2CF_2CH_2CF_9-Y$,
$CH_2=CFCF_2CF(CF_3)CHFCF_2-Y$, $CH_2=CFCF_2CF(CF_3)CH_2CF_2-Y$,
$CH_2=CH-C_6X_4-(CF_2)_nCHZ^2CF_2-Y$ (X is H or F; $Z^2$ is H or F; n is 0 or an integer of 1 to 10),
$CH_2=CF-C_6X_4-(CF_2)_nCHZ^2CF_2-Y$ (X is H or F; $Z^2$ is H or F; n is 0 or an integer of 1 to 10),
$CH_2=C(CF_3)-C_6X_4-(CF_2)_nCHZ^2CF_2-Y$ (X is H or F; $Z^2$ is H or F; n is 0 or an integer of 1 to 10),
$CH_2=CH-C_6X_4-O-CH_2(CF_2)_nCHZ^2CF_2-Y$ (X is H or F; $Z^2$ is H or F; n is 0 or an integer of 1 to 10),
$CH_2=CF-C_6X_4-O-CH_2(CF_2)_nCHZ^2CF_2-Y$ (X is H or F; $Z^2$ is H or F; n is 0 or an integer of 1 to 10),
$CH_2=C(CF_3)-C_6X_4-O-CH_2(CF_2)_nCHZ^2CF_2-Y$ (X is H or F; $Z^2$ is H or F; n is 0 or an integer of 1 to 10),
$CH_2=CH-C_6X_4-O-CH_2CH_2(CF_2)_nCHZ^2CF_2-Y$ (X is H or F; $Z^2$ is H or F; n is 0 or an integer of 1 to 10),
$CH_2=CF-C_6X_4-O-CH_2CH_2(CF_2)_nCHZ^2CF_2-Y$ (X is H or F; $Z^2$ is H or F; n is 0 or an integer of 1 to 10),
$CH_2=C(CF_3)-C_6X_4-O-CH_2CH_2(CF_2)_nCHZ^2CF_2-Y$ (X is H or F; $Z^2$ is H or F; n is 0 or an integer of 1 to 10),
$CH_2=CH-C_6X_4-OCO-(CF_2)_nCHZ^2CF_2-Y$ (X is H or F; $Z^2$ is H or F; n is 0 or an integer of 1 to 10),
$CH_2=CF-C_6X_4-OCO-(CF_2)_nCHZ^2CF_2-Y$ (X is H or F; $Z^2$ is H or F; n is 0 or an integer of 1 to 10),
$CH_2=CH-C_6X_4-CO_2-CH_2(CF_2)_nCHZ^2CF_2-Y$ (X is H or F; $Z^2$ is H or F; n is 0 or an integer of 1 to 10),
$CH_2=CF-C_6X_4-CO_2-CH_2(CF_2)_nCHZ^2CF_2-Y$ (X is H or F; $Z^2$ is H or F; n is 0 or an integer of 1 to 10),
$CH_2=C(CF_3)-C_6X_4-CO_2-CH_2(CF_2)_nCHZ^2CF_2-Y$ (X is H or F; $Z^2$ is H or F; n is 0 or an integer of 1 to 10),
$CH_2=CH-C_6X_4-CO_2-CH_2CH_2(CF_2)_nCHZ^2CF_2-Y$ (X is H or F; $Z^2$ is H or F; n is 0 or an integer of 1 to 10),
$CH_2=CF-C_6X_4-CO_2-CH_2CH_2(CF_2)_nCHZ^2CF_2-Y$ (X is H or F; $Z^2$ is H or F; n is 0 or an integer of 1 to 10),
$CH_2=C(CF_3)-C_6X_4-CO_2-CH_2CH_2(CF_2)_nCHZ^2CF_2-Y$ (X is H or F; $Z^2$ is H or F; n is 0 or an integer of 1 to 10),
$CH_2=CH-C_6X_4-O-CH_2CH_2(CF_2)_nCHZ^2CF_2-Y$ (X is H or F; $Z^2$ is H or F; n is 0 or an integer of 1 to 10),
$CH_2=CF-C_6X_4-O-CH_2CH_2(CF_2)_nCHZ^2CF_2-Y$ (X is H or F; $Z^2$ is H or F; n is 0 or an integer of 1 to 10),
$CH_2=C(CF_3)-C_6X_4-O-CH_2CH_2(CF_2)_nCHZ^2CF_2-Y$ (X is H or F; $Z^2$ is H or F; n is 0 or an integer of 1 to 10),
$CH_2=CH-O-C_6X_4-(CF_2)_n-CHZ^2CF_2-Y$ (X is H or F; $Z^2$ is H or F; n is 0 or an integer of 1 to 10),
$CF_2=CF-O-C_6X_4-(CF_2)_nCHZ^2CF_2-Y$ (X is H or F; $Z^2$ is H or F; n is 0 or an integer of 1 to 10),
$CH_2=CH-O-C_6X_4-O-CH_2(CF_2)_nCHZ^2CF_2-Y$ (X is H or F; $Z^2$ is H or F; n is 0 or an integer of 1 to 10),
$CH_2=CH-O-C_6X_4-O-CH_2CH_2(CF_2)_nCHZ^2CF_2-Y$ (X is H or F; $Z^2$ is H or F; n is 0 or an integer of 1 to 10),
$CF_2=CF-O-C_6X_4-O-CH_2(CF_2)_nCHZ^2CF_2-Y$ (X is H or F; $Z^2$ is H or F; n is 0 or an integer of 1 to 10),
$CF_2=CF-O-C_6X_4-O-CH_2CH_2(CF_2)_nCHZ^2CF_2-Y$ (X is H or F; $Z^2$ is H or F; n is 0 or an integer of 1 to 10),
$CH_2=CH-O-C_6X_4-CO_2-CH_2(CF_2)_nCHZ^2CF_2-Y$ (X is H or F; $Z^2$ is H or F; n is 0 or an integer of 1 to 10),
$CH_2=CH-O-C_6X_4-CO_2-CH_2CH_2(CF_2)_nCHZ^2CF_2-Y$ (X is H or F; $Z^2$ is H or F; n is 0 or an integer of 1 to 10),
$CF_2=CF-O-C_6X_4-CO_2-CH_2(CF_2)_nCHZ^2CF_2-Y$ (X is H or F; $Z^2$ is H or F; n is 0 or an integer of 1 to 10), $CF_2=CF-O-C_6X_4-CO_2-CH_2CH_2(CF_2)_nCHZ^2CF_2-Y$ (X is H or F; $Z^2$ is H or F; n is 0 or an integer of 1 to 10),
$CH_2=CH-O-C_6X_4-OCO-(CF_2)_nCHZ^2CF_2-Y$ (X is H or F; $Z^2$ is H or F; n is 0 or an integer of 1 to 10),
$CF_2=CF-O-C_6X_4-OCO-(CF_2)_nCHZ^2CF_2-Y$ (X is H or F; $Z^2$ is H or F; n is 0 or an integer of 1 to 10),
$CF_2=CF-O-C_6X_4-O-CH_2(CF_2)_nCHZ^2CF_2-Y$ (X is H or F; $Z^2$ is H or F; n is 0 or an integer of 1 to 10),
$CF_2=CF-O-C_6X_4-O-CH_2CH_2(CF_2)_nCHZ^2CF_2-Y$ (X is H or F; $Z^2$ is H or F; n is 0 or an integer of 1 to 10),
$CH_2=CH-CO_2-CH_2(CF_2)_nCHZ^2CF_2-Y$ ($Z^2$ is H or F; n is 0 or an integer of 1 to 10),
$CH_2=CF-CO_2-CH_2(CF_2)_nCHZ^2CF_2-Y$ ($Z^2$ is H or F; n is 0 or an integer of 1 to 10),
$CH_2=C(CF_3)-CO_2-CH_2(CF_2)_nCHZ^2CF_2-Y$ ($Z^2$ is H or F; n is 0 or an integer of 1 to 10),
$CH_2=CH-CO_2-CH_2CH_2(CF_2)_nCHZ^2CF_2-Y$ ($Z^2$ is H or F; n is 0 or an integer of 1 to 10),
$CH_2=CF-CO_2-CH_2CH_2(CF_2)_nCHZ^2CF_2-Y$ ($Z^2$ is H or F; n is 0 or an integer of 1 to 10),
$CH_2=C(CF_3)-CO_2-CH_2CH_2(CF_2)_nCHZ^2CF_2-Y$ ($Z^2$ is H or F; n is 0 or an integer of 1 to 10),
$CH_2=CH-CO_2-CH_2CH_2(CF_2CH_2)_nCHZ^2CF_2-Y$ ($Z^2$ is H or F; n is an integer of 1 to 15),
$CH_2=CH-CO_2-CH_2CH_2(CF_2CH_2)_nCF_2CF_2CHFCF_2-Y$ (n is an integer of 1 to 15),
$CH_2=CH-CO_2-CH_2CH_2CF_2CF_2(CH_2CF_2)_nCH_2CF_2-Y$ (n is an integer of 1 to 15),
$CH_2=CH-CO_2-(CH_2)_l(CF_2)_m(CH_2CF_2)_nCH_2CF_2-Y$ (l is an integer of 1 to 3; m is 0 or an integer of 1 to 10; n is an integer of 1 to 15),
$CH_2=CF-CO_2-CH_2CH_2(CF_2CH_2)_nCHZ^2CF_2-Y$ ($Z^2$ is H or F; n is an integer of 1 to 15),
$CH_2=CF-CO_2-CH_2CH_2(CF_2CH_2)_nCF_2CF_2CHFCF_2-Y$ (n is an integer of 1 to 15),
$CH_2=CF-CO_2-CH_2CH_2CF_2CF_2(CH_2CF_2)_nCH_2CF_2-Y$ (n is an integer of 1 to 15),
$CH_2=CF-CO_2-(CH_2)_l(CF_2)_m(CH_2CF_2)_nCH_2CF_2-Y$ (l is an integer of 1 to 3; m is 0 or an integer of 1 to 10; n is an integer of 1 to 15),
$CH_2=C(CH_3)-CO_2-CH_2CH_2(CF_2CH_2)_nCHZ^2CF_2-Y$ ($Z^2$ is H or F; n is an integer of 1 to 15),
$CH_2=C(CH_3)-CO_2-CH_2CH_2(CF_2CH_2)_nCF_2CF_2CHFCF_2-Y$ (n is an integer of 1 to 15),
$CH_2=C(CH_3)-CO_2-CH_2CH_2CF_2CF_2(CH_2CF_2)_nCH_2CF_2-Y$ (n is an integer of 1 to 15),
$CH_2=C(CH_3)-CO_2-(CH_2)_l(CF_2)_m(CH_2CF_2)_nCH_2CF_2-Y$ (l is an integer of 1 to 3; m is 0 or an integer of 1 to 10; n is an integer of 1 to 15),
$CH_2=C(CF_3)-CO_2-CH_2CH_2(CF_2CH_2)_nCHZ^2CF_2-Y$ ($Z^2$ is H or F; n is an integer of 1 to 15),
$CH_2=C(CF_3)-CO_2-CH_2CH_2(CF_2CH_2)_nCF_2CF_2CHFCF_2-Y$ (n is an integer of 1 to 15),
$CH_2=C(CF_3)-CO_2-CH_2CH_2CF_2CF_2(CH_2CF_2)_nCH_2CF_2-Y$ (n is an integer of 1 to 15),
$CH_2=C(CF_3)-CO_2-(CH_2)_l(CF_2)_m(CH_2CF_2)_nCH_2CF_2-Y$ (l is an integer of 1 to 3; m is 0 or an integer of 1 to 10; n is an integer of 1 to 15),
$CH_2=CZ^1-C(=O)S-CH_2CH_2(CF_2CH_2)_nCHZ^2CF_2-Y$ ($Z^1$ is H, F, $CH_3$ or $CF_3$; $Z^2$ is H or F; n is an integer of 1 to 15),
$CH_2=CZ^1-C(=O)S-CH_2CH_2(CF_2CH_2)_nCF_2CF_2CHFCF_2-Y$ ($Z^1$ is H, F, $CH_3$ or $CF_3$; n is an integer of 1 to 15),
$CH_2=CZ^1-C(=O)S-CH_2CH_2CF_2CF_2(CF_2CH_2)_nCHFCF_2-Y$ ($Z^1$ is H, F, $CH_3$ or $CF_3$; n is an integer of 1 to 15),
$CH_2=CZ^1-C(=O)S-(CH_2)_l(CF_2)_m(CH_2CF_2)_nCH_2CF_2-Y$ ($Z^1$ is H, F, $CH_3$ or $CF_3$; l is an integer of 1 to 3; m is 0 or an integer of 1 to 10; n is an integer of 1 to 15),
$CH_2=CH-O-CO_2-CH_2(CF_2)_nCHZ^2CF_2-Y$ ($Z^2$ is H or F; n is 0 or an integer of 1 to 10), and
$CH_2=CH-O-CO_2-CH_2CH_2(CF_2)_nCHZ^2CF_2-Y$ ($Z^2$ is H or F; n is 0 or an integer of 1 to 10).

The fluorine-containing ethylenic monomer (m) and the examples thereof, that is, the monomers (m1) to (m5) encompass novel compounds which have not been disclosed in any of patent publications. A method of synthesis thereof is explained infra.

The fluorine-containing polymer (l) of the present invention may be a homopolymer comprising one kind of the above-mentioned fluorine-containing ethylenic monomers (m), or a copolymer comprising at least two kinds of the fluorine-containing ethylenic monomers (m). In the case of a copolymer comprising at least two kinds of the fluorine-containing ethylenic monomers (m), a copolymerization ratio can be optionally selected within a wide range.

In addition, the fluorine-containing polymer (l) of the present invention may be a copolymer comprising one kind or two or more kinds of the fluorine-containing ethylenic monomers (m) and the monomer (n) providing the structural unit N and being copolymerizable with the fluorine-containing monomer (m).

The monomer (n) is not limited particularly, and may be optionally selected depending on purpose of uses according to characteristics such as adhesion to a substrate, a refractive index and mechanical properties to be imparted to the structural unit M. The monomer (n) is contained in the copolymer in an amount of not less than 0.1% by mole. In order to obtain a stable structure with carbon materials and metal particles, the amount is preferably not less than 1% by mole, further preferably not less than 5% by mole, and for electrolyte application, the amount is preferably not less than 3% by mole, further preferably not less than 15% by mole.

The copolymer may be a block copolymer, a graft copolymer, an alternating copolymer or a random copolymer.

Nonlimiting examples of the structural unit N are those exemplified below.
(i) Structural Units (N1) Derived from Fluorine-Containing Ethylenic Monomers Having Functional Group but not Y These structural units are preferred from the viewpoint that adhesion to a substrate and solubility in a solvent, particularly a general-purpose solvent can be imparted to the curable fluorine-containing polymer and the cured article obtained therefrom while maintaining a low refractive index thereof, and are also preferred from the viewpoint that other functions such as crosslinkability can be imparted thereto. Preferred structural unit of the fluorine-containing ethylenic monomer having functional group is a structural unit represented by the general formula (N1):

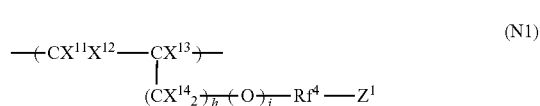

wherein each of $X^{11}$, $X^{12}$ and $X^{13}$ is H or F; $X^{14}$ is H, F or $CF_3$; h is 0, 1 or 2; i is 0 or 1; $Rf^4$ is a fluorine-containing alkylene group having 1 to 40 carbon atoms or a fluorine-containing alkylene group having 2 to 100 carbon atoms and ether bond; $Z^1$ is one selected from —OH, —$CH_2OH$, —COOH, carboxylic acid derivative, —$SO_3H$, sulfonic acid derivative, epoxy and cyano.

Preferable examples of carboxylic acid derivative and sulfonic acid derivative are salts referred to as —COOMa and —SO₃Ma, respectively. Examples of Ma are, for instance, $NH_4$, Li, Na, K, Rb, Cs, $MgCl$, $MgBr$, $MgI$, $MgNO_3$, $MgBF_4$, $CaCl$, $CaBr$, $CaI$, $CaNO_3$, $CaBF_4$, $FeCl_2$, $FeBr_2$, $CoCl$, $CoBr$, $ZnCl$, $ZnBr$, $NiCl$, $NiBr$, Ag, Cu, $CuCl$, $CuBr$, $CuI$, $AuCl_2$, $AuBr_2$ and $AuI_2$.

Particularly preferred as the structural unit N1 is a structural unit represented by the formula (N1-1):

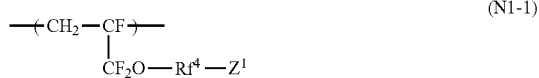

(N1-1)

wherein $Rf^4$ and $Z^1$ are as defined in the formula (N1).

More specifically there are preferably structural units derived from fluorine-containing ethylenic monomers such as:

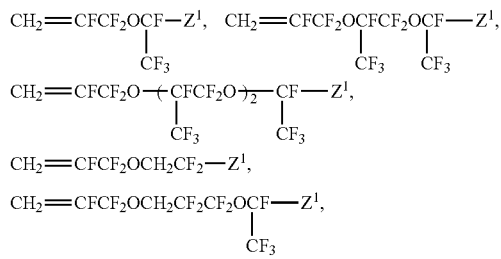

$CH_2$=$CFCF_2OCF_2CF_2OCF_2$—$Z^1$ and
$CH_2$=$CFCF_2O$—$(CF_2CF_2)_2CF_2$—$Z^1$.

Also there is preferably exemplified a structural unit represented by the formula (N1-2):

(N1-2)

wherein $Rf^4$ and $Z^1$ are as defined in the formula (N1), and more specifically there are structural units derived from monomers such as:

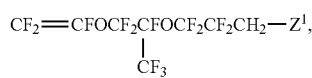

$CF_2$=$CFO$—$(CF_2)_3Z^1$, $CF_2$=$CFO$—$(CF_2)_3CH_2$—$Z^1$,
$CF_2$=$CFOCF_2CF_2OCF_2$—$Z^1$,
$CF_2$=$CFOCF_2CF_2OCF_2CH_2$—$Z^1$,
$CF_2$=$CFOCF_2CF_2CH_2OCF_2CF_2$—$Z^1$ and
$CF_2$=$CFOCF_2CF_2CH_2OCF_2CF_2CH_2$—$Z^1$.

Examples of the other fluorine-containing ethylenic monomers having functional group are:
$CF_2$=$CFCF_2$—O—Rf—$Z^1$, $CF_2$=$CF$—Rf—$Z^1$,
$CH_2$=$CH$—Rf—$Z^1$, $CH_2$=$CHO$—Rf—$Z^1$
and the like, wherein Rf is the same as Rf of the formula (M), and more specifically there are:
$CF_2$=$CFCF_2OCF_2CF_2CF_2$—$Z^1$,
$CF_2$=$CFCF_2OCF_2CF_2CF_2CH_2$—$Z^1$,

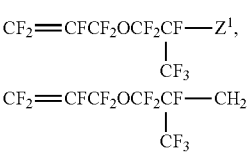

$CF_2$=$CFCF_2$—$Z^1$, $CF_2$=$CFCF_2CH_2$—$Z^1$,
$CH_2$=$CHCF_2OF_2CH_2CH_2$—$Z^1$, $CH_2$=$CHCF_2CF_2$—$Z^1$,
$CH_2$=$CHCF_2CF_2CH_2$—$Z^1$, $CH_2$=$CHCF_2CF_2CF_2CF_2$—$Z^1$,
$CH_2$=$CHCF_2CF_2CF_2CF_2CH_2$—$Z^1$, $CH_2$=$CHO$—$CH_2CF_2CF_2$—$Z^1$,
$CH_2$=$CHOCH_2CF_2CF_2CH_2$—$Z^1$
and the like.

(ii) Structural Units (N2) Derived from Fluorine-Containing Ethylenic Monomers Having Neither Functional Group Nor Y These structural units are preferred from the viewpoint that solubility in a general-purpose solvent can be improved and compatibility with additives such as an ionic liquid can be improved. Further these structural units are preferred from the viewpoint that by selecting the monomer, mechanical characteristics and glass transition temperature of the polymer can be adjusted, and particularly the glass transition temperature can be increased by copolymerization with the structural unit M.

Examples of the preferred structural units of the fluorine-containing ethylenic monomer are those represented by the general formula (N2):

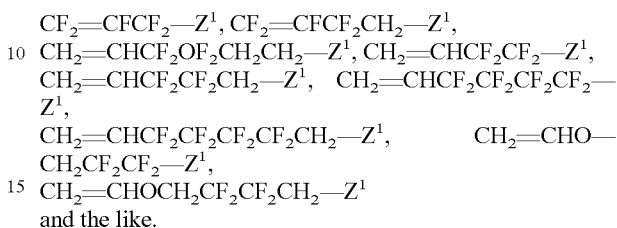

(N2)

wherein each of $X^{15}$, $X^{16}$ and $X^{18}$ is H or F; $X^{17}$ is H, F or $CF_3$; each of h1, i1 and j is 0 or 1; $Z^2$ is H, F or Cl; $Rf^5$ is a fluorine-containing alkylene group having 1 to 20 carbon atoms or a fluorine-containing alkylene group having 2 to 100 carbon atoms and ether bond.

Examples thereof are preferably structural units derived from monomers such as:
$CF_2$=$CF_2$, $CF_2$=$CH_2$, $CF_2$=$CFCl$, $CF_2$=$CFCF_3$,

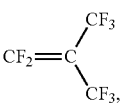

$CF_2$=$CFO(CF_2)_nF$ (n: from 1 to 5), $CH_2$=$C(CF_3)_2$, $CF_2$=C, $CF_2$=$CCl_2$,

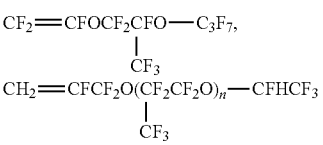

(n: from 0 to 10),
$CH_2$=$CF$—$(CF_2)_nZ^2$ ($Z^2$ is as defined in the formula (N2), n: from 1 to 10) and $CH_2=CHOCH_2(CF_2)_nZ^2$ ($Z^2$ is as defined in the formula (N2), n: from 1 to 10).

(iii) Fluorine-Containing Aliphatic Ring Structural Units (N3)

Introduction of these structural units is preferred since the fluorine-containing polymer having a high glass transition temperature can be obtained.

Examples of the preferred fluorine-containing aliphatic ring structural unit are those represented by the formula (N3):

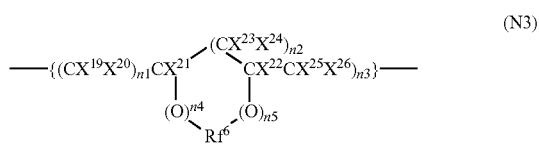

wherein $X^{19}$, $X^{20}$, $X^{23}$, $X^{24}$, $X^{25}$ and $X^{26}$ are the same or different and each is H or F; $X^{21}$ and $X^{22}$ are the same or different and each is H, F, Cl or $CF_3$; $Rf^B$ is a fluorine-containing alkylene group having 1 to 10 carbon atoms or a fluorine-containing alkylene group having 2 to 10 carbon atoms and ether bond; n2 is 0 or an integer of from 1 to 3; n1, n3, n4 and n5 are the same or different and each is 0 or 1.

For example, there are structural units represented by:

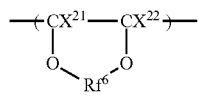

wherein RP, $X^{21}$ and $X^{22}$ are as defined above.

Specifically there are:

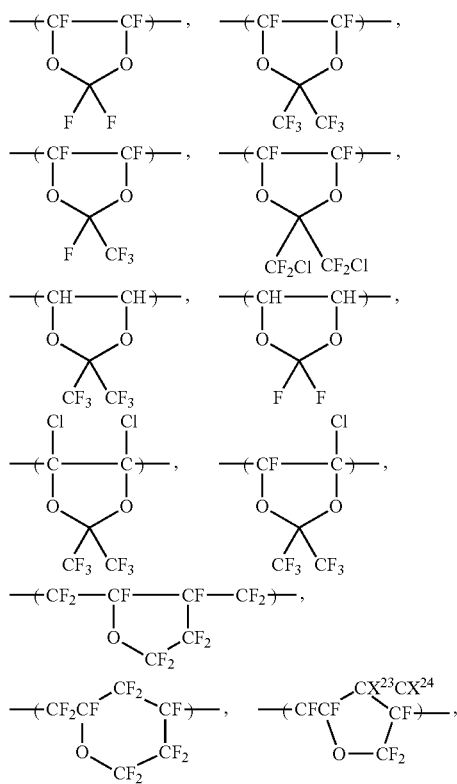

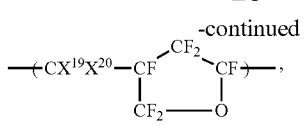

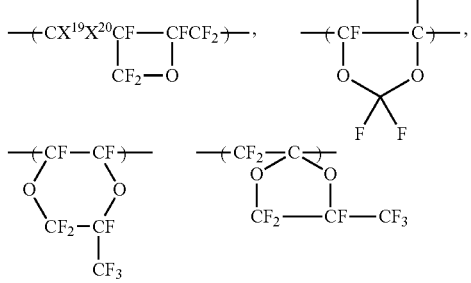

and the like.

(iv) Structural Units (N4) Derived from Ethylenic Monomers Having No Fluorine

Introduction of these structural units is preferred since solubility in a general-purpose solvent is enhanced and compatibility with additives can be improved.

Examples of the non-fluorine-containing ethylenic Monomer are as follows.

α-Olefins:
Ethylene, propylene, butene, vinyl chloride, vinylidene chloride and the like Vinyl Ether or Vinyl Ester Monomers:
$CH_2=CHOR$, $CH_2=CHOCOR$ (R: hydrocarbon group having 1 to 20 carbon atoms) and the like Allyl Monomers:
$CH_2=CHCH_2Cl$, $CH_2=CHCH_2OH$, $CH_2=CHCH_2COOH$, $CH_2=CHCH_2Br$ and the like Allyl Ether Monomers:
$CH_2=CHCH_2OR$
(R: hydrocarbon group having 1 to 20 carbon atoms),
$CH_2=CHCH_2OCH_2CH_2COOH$,

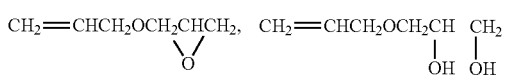

and the like.

Acrylic or Methacrylic Monomers:
Acrylic acid, methacrylic acid, acrylic acid esters, methacrylic acid esters, maleic anhydride, maleic acid, maleic acid esters and the like.

Among the comonomers (n), monomers which can be preferably used as a fluorine-containing monomer are collectively exemplified below.

Fluorine-containing olefins such as: $CF_2=CF_2$, $CF_2=CF(CF_3)$, $CF_2=C(CF_3)_2$, $CF_2=C(CF_3)Br$, $CF_2=C(CF_3)Cl$, $CF_2=C(CF_3)I$, $CF_2=CFBr$, $CF_2=CFCl$, $CF_2=CF_1$, $CF_2=CCl_2$, $CH_2=CF_2$, $CH_2=C(CF_3)_2$, $CF_2=CFH$, $CF_2=CF(Rf^B)_nCF_2=CH_2$ ($Rf^B$ is $CF_2$, $CH_2$, $CF_2CFCl$, $CF_2CF(CF_3)$ or $CF_2CH_2$; n is 0 or an integer of 1 to 20),
$CF_2=CF(Rf^B)_n-CF=CF_2$ ($Rf^B$ is $CF_2$, $CH_2$, $CF_2CFCl$, $CF_2CF(CF_3)$ or $CF_2CH_2$; n is 0 or an integer of 1 to 20),
$CX_2=CY(Rf^B)_n-CH=CF_2$ (X is H or F; Y is H, F or $CF_3$; $Rf^B$ is $CF_2$, $CH_2$, $CF_2CFCl$, $CF_2CF(CF_3)$ or $CF_2CH_2$; n is 0 or an integer of 1 to 20),
$CF_2=CF(Rf^B)_n-F$ ($Rf^B$ is $CF_2$, $CH_2$, $CF_2CFCl$, $CF_2CF(CF_3)$ or $CF_2CH_2$; n is 0 or an integer of 1 to 20), $CF_2=CF(Rf^B)_n$—Br ($Rf^B$ is $CF_2$, $CH_2$, $CF_2CFCl$, $CF_2CF(CF_3)$ or $CF_2CH_2$; n is 0 or an integer of 1 to 20), $CF_2=CF(Rf^B)_n$—Cl ($Rf^B$ is $CF_2$, $CH_2$, $CF_2CFCl$, $CF_2CF(CF_3)$ or $CF_2CH_2$; n is 0 or an integer of 1 to 20), $CF_2=CF(Rf^B)_n$—I ($Rf^B$ is $CF_2$, $CH_2$, $CF_2CFCl$, $CF_2CF(CF_3)$ or $CF_2CH_2$; n is 0 or an integer of 1 to 20), $CF_2=CF(Rf^B)_n$—$CH_2OH$ ($Rf^B$ is $CF_2$, $CH_2$, $CF_2CFCl$, $CF_2CF(CF_3)$ or $CF_2CH_2$; n is 0 or an integer of 1 to 20), $CF_2=CF(Rf^B)_n$—$CO_2R$ ($Rf^B$ is $CF_2$, $CH_2$, $CF_2CFCl$, $CF_2CF(CF_3)$ or $CF_2CH_2$; R is an alkyl group which may be substituted by hydrogen atom or halogen atom; n is 0 or an integer of 1 to 20), $CF_2=CF(Rf^B)_n$—CN ($Rf^B$ is $CF_2$, $CH_2$, $CF_2CFCl$, $CF_2CF(CF_3)$ or $CF_2CH_2$; n is 0 or an integer of 1 to 20), $CH_2=CF(Rf^B)_n$—F ($Rf^B$ is $CF_2$, $CH_2$, $CF_2CFCl$, $CF_2CF(CF_3)$ or $CF_2CH_2$; n is 0 or an integer of 1 to 20), $CH_2=CF(Rf^B)_n$—H ($Rf^B$ is $CF_2$, $CH_2$, $CF_2CFCl$, $CF_2CF(CF_3)$ or $CF_2CH_2$; n is 0 or an integer of 1 to 20), $CH_2=CF(Rf^B)_n$—I ($Rf^B$ is $CF_2$, $CH_2$, $CF_2CFCl$, $CF_2CF(CF_3)$ or $CF_2CH_2$; n is 0 or an integer of 1 to 20), $CH_2=CF(Rf^B)_n$—$CH_2OH$ ($Rf^B$ is $CF_2$, $CH_2$, $CF_2CFCl$, $CF_2CF(CF_3)$ or $CF_2CH_2$; n is 0 or an integer of 1 to 20), $CH_2=CF(Rf^B)_n$—$CO_2R$ ($Rf^B$ is $CF_2$, $CH_2$, $CF_2CFCl$, $CF_2CF(CF_3)$ or $CF_2CH_2$; R is H or a hydrocarbon group having 1 to 20 carbon atoms; n is 0 or an integer of 1 to 20), $CH_2=CF(Rf^B)_n$—CN ($Rf^B$ is $CF_2$, $CH_2$, $CF_2CFCl$, $CF_2CF(CF_3)$ or $CF_2CH_2$; n is 0 or an integer of 1 to 20), $CH_2=CH(Rf^B)_n$—H ($Rf^B$ is $CF_2$, $CH_2$, $CF_2CFCl$, $CF_2CF(CF_3)$ or $CF_2CH_2$; n is an integer of 1 to 20), $CH_2=CH(Rf^B)_n$—I ($Rf^B$ is $CF_2$, $CH_2$, $CF_2CFCl$, $CF_2CF(CF_3)$ or $CF_2CH_2$; n is an integer of 1 to 20), $CH_2=CH(Rf^B)_n$—$CH_2OH$ ($Rf^B$ is $CF_2$, $CH_2$, $CF_2CFCl$, $CF_2CF(CF_3)$ or $CF_2CH_2$; n is 0 or an integer of 1 to 20), $CH_2=CH(Rf^B)_n$—$CO_2R$ ($Rf^B$ is $CF_2$, $CH_2$, $CF_2CFCl$, $CF_2CF(CF_3)$ or $CF_2CH_2$; R is an alkyl group which may be substituted by hydrogen atom or halogen atom; n is 0 or an integer of 1 to 20), $CH_2=CH(Rf^B)_n$—CN ($Rf^B$ is $CF_2$, $CH_2$, $CF_2CFCl$, $CF_2CF(CF_3)$ or $CF_2CH_2$; n is an integer of 1 to 20), $CH_2=C(CF_3)$-$(Rf^B)_n$—$CO_2R$ ($Rf^B$ is $CF_2$, $CF_2CFCl$, $CF_2CF(CF_3)$ or $CF_2CH_2$; R is an alkyl group which may be substituted by hydrogen atom or halogen atom; n is 0 or an integer of 1 to 20), $CH_2=C(CF_3)^-(Rf^B)_n$—CN ($Rf^B$ is $CF_2$, $CH_2$, $CF_2CFCl$, $CF_2CF(CF_3)$ or $CF_2CH_2$; n is an integer of 1 to 20), $CH_2=C(CH_3)$-$(Rf^B)_n$—$CO_2R$ ($Rf^B$ is $CF_2$, $CH_2$, $CF_2CFCl$, $CF_2CF(CF_3)$ or $CF_2CH_2$; R is an alkyl group which may be substituted by hydrogen atom or halogen atom; n is 0 or an integer of 1 to 20), $CH_2=C(CH_3)$-$(Rf^B)_n$—CN ($Rf^B$ is $CF_2$, $CH_2$, $CF_2CFCl$, $CF_2CF(CF_3)$ or $CF_2CH_2$; n is an integer of 1 to 20), $CF_2=C(CF_3)$-$(Rf^B)_n$—$CO_2R$ ($Rf^B$ is $CF_2$, $CH_2$, $CF_2CFCl$, $CF_2CF(CF_3)$ or $CF_2CH_2$; R is an alkyl group which may be substituted by hydrogen atom or halogen atom; n is 0 or an integer of 1 to 20), and $CF_2=C(CF_3)$—$(Rf^B)_n$—CN ($Rf^B$ is $CF_2$, $CH_2$, $CF_2CFCl$, $CF_2CF(CF_3)$ or to $CF_2CH_2$; n is an integer of 1 to 20);

fluorine-containing vinyl ethers such as $CF_2=CFOR$ (R is an alkyl group which may be substituted by halogen atom), $CF_2=C(CF_3)OR$ (R is an alkyl group which may be substituted by halogen atom), $CF_2=CF[OCF_2CF(CF_3)]_nOC_3F_7$ (n is 0 or an integer of 1 to 10), $CF_2=CF[OCF_2CF(CF_3)]_nO(CF_2)_mCF=CF_2$ (m is 0 or an integer of 1 to 10; n is 0 or an integer of 1 to 10), $CF_2=CF[OCF_2CF(CF_3)]_nO(CF_2)_mCF=CH_2$ (m is 0 or an integer of 1 to 10; n is 0 or an integer of 1 to 10), $CF_2=CF[OCF_2CF(CF_3)]_nO(CF_2)_mSO_3M$ (M is H, $NH_4$, Li, Na, K, Rb, Cs, MgCl, MgBr, MgI, $MgNO_3$, $MgBF_4$, CaCl, CaBr, CaI, $CaNO_3$, $CaBF_4$, $FeCl_2$, $FeBr_2$, CoCl, CoBr, ZnCl, ZnBr, NiCl, NiBr, Ag, Cu, CuCl, CuBr, CuI, $AuCl_2$, $AuBr_2$ or $AuI_2$; m is an integer of 1 to 10; n is 0 or an integer of 1 to 20), $CF_2=CF[OCF_2CF(CF_3)]_nO(CF_2)_mCO_2R$ (m is an integer of 1 to 10; n is 0 or an integer of 1 to 10; R is an alkyl group which may be substituted by hydrogen atom or halogen atom), $CF_2=CF[OCF_2CF(CF_3)]_nO(CF_2)_mCH_2OR$ (m is an integer of 1 to 10; n is 0 or an integer of 1 to 10; R is hydrogen atom or an alkyl group which may be substituted by hydrogen atom or halogen atom), $CF_2=CF[OCF_2CF(CF_3)]_nO(CF_2)_mCN$ (m is an integer of 1 to 10; n is 0 or an integer of 1 to 10), $CF_2=CF[OCF_2CF(CF_3)]_nO(CF_2)_m(CH_2)_l$—I (m is an integer of 1 to 10; l is 0 or an integer of 1 to 4; n is 0 or an integer of 1 to 10), $CF_2=CF(OCF_2CF_2)_nO(CF_2)_mCF=CF_2$ (m is 0 or an integer of 1 to 10; n is an integer of 1 to 10), $CF_2=CF(OCF_2CF_2)_nO(CF_2)_mSO_3M$ (M is H, $NH_4$, Li, Na, K, Rb, Cs, MgCl, MgBr, MgI, $MgNO_3$, $MgBF_4$, CaCl, CaBr, CaI, $CaNO_3$, $CaBF_4$, $FeCl_2$, $FeBr_2$, CoCl, CoBr, ZnCl, ZnBr, NiCl, NiBr, Ag, Cu, CuCl, CuBr, Cut, $AuCl_2$, $AuBr_2$ or $AuI_2$; m is an integer of 1 to 10; n is an integer of 1 to 20), $CF_2=CF(OCF_2CF_2)_nO(CF_2)_mCO_2R$ (m is an integer of 1 to 10; n is an integer of 1 to 10; R is an alkyl group which may be substituted by hydrogen atom or halogen atom), $CF_2=CF(OCF_2CF_2)_nO(CF_2)_mCH_2R$ (m is an integer of 1 to 10; n is an integer of 1 to 10; R is hydrogen atom or an alkyl group which may be substituted by hydrogen atom or halogen atom), $CF_2=CF(OCF_2CF_2)_nO(CF_2)_mCN$ (m is an integer of 1 to 10; n is an integer of 1 to 10), and $CF_2=CF(OCF_2CF_2)_nO(CF_2)_m(CH_2)_l$—I (l is 0 or an integer of 1 to 4; m is an integer of 1 to 10; n is an integer of 1 to 10); fluorine-containing alkenyl ethers such as $CH_2=CFCF_2O[CF(CF_3)CF_2O]_nCF(CF_3)CO_2R$ (n is 0 or an integer of 1 to 10; R is an alkyl group which may be substituted by hydrogen atom or halogen atom), $CH_2=CFCF_2O[CF(CF_3)CF_2O]_nCF(CF_3)CH_2OR$ (n is 0 or an integer of 1 to 10; R is an alkyl group which may be substituted by hydrogen atom or halogen atom), $CF_2=CFCF_2O[CF(CF_3)CF_2O]_nCF(CF_3)CN$ (n is 0 or an integer of 1 to 10), $CF_2=CFCF_2O[CF(CF_3)CF_2O]_nCHFCF_3$ (n is 0 or an integer of 1 to 10), $CF_2=CF(CF_2)_mO[CF(CF_3)CF_2O]_nCF(CF_3)CO_2R$ (m is an integer of 1 to 10; n is 0 or an integer of 1 to 1.0; R is an alkyl group which may be substituted by hydrogen atom or halogen atom), $CF_2=CF(CF_2)_mO[CF(CF_3)CF_2O]_nCF(CF_3)CH_2OR$ (m is an integer of 1 to 10; n is 0 or an integer of 1 to 10; R is an alkyl group which may be substituted by hydrogen atom or halogen atom), $CF_2=CF(CF_2)_mO[CF(CF_3)CF_2O]_nCF(CF_3)CN$ (m is an integer of 1 to 0; n is 0 or an integer of 1 to 10), and $CF_2=CF(CF_2)_mO[CF(CF_3)CF_2O]_nCHFCF_3$ (m is an integer of 1 to 10; n is 0 or an integer of 1 to 10);

$CX_2=CY$—$C_6X_5$ (X is H or F; Y is F or $CF_3$), $CX_2=CY$—$C_6X_4$—$SO_3M$ (X is H or F; Y is H, F or $CF_3$; M is H, $NH_4$, Li, Na, K, Rb, Cs, MgCl, MgBr, MgI, $MgNO_3$, $MgBF_4$, CaCl, CaBr, Cal, $CaNO_3$, $CaBF_4$, $FeCl_2$, $FeBr_2$, CoCl, CoBr, ZnCl, ZnBr, NiCl, NiBr, Ag, Cu, CuCl, CuBr, CuI, $AuCl_2$, $AuBr_2$ or $AuI_2$), and

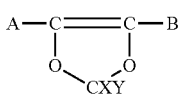

wherein A and B may be the same or different and each is H, F, Cl, $CF_3$ or $OCF_3$; X and Y may be the same or different and each is H, F or $CF_3$.

For polymerizing the fluorine-containing ethylenic monomer (m) and further the comonomer (n) as case demands, polymerization methods such as a radical polymerization method, an anion polymerization method and a cation polymerization method can be employed. In addition, solution polymerization, suspension polymerization, emulsion polymerization and bulk polymerization can be employed.

In order to initiate the radical polymerization, means for initiation is not limited particularly as far as the polymerization proceeds radically. The polymerization is initiated, for example, with an organic or inorganic radical polymerization initiator, heat, light, or active energy ray such as ionizing radiation. The polymerization can be carried out by solution polymerization, bulk polymerization, suspension polymerization, emulsion polymerization or the like. The molecular weight is controlled by the contents of monomers to be used for the polymerization, the content of polymerization initiator, the content of chain transfer agent, temperature, etc. The composition of the copolymer can be controlled by the starting monomer components.

Next, a method of synthesizing the novel fluorine-containing ethylenic monomer (m) is explained.

The fluorine-containing ethylenic monomer (m) can be synthesized, for example, by allowing the heteroaromatic ring compound (A) having N—H group in its ring to react with the fluoroalkene (B) represented by the formula (B):

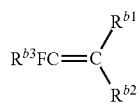

wherein $R^{b1}$, $R^{b2}$ and $R^{b3}$ are the same or different and each is H, halogen atom, a functional group or a monovalent organic group which may be substituted by halogen atom, may have ether bond and may have polymerizable group, in the presence or absence of alkali metal, and if necessary, by subjecting the obtained product to de-halogenation reaction or decarbonation reaction.

Example of the heteroaromatic ring compound (A) having N—H group in its ring as a starting material is a heteroaromatic ring compound (A1) represented by the formula (A1):

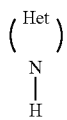

where

is a moiety forming a heteroaromatic ring together with a nitrogen atom, and the whole or a part of its hydrogen atoms may be replaced by the same or different organic groups.

Preferable examples thereof are compounds having an imidazole skeleton, a pyrrole skeleton, a pyrazole skeleton, a 1,2,3-triazole skeleton, a 1,2,4-triazole skeleton, an indole skeleton, a benzimidazole skeleton, a benzotriazole skeleton, a purine skeleton, a purine derivative skeleton or a carbazole skeleton from the viewpoint of easy synthesis and availability.

There are specifically exemplified the following compounds as the heteroaromatic ring compound (A1) represented by the formula (A1):
an imidazole compound represented by the formula (A1-1):

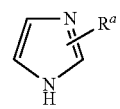

wherein $R^a$s are the same or different, and each is halogen atom, a functional group or an organic group and may be present or may not be present, and when $R^a$s are present, the whole or a part of hydrogen atoms of the heteroaromatic ring are substituted by them,
a pyrrole compound represented by the formula (A1-2):

wherein $R^a$s are the same or different, and each is halogen atom, a functional group or an organic group and may be present or may not be present, and when $R^a$s are present, the whole or a part of hydrogen atoms of the heteroaromatic ring are substituted by them,
a pyrazole compound represented by the formula (A1-3):

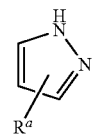

wherein $R^a$s are the same or different, and each is halogen atom, a functional group or an organic group and may be present or may not be present, and when $R^a$s are present, the whole or a part of hydrogen atoms of the heteroaromatic ring are substituted by them,
a triazole compound represented by the formula (A1-4):

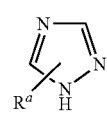

wherein $R^a$s are the same or different, and each is halogen atom, a functional group or an organic group and may be present or may not be present, and when $R^a$s are present, the whole or a part of hydrogen atoms of the heteroaromatic ring are substituted by them, an indole compound represented by the formula (A1-5):

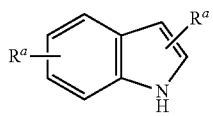

wherein R$^a$s are the same or different, and each is halogen atom, a functional group or an organic group and may be present or may not be present, and when R$^a$s are present, the whole or a part of hydrogen atoms of the heteroaromatic ring and/or the aromatic ring are substituted by them,
a purine compound represented by the formula (A1-6):

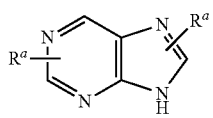

wherein R$^a$s are the same or different, and each is halogen atom, a functional group or an organic group and may be present or may not be present, and when R$^a$s are present, the whole or a part of hydrogen atoms of the heteroaromatic ring and/or the aromatic ring are substituted by them,
a purine derivative compound represented by the formula (A 1-7):

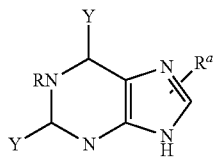

wherein R$^a$ is halogen atom, a functional group or an organic group and may be present or may not be present, and when R$^a$ is present, the whole or a part of hydrogen atoms of the heteroaromatic ring are substituted by R$^a$; R and R' are the same or different and each is hydrogen atom, an alkyl group, an arylalkyl group, an organosilicon group, an alkoxy group or a carboxyester group; Ys are the same or different and each is =O, —NRR', —OR, F or F$_2$, and compounds explained infra.
Examples of R$^a$ are, for instance, groups raised below.
(a1-1) Halogen Atoms:
There are preferably fluorine atom and chlorine atom, especially fluorine atom.
(a1-2) Functional Groups:
Examples are carboxyl group (—COOH), carboxylic acid ester group (—COOR), nitrile group (—CN), amino group (—NH$_2$), alkylamino group (—NR$_2$, —NHR), carboxamide group (—CONR$_2$, —CONHR), alkyl ether group (—OR), silyl ether group (—OSiR$_3$), thiol group (—SH), thioether group (—SR) and nitro group, preferably carboxylic acid ester group, nitrile group, amino group, alkylamino group, carboxamide group, alkyl ether group, silyl ether group, thiol group and thioether group. In addition, carboxyl group (—COOH), carboxylic acid ester group (—COOR), nitrile group (—CN), amino group (—NH$_2$), alkylamino group (—NR$_2$, —NHR), carboxamide group (—CONR$_2$, —CONHR), alkyl ether group (—OR), silyl ether group (—OSiR$_3$), thiol group (—SH), thioether group (—SR) and nitro group are allowable as a substituent to be bonded to the benzene ring (Rs are the same or different; and are preferably monovalent hydrocarbon groups).
(a1-3) Organic Groups:
(a1-3-1) Linear or branched alkyl groups in which a part of or the whole of hydrogen atoms may be substituted by halogen atoms, preferably fluorine atoms. The number of carbon atoms is preferably 1 to 1,000.
(a1-3-2) Alkyl groups substituted by functional group such as carboxyl group, hydroxyl group, nitrile group, amino group, alkylamino group, carboxylic acid ester group, carboxamide group, alkyl ether group, silyl ether group, thiol group, thioether group or nitro group. The number of carbon atoms is preferably 1 to 20.
(a1-3-3) Aryl groups which may be substituted.
(a1-3-4) Alkyl groups having ether bond in which a part of or the whole of hydrogen atoms may be substituted by halogen atoms, preferably fluorine atoms. The number of carbon atoms is preferably 1 to 1,000.
(a1-3-5). Alkoxy groups in which a part of or the whole of hydrogen atoms may be substituted by halogen atoms, preferably fluorine atoms. The number of carbon atoms is preferably 1 to 1,000.

In the following Tables 15 to 28, definitions of substituents are effective only in the corresponding tables. Figures showing the number of atoms are not represented especially by small letters. Further Ph is an abbreviation of phenyl.

Examples of the imidazole compound of the formula (A1-1) are, for instance, compounds having R$^{a1}$ and shown in Table 15.

TABLE 15

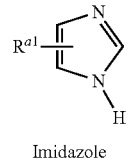

Imidazole

| Compound No. | R$^{a1}$ | | |
|---|---|---|---|
| A1-1-1 | H | H | H |
| 2 | F | H | H |
| 3 | F | F | H |
| 4 | F | F | F |
| 5 | CF3 | H | H |
| 6 | CF3 | F | H |
| 7 | C2F5 | H | H |
| 8 | CHF2CF2 | H | H |
| 9 | CF3CHFCF2 | H | H |
| 10 | CH3 | H | H |
| 11 | CH3 | F | H |
| 12 | CH3 | CH3 | H |
| 13 | Ph | H | H |
| 14 | CH2OR | H | H |
| 15 | COOR | H | H |
| 16 | CH2COOH | H | H |

Examples of the pyrrole compound of the formula (A1-2) are, for instance, compounds having R$^{a2}$ and shown in Table 16.

TABLE 16

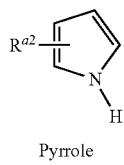

Pyrrole

| Compound No. | $R^{a2}$ | | | |
|---|---|---|---|---|
| A1-2-1 | H | H | H | H |
| 2 | F | H | H | H |
| 3 | F | F | H | H |
| 4 | F | F | F | H |
| 5 | F | F | F | F |
| 6 | CF3 | H | H | H |
| 7 | CF3 | F | H | H |
| 8 | CF3 | F | F | H |
| 9 | C2F5 | H | H | H |
| 10 | CH3 | H | H | H |
| 11 | CH3 | F | H | H |
| 12 | CH3 | CH3 | H | H |
| 13 | Ph | H | H | H |
| 14 | Ph | F | H | H |
| 15 | CH2OR | H | H | H |
| 16 | COOR | H | H | H |
| 17 | Cl | H | H | H |

Examples of the pyrazole compound of the formula (A1-3) are, for instance, compounds having $R^{a3}$ and shown in Table 17.

TABLE 17

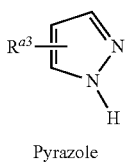

Pyrazole

| Compound No. | $R^{a3}$ | | |
|---|---|---|---|
| A1-3-1 | H | H | H |
| 2 | F | H | H |
| 3 | F | F | H |
| 4 | F | F | F |
| 5 | CF3 | H | H |
| 6 | CF3 | F | H |
| 7 | C2F5 | H | H |
| 8 | CHF2CF2 | H | H |
| 9 | CF3CHFCF2 | H | H |
| 10 | CH3 | H | H |
| 11 | CH3 | F | H |
| 12 | CH3 | CH3 | H |
| 13 | Ph | H | H |
| 14 | Ph | F | H |
| 15 | CH2OR | H | H |
| 16 | COOR | H | H |

Examples of the triazole compound of the formula (A 1-4) are, for instance, 1,2,4-triazole compounds having $R^{a4}$ and shown in Table 18.

TABLE 18

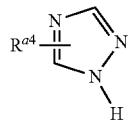

Triazole

| Compound No. | $R^{a4}$ | |
|---|---|---|
| A1-4-1 | H | H |
| 2 | F | H |
| 3 | F | F |
| 4 | CF3 | H |
| 5 | CF3 | F |
| 6 | C2F5 | H |
| 7 | CHF2CF2 | H |
| 8 | CF3CHFCF2 | H |
| 9 | CH3 | H |
| 10 | CH3 | CH3 |
| 11 | Ph | H |
| 12 | Ph | F |
| 13 | CH2OR | H |
| 14 | COOR | H |
| 15 | Cl | H |

Examples of the indole compound of the formula (A1-5) are, for instance, compounds having $R^{a5}$ and $R^{a6}$ and shown in Table 19.

TABLE 19

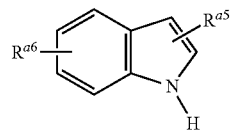

Indole

| Compound No. | $R^{a6}$ | | | | $R^{a5}$ | |
|---|---|---|---|---|---|---|
| A1-5-1 | H | H | H | H | H | H |
| 2 | F | H | H | H | H | H |
| 3 | F | F | H | H | H | H |
| 4 | H | H | H | H | F | H |
| 5 | F | H | H | H | F | H |
| 6 | H | H | H | H | CH3 | H |
| 7 | COOR | H | H | H | H | H |
| 8 | COOR | F | H | H | H | H |
| 9 | H | H | H | H | COOR | H |
| 10 | F | H | H | H | COOR | H |

Examples of the purine compound of the formula (A1-6) are, for instance, compounds having $R^{a7}$ and $R^{a8}$ and shown in Table 20.

TABLE 20

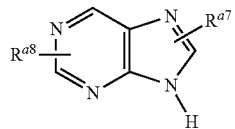

Purine

| Compound No. | $R^{a8}$ | $R^{a7}$ |
|---|---|---|
| A1-6-1 | H | H | H |
| 2 | F | H | H |
| 3 | F | F | H |
| 4 | H | H | F |

TABLE 20-continued

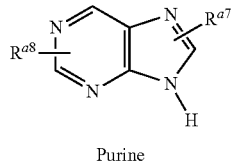

Purine

| Compound No. | $R^{a8}$ | | $R^{a7}$ |
|---|---|---|---|
| 5 | F | H | F |
| 6 | H | H | CF3 |
| 7 | H | H | CH3 |
| 8 | COOR | H | H |
| 9 | CH3 | H | H |
| 10 | Ph | H | H |
| 11 | CH3 | H | H |
| 12 | OR | H | H |

Examples of the purine derivative compound of the formula (A1-7) are, for instance, compounds having $R^{a9}$ and shown in Table 21.

TABLE 21

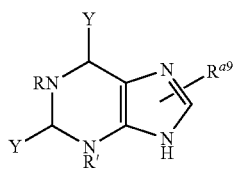

Purine Derivative
R or R' = H, CH3, Si(CH3)3,
Si(CH3)2tBu, Si(iPr)3, SiEt3,
CH2Ph, C(Ph)3, CH3CO,
COOMe, COOtBu

| Compound No. | Y | | $R^{a9}$ |
|---|---|---|---|
| A1-7-1 | =O | =O | H |
| 2 | =O | =O | CH3 |
| 3 | =O | =O | Ph |
| 4 | =O | =O | OR |
| 5 | =O | =O | F |
| 6 | =O | OR | H |
| 7 | =O | F | H |
| 8 | =O | F2 | H |
| 9 | =O | F2 | Ph |
| 10 | =O | F2 | OR |
| 11 | =O | F2 | F |

Examples of other heteroaromatic ring compound (A) are, for instance, benzimidazole compounds shown in Table 22, 1,2,3-triazole compounds shown in Table 23, tetrazole compounds shown in Table 24, isoindole compounds shown in Table 25, indazole compounds shown in Table 26, benzotriazole compounds shown in Table 27 and carbazole compounds shown in Table 28.

TABLE 22

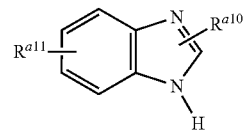

Benzimidazole

| Compound No. | $R^{a11}$ | | | | $R^{a10}$ |
|---|---|---|---|---|---|
| A1-8-1 | H | H | H | H | H |
| 2 | F | H | H | H | H |
| 3 | F | F | H | H | H |
| 4 | H | H | H | H | F |
| 5 | F | H | H | H | F |
| 6 | H | H | H | H | CF3 |
| 7 | F | H | H | H | CF3 |
| 8 | H | H | H | H | CH3 |
| 9 | COOR | H | H | H | H |
| 10 | Ph | H | H | H | H |
| 11 | H | H | H | H | COOR |
| 12 | F | H | H | H | COOR |
| 13 | F | F | H | H | COOR |

TABLE 23

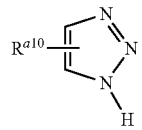

Triazole

| Compound No. | $R^{a10}$ | |
|---|---|---|
| A1-9-1 | H | H |
| 2 | F | H |
| 3 | F | F |
| 4 | CF3 | H |
| 5 | CF3 | F |
| 6 | C2F5 | H |
| 7 | CHF2CF2 | H |
| 8 | CF3CHFCF2 | H |
| 9 | CH3 | H |
| 10 | CH3 | CH3 |
| 11 | Ph | H |
| 12 | CH2OR | H |
| 13 | COOR | H |
| 14 | COOR | F |

TABLE 24

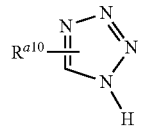

Tetrazole

| Compound No. | $R^{a10}$ |
|---|---|
| A1-10-1 | H |
| 2 | F |
| 3 | CF3 |
| 4 | C2F5 |
| 5 | CHF2CF2 |
| 6 | CF3CHFCF2 |
| 7 | CH3 |
| 8 | Ph |
| 9 | CH2OR |
| 10 | COOR |

TABLE 25

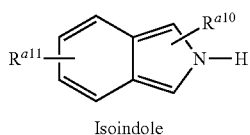

Isoindole

| Compound No. | R$^{a11}$ | | | | R$^{a10}$ | |
|---|---|---|---|---|---|---|
| A1-11-1 | H | H | H | H | H | H |
| 2 | F | H | H | H | H | H |
| 3 | F | F | H | H | H | H |
| 4 | H | H | H | H | F | H |
| 5 | H | H | H | H | F | F |
| 6 | H | H | H | H | CH3 | H |
| 7 | COOR | H | H | H | H | H |
| 8 | COOR | H | H | H | F | F |
| 9 | H | H | H | H | COOR | H |

TABLE 26

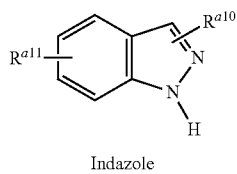

Indazole

| Compound No. | R$^{a11}$ | | | | R$^{a10}$ |
|---|---|---|---|---|---|
| A1-12-1 | H | H | H | H | H |
| 2 | F | H | H | H | H |
| 3 | F | F | H | H | H |
| 4 | H | H | H | H | F |
| 5 | F | H | H | H | F |
| 6 | H | H | H | H | CF3 |
| 7 | F | H | H | H | CF3 |
| 8 | H | H | H | H | CH3 |
| 9 | CF3 | H | H | H | H |
| 10 | COOR | H | H | H | H |
| 11 | Ph | H | H | H | H |
| 12 | H | H | H | H | COOR |

TABLE 27

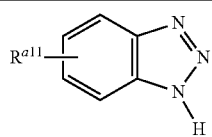

Benzotriazole

| Compound No. | R$^{a11}$ | | | |
|---|---|---|---|---|
| A1-13-1 | H | H | H | H |
| 2 | F | H | H | H |
| 3 | F | F | H | H |
| 4 | F | F | F | H |
| 5 | F | F | F | F |
| 6 | COOR | H | H | H |
| 7 | CH3 | H | H | H |
| 8 | Ph | H | H | H |
| 9 | OR | H | H | H |

TABLE 28

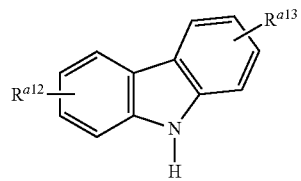

Carbazole

| Compound No. | R$^{a12}$ | | | | R$^{a13}$ | | | |
|---|---|---|---|---|---|---|---|---|
| A1-14-1 | H | H | H | H | H | H | H | H |
| 2 | F | H | H | H | H | H | H | H |
| 3 | F | H | H | H | F | H | H | H |
| 4 | F | H | H | H | F | F | H | H |
| 5 | F | F | H | H | H | H | H | H |
| 6 | F | F | F | F | F | F | F | F |
| 7 | F | F | F | F | H | H | H | H |
| 8 | CF3 | H | H | H | H | H | H | H |
| 9 | CF3 | H | H | H | CF3 | H | H | H |
| 10 | COOR | H | H | H | H | H | H | H |
| 11 | COOR | H | H | H | COOR | H | H | H |
| 12 | Ph | H | H | H | H | H | H | H |
| 13 | Ph | H | H | H | Ph | H | H | H |

The fluoroalkene (B) which is allowed to react with the heteroaromatic ring compound (A) and is represented by the formula (B):

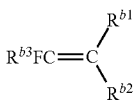

wherein R$^{b1}$, R$^{b2}$ and R$^{b3}$ are the same or different and each is H, halogen atom, a functional group or a monovalent organic group which may be substituted by halogen atom, may have ether bond and may have polymerizable group, is one being capable of undergoing addition reaction with the N—H group of the heteroaromatic ring compound (A).

It is preferable that at least one of R$^{b1}$, R$^{b2}$ and R$^{b3}$, especially at least either R$^{b1}$ or R$^{b2}$ has:
a group of the formula (b-1):

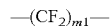

wherein m1 is an integer of 1 to 10,000,
a group of the formula (b-2):

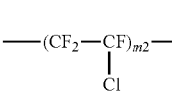

wherein m2 is an integer of 1 to 10,000, a group of the formula (b-3):

wherein m3 is an integer of 1 to 10,000,
a group of the formula (b-4):

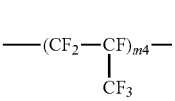

wherein m4 is an integer of 1 to 3,000, and/or
a group of the formula (b-5):

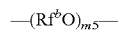

wherein $Rf^b$ is a linear or branched alkylene group having fluorine atom; m5 is an integer of 1 to 100. Especially preferable is one having the perfluoroalkylene group having a branched chain of the formula (b-4) and/or the fluoroether unit of the formula (b-5) since a liquid state is easily showed at room temperature.

In addition, the end of at least one of $R^{b1}$, $R^{b2}$ and $R^{b3}$ may be the polymerizable group (b-6). Examples of the polymerizable group are, for instance, carbon-carbon double bond, hydroxyl group, carboxyl group, amino group, isocyanate group, thiol group and thioisocyanate group, especially preferably carbon-carbon double bond.

From a different point of view, preferable examples of $R^{b1}$, $R^{b2}$ and $R^{b3}$ are those raised below.

(b1-1) Hydrogen Atom
(b1-2) Halogen Atom:

There are a chlorine atom, a fluorine atom, and a bromine atom, and a fluorine atom is especially preferable.

(b1-3) Functional Group:

There are preferably a carboxyl group (—COOH), a carboxylic acid ester group (—COOR), a nitrile group (—CN) and an amino group.

(b1-4) Organic Group:

(b1-4-1) Linear or branched alkyl group, in which a part or the whole of hydrogen atoms may be substituted by halogen atoms, preferably fluorine atoms.

(b1-4-2) Alkyl group having functional group such as a carboxyl group, hydroxyl group, a nitrile group or an amino group.

(b1-4-3) Aryl group which may be substituted.

(b1-4-4) Alkyl group having ether bond, in which a part or the whole of hydrogen atoms may be substituted by halogen atoms, preferably fluorine atoms.

(b1-4-5) Alkoxy group, in which a part or the whole of hydrogen atoms may be substituted by halogen atoms, preferably fluorine atoms.

Preferable examples of the fluoroalkene (B) are, for instance, fluorine-containing olefins such as $CF_2=CF_2$, $CF_2=CF(CF_3)$, $CF_2=C(CF_3)_2$, $CF_2=C(CF_3)Br$, $CF_2=C(CF_3)Cl$, $CF_2=C(CF_3)I$, $CF_2=CFBr$, $CF_2=CFCl$, $CF_2=CFI$, $(CF_3)_2CFCF_2CF=CF_2$, $(CF_3)_2CFCF=CFCF_3$, $(CF_3)_2C=CFCF_2CF_3$, $CF_2=CH_2$, $CF_2=CFH$, $CF_2=CF(Rf^B)_n$—$CF=CF_2$ ($Rf^B$ is $CF_2CF_2$, $CF_2CFCl$, $CF_2CF(CF_3)$ or $CF_2CH_2$; n is 0 or an integer of 1 to 1,000), $CF_2=CH(Rf^B)_n$—$CH=CF_2$ ($Rf^B$ is $CF_2CF_2$, $CF_2CFCl$, $CF_2CF(CF_3)$ or $CF_2CH_2$; n is 0 or an integer of 1 to 1,000), $CF_2=CH(Rf^B)_n$—$CF=CF_2$ (RP is $CF_2CF_2$, $CF_2CFCl$, $CF_2CF(CF_3)$ or $CF_2CH_2$; n is 0 or an integer of 1 to 1,000), $CF_2=CF(Rf^B)_n$$CF=CH_2$ ($Rf^B$ is $CF_2CF_2$, $CF_2CFCl$, $CF_2CF(CF_3)$ or to $CF_2CH_2$; n is 0 or an integer of 1 to 1,000), $CF_2=CF(Rf^B)_n$—$CH=CH_2$ (RP is $CF_2CF_2$, $CF_2CFCl$, $CF_2CF(CF_3)$ or $CF_2CH_2$; n is 0 or an integer of 1 to 1,000), $CF_2=CH(Rf^B)_n$—$CF=CH_2$ ($Rf^B$ is $CF_2CF_2$, $CF_2CFCl$, $CF_2CF(CF_3)$ or $CF_2CH_2$; n is 0 or an integer of 1 to 1,000), $CF_2=CH(RP)_n$—$CH=CH_2$ (RIB is $CF_2CF_2$, $CF_2CFCl$, $CF_2CF(CF_3)$ or $CF_2CH_2$; n is 0 or an integer of 1 to 1,000), $CF_2=CF(Rf^B)_n$—F ($Rf^B$ is $CF_2CF_2$, $CF_2CFCl$, $CF_2CF(CF_3)$ or $CF_2CH_2$; n is 0 or an integer of 1 to 1,000), $CF_2=CH(Rf^B)_n$—F ($Rf^B$ is $CF_2CF_2$, $CF_2CFCl$, $CF_2CF(CF_3)$ or $CF_2CH_2$; n is 0 or an integer of 1 to 1,000), $CF_2=CF(Rf^B)_n$$(CH_2)_m$—Br ($Rf^B$ is $CF_2CF_2$, $CF_2CFCl$, $CF_2CF(CF_3)$ or $CF_2CH_2$; n is 0 or an integer of 1 to 1,000; m is 0 or an integer of 1 to 10), $CF_2=CH(Rf^B)_n(CH_2)_m$—Br ($Rf^B$ is $CF_2CF_2$, $CF_2CFCl$, $CF_2CF(CF_3)$ or $CF_2CH_2$; n is 0 or an integer of 1 to 1,000; m is 0 or an integer of 1 to 10), $CF_2=CF(Rf^B)_n(CH_2)_m$—Cl ($Rf^B$ is $CF_2CF_2$, $CF_2CFCl$, $CF_2CF(CF_3)$ or $CF_2CH_2$; n is 0 or an integer of 1 to 1,000; m is 0 or an integer of 1 to 10), $CF_2=CH(Rf^B)_n(CH_2)_m$—Cl (RIB is $CF_2CF_2$, $CF_2CFCl$, $CF_2CF(CF_3)$ or $CF_2CH_2$; n is 0 or an integer of 1 to 1,000; m is 0 or an integer of 1 to 10), $CF_2=CF(Rf^B)_n(CH_2)_m$—I ($Rf^B$ is $CF_2CF_2$, $CF_2CFCl$, $CF_2CF(CF_3)$ or $CF_2CH_2$; n is 0 or an integer of 1 to 1,000; m is 0 or an integer of 1 to 10), $CF_2=CH(Rf^B)_n(CH_2)_m$—I ($Rf^B$ is $CF_2CF_2$, $CF_2CFCl$, $CF_2CF(CF_3)$ or $CF_2CH_2$; n is 0 or an integer of 1 to 1,000; in is 0 or an integer of 1 to 10), $CF_2=CF(Rf^B)_n(CH_2)_m$—$CH_2OH$ ($Rf^B$ is $CF_2CF_2$, $CF_2CFCl$, $CF_2CF(CF_3)$ or $CF_2CH_2$; n is 0 or an integer of 1 to 1,000; m is 0 or an integer of 1 to 10), $CF_2=CH(Rf^B)_n(CH_2)_m$—$CH_2OH$ ($Rf^B$ is $CF_2CF_2$, $CF_2CFCl$, $CF_2CF(CF_3)$ or $CF_2CH_2$; n is 0 or an integer of 1 to 1,000; m is 0 or an integer of 1 to 10), $CF_2=CF(Rf^B)_n(CH_2)_m$—COOH ($Rf^B$ is $CF_2CF_2$, $CF_2CFCl$, $CF_2CF(CF_3)$ or $CF_2CH_2$; n is 0 or an integer of 1 to 1,000; m is 0 or an integer of 1 to 10), and $CF_2=CH(Rf^B)_n(CH_2)_m$—COOH ($Rf^B$ is $CF_2CF_2$, $CF_2CFCl$, $CF_2CF(CF_3)$ or $CF_2CH_2$; n is 0 or an integer of 1 to 1,000; m is 0 or an integer of 1 to 10); fluorine-containing vinyl ethers such as $CF_2=CFOR$ (R is an alkyl group which may be substituted by halogen atom), $CF_2=C(CF_3)OR$ (R is an alkyl group which may be substituted by halogen atom), $(CF_3)_2C=CFOR$ (R is an alkyl group which may be substituted by halogen atom), $CF_2=CF[OCF_2CF(CF_3)]_nOC_3F_7$ (n is 0 or an integer of 1 to 20), $CF_2=CF[OCF_2CF(CF_3)]_{10}(CF_2)_mCF=CF_2$ (n is 0 or an integer of 1 to 20; m is 0 or an integer of 1 to 20), $CF_2=CF[OCF_2CF(CF_3)]_nO(CF_2)_mCYXCFZX$ (X is H or halogen atom; Y is H, F or $CF_3$; Z is H, F or $CF_3$; n is 0 or an integer of 1 to 20; m is 0 or an integer of 1 to 20), $CFZ=CY(CF_2)_mO[CF(CF_3)CF_2O]_nCF(CF_3)COOR$ (Y is H, F or $CF_3$; Z is H, F or $CF_3$; n is 0 or an integer of 1 to 20; m is 0 or an integer of 1 to 20), $CF_2=CF[OCF_2CF(CF_3)]_nO(CF_2)_mCF=CH_2$ (n is 0 or an integer of 1 to 20; m is 0 or an integer of 1 to 20), $CF_2=CF[OCF_2CF(CF_3)]_nO(CF_2)_mCF_2CH_2I$ (n is 0 or an integer of 1 to 20; m is 0 or an integer of 1 to 20), $CF_2=CF[OCF_2CF(CF_3)]_nOCF_2CF_2SO_3M$ (M is Li, Na, K, Rb, Cs, BeCl, MgCl, MgBr, MgI, $MgNO_3$, $MgBF_4$, $MgPF_6$, CaCl, CaBr, CaI, $CaNO_3$, $CaBF_4$, $CaPF_6$, $FeCl_2$, $FeBr_2$, $FeI_2$, CoCl, CoBr, CoI, ZnCl, ZnBr, ZnI, NiCl, NiBr, NiI, Ag, Cu, CuCl, CuBr, CuI, $AuCl_2$, $AuBr_2$ or $AuI_2$; n is 0 or an integer of 1 to 20), $CF_2=CF[OCF_2CF(CF_3)]_nO(CF_2)_mCO_2R$ (m is an integer of 1 to 10; n is 0 or an integer of 1 to 20; R is an alkyl group which may be substituted by hydrogen atom or halogen atom), $CF_2=CF[OCF_2CF(CF_3)]_nO(CF_2)_mCH_2OR$ (m is an integer of 1 to 10; n is 0 or an integer of 1 to 20; R is hydrogen atom or an alkyl group which may be substituted by hydrogen atom or halogen atom) and $CF_2=CF[OCF_2CF(CF_3)]_nO(CF_2)_m$—I (m is an integer of 1 to 10; n is 0 or an integer of 1 to 20); fluorine-containing unsaturated carboxylic acids or esters thereof such as $CF_2=CY(CX_2)_nCOOR$ (X is H or F; Y is H, F or $CF_3$; n is 0 or an integer of 1 to 20; R is an alkyl group which may be substituted by hydrogen atom or halogen atom); fluorine-containing unsaturated sulfonates such as $CF_2=CF(CX^2)_nCH_2OR$ (X is H or F; n is 0 or an integer of 1 to 20; R is hydrogen atom or an alkyl group which may be substituted by hydrogen atom or halogen atom), $CF_2=CY$—$C_6X_4$—$CO_2R$ (X is H or F; Y is H, F or $CF_3$; R is an alkyl group which may be substituted by hydrogen atom or halogen atom) and $CF_2=CY$—$C_6X_4$—$SO_3M$ (X is H or F; Y is H, F or $CF_3$; M is Li, Na, K, Rb, Cs, BeCl, MgCl, MgBr, MgI, $MgNO_3$, $MgBF_4$, $MgPF_6$, CaCl, CaBr, CaI, $CaNO_3$, $CaBF_4$, $CaPF_6$, $FeCl_2$, $FeBr_2$, $FeI_2$, CoCl, CoBr, CoI, ZnCl, ZnBr, ZnI, NiCl, NiBr, NiI, Ag, Cu, CuCl, CuBr, CuI, $AuCl_2$, $AuBr_2$ or $AuI_2$), and $CF_2=CY$—$C_6X_4$—$CH_2OR$ (X is H or F; Y is H, F or $CF_3$; R is hydrogen atom or an alkyl group which may be substituted by hydrogen atom or halogen atom).

In this method of synthesis, the heteroaromatic ring compound (A) having a N—H group is allowed to react with the fluoroalkene (B) in the presence or absence of alkali metal.

In the case where the reaction is advanced in the presence of alkali metal, a heteroaromatic ring compound can be induced to a form of its alkali metal salt as described, for example, in D. C. England et al (J. Am. Chem. Soc., 82, pp. 5116-5122 (1960)), JP2005-530894A and U.S. Pat. No. 2,861,990, or can be subjected to reaction in the presence of alkali metal.

In the case where the reaction is advanced in the absence of alkali metal, metal which is made absent in the reaction system is alkali metal and also presence of other metal which can participate in the reaction directly or catalytically is not necessary. It is not especially necessary that metal is present even in a form of salt or complex.

The reaction may be carried out in a solution of the heteroaromatic ring compound (A) or in a molten state of the heteroaromatic ring compound (A).

In the case where the reaction is carried out in s solution, the reaction proceeds by making the heteroaromatic ring compound (A) in a homogeneous liquid state even without using a catalyst.

Examples of a usable reaction solvent are, for instance, diethyl ether, t-butyl methyl ether, diisopropyl ether, dibutyl ether, tetrahydrofuran, dioxane, dimethoxymethane, dimethoxyethane, diglyme, triglyme, tetraglyme, N,N-dimethylformamide, N,N-dimethylacetamide, N-methylpyrrolidone, ethyl acetate, methyl acetate, propyl acetate, butyl acetate, dimethyl sulfoxide, sulfolane, hexamethylphosphoric triamide, benzene, toluene, xylene, chloroform, methylene chloride, dichloroethane, trichloroethane, dichloropentafluoropropane, dichlorofluoroethane, trichlorotrifluoroethane, tetrachlorohexafluorobutane, dichlorooctafluorobutane, pentachloropentafluorohexane, dibromotetrafluoroethane, perfluorohexane, perfluoro(butyltetrahydrofuran) and perfluorotributylamine. From the viewpoint of solubility of the heteroaromatic ring compound, diethyl ether, t-butyl methyl ether, dibutyl ether, diisopropyl ether, tetrahydrofuran, dioxane, dimethoxyethane, diglyme, triglyme, tetraglyme, N,N-dimethylformamide, N,N-dimethylacetamide, N-methylpyrrolidone, ethyl acetate, methyl acetate, propyl acetate, butyl acetate, dimethyl sulfoxide and sulfolane are preferable.

A concentration of the solution may be optionally selected depending on kind of the heteroaromatic ring compound, kind of a solvent, kind of the fluoroalkene and a reaction temperature. As far as a part thereof is homogeneously dissolved, a higher concentration is preferable. The concentration is preferably not less than 30% by mass, further preferably not less than 60% by mass.

A reaction pressure is not limited particularly. The reaction proceeds at any pressure as far as the fluoroalkene can contact with the solution containing the heteroaromatic ring compound.

It is preferable that the reaction is carried out in the absence of a solvent with the heteroaromatic ring compound (A) being in a molten state, from the viewpoint that no operation for separating a solvent is necessary and production cost is decreased.

The molten state of the heteroaromatic ring compound encompasses not only a molten state of the heteroaromatic ring compound alone but also a molten state of the heteroaromatic ring compound alone at a temperature less than its melting point by blending a melting point depressor.

Examples of a melting point depressor are the above-mentioned reaction solvents which are used in an amount being capable of dissolving or swelling the heteroaromatic ring compound.

In the case where the reaction is carried out in a molten state of the compound, a reaction temperature is not less than a melting temperature (or a decreased melting point) of the heteroaromatic ring compound (A) and a temperature less than its decomposition temperature.

A reaction pressure is not limited particularly. The reaction proceeds at any pressure as far as the fluoroalkene can contact with the molten substance containing the heteroaromatic ring compound.

A method of supplying the fluoroalkene (B) to a reaction system is not limited particularly. For example, there can be preferably employed a method of introducing gasified fluoroalkene under pressure to the solution of the heteroaromatic ring compound (A) or to the heteroaromatic ring compound (A) in a molten state, or a method of adding dropwise fluoroalkene to the solution of the heteroaromatic ring compound (A) or to the heteroaromatic ring compound (A) in a molten state.

In the case where the reaction product has a polymerizable carbon-carbon double bond, it can be used as it is as the fluorine-containing ethylenic monomer (m).

However even in the case where the reaction product of the compound (A) and the fluoroalkene (B) does not have a polymerizable carbon-carbon double bond, a reaction for forming (or inducing) a polymerizable carbon-carbon double bond may be carried out.

Examples of such a reaction for forming a polymerizable carbon-carbon double bond are, for instance, the following reactions.

(1) Dehalogenation Reaction

The carbon-carbon double bond can be formed by using, as a starting material, a vic-halide represented by the formula (P):

wherein $R^{b1}$, $R^{b2}$ and $R^{b3}$ are the same or different and each is H, halogen atom, a functional group or a monovalent organic group which may be substituted by halogen atom, may have ether bond and may have a polymerizable group; $L^1$ and $L^2$ are the same or different and each is halogen atom ($L^1$ and $L^2$ are not F at the same time), and allowing a metal atom selected from the group consisting of Zn, Li, Na, K, Mg, Ca, Hg and Cu or an organometallic compound such as alkyl lithium, alkyl magnesium halide or alkyl zinc to react with the vic-halide of the formula (P) in an amount of 1 equivalent or more to the vic-halide in the presence or absence of a solvent.

(2) Decarbonation Reaction

The carbon-carbon double bond can be formed by subjecting a carboxylic acid salt as a starting material represented by the formula (Q):

wherein $R^{b1}$, $R^{b2}$ and $R^{b3}$ are the same or different and each is H, halogen atom, a functional group or a monovalent organic group which may be substituted by halogen atom, may have ether bond and may have a polymerizable group; one of $L^1$ and $L^2$ is COOM (M is Li, Na, K, Cs, MgCl, MgBr, MgI, MgNO₃, CaCl, ZnCl, ZnBr, Ag, Cu, CuCl, CuBr, NH₄, tetramethylammonium, tetraethylammonium, tetrapropylammonium, tetrabutylammonium, trimethylammonium, triethylammonium, tripropylammonium or tributylammonium), and another one is halogen atom, to thermal decomposition in the presence or absence of a solvent.

(3) Dehydrohalogenation Reaction

The carbon-carbon double bond can be formed by using, as a starting material, a halide represented by the formula (R):

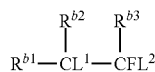
(R)

wherein $R^{b1}$, $R^{b2}$ and $R^{b3}$ are the same or different and each is H, halogen atom, a functional group or a monovalent organic group which may be substituted by halogen atom, may have ether bond and may have a polymerizable group; one of $L^1$ and $L^2$ is hydrogen atom, and another one is halogen atom, and allowing the halide to react, in the presence or absence of a solvent, with a hydroxide of alkali metal or alkaline earth metal, a carbonate of alkali metal or alkaline earth metal, a salt of alkali metal halide or alkaline earth metal halide, an oxide of alkali metal or alkaline earth metal, a metallic oxide such as ZnO, CuO, Ag₂O, ZrO, Fe₂O₃, Al₂O₃ or SiO₂, an alkoxide of alkali metal or alkaline earth metal, a carboxylic acid salt of alkali metal or alkaline earth metal, an alkylamide of alkali metal or alkaline earth metal, an amine compound such as trimethylamine, triethylamine, tributylamine, diethylamine or diisopropylamine, or an organometallic compound such as alkyl lithium or alkyl magnesium halide, in an amount of 1 equivalent or more to the halide of the formula (R).

Next, the Preparation Process 2 (high molecular reaction method) is explained below.

The high molecular reaction method is a method of preparing a fluorine-containing homopolymer or copolymer which does not have a heteroaromatic ring-containing group Y and then allowing this fluorine-containing polymer (C) to react with a heteroaromatic ring compound (D) having a N—H group in its ring.

For allowing the fluorine-containing polymer to react with the heteroaromatic ring compound having a N—H group in its ring, there can be employed, for example, a method of introducing a carbon-carbon double bond to the side chain and/or the end of the trunk chain of the fluorine-containing polymer and then allowing this carbon-carbon double bond to react, in the presence or absence of alkali metal, with the heteroaromatic ring compound (D) having a N—H group in its ring exemplified infra.

In this introduction method, example of the fluorine-containing polymer having a carbon-carbon double bond in its side chain and/or its end of the trunk chain is a fluorine-containing polymer (C) represented by the formula (C):

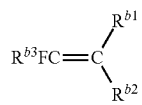
(C)

wherein $R^{b1}$ is a polymer chain; $R^{b2}$ and $R^{b3}$ are the same or different and each is H, halogen atom, a functional group or a monovalent organic group which may be substituted by halogen atom, may have ether bond and may have a polymerizable group.

It is preferable that at least one of $R^{b1}$, $R^{b2}$ and $R^{b3}$, especially at least either $R^{b1}$ or $R^{b2}$ has:
a group of the formula (b-1):

—(CF₂)$_{m1}$— wherein m1 is an integer of 1 to 10,000,
a group of the formula (b-2):

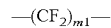

wherein m2 is an integer of 1 to 10,000,
a group of the formula (b-3):

—(CF₂—CH₂)$_{m3}$— wherein m3 is an integer of 1 to 10,000,
a group of the formula (b-4):

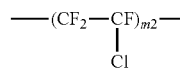

wherein m4 is an integer of 1 to 3,000, and/or
a group of the formula (b-5):

—(Rf$^b$O)$_{m5}$— wherein Rf$^b$ is a linear or branched alkylene group having fluorine atom; m5 is an integer of 1 to 100. Especially preferable is one having the perfluoroalkylene group having a branched chain of the formula (b-4) and/or the fluoroether unit of the formula (b-5) since a liquid state is easily showed at room temperature.

In addition, the end of $R^{b2}$ may be hydroxyl group, carboxyl group, amino group, isocyanate group, thiol group or thioisocyanate group.

From a different point of view, preferable examples of $R^{b2}$ are those raised below.

(b1-1) Hydrogen Atom
(b1-2) Halogen Atom:

There are a chlorine atom, a fluorine atom, and a bromine atom, and a fluorine atom is especially preferable.

(b1-3) Functional Group:

There are preferably a carboxyl group (—COOH), a carboxylic acid ester group (—COOR), a nitrile group (—CN) and an amino group.

(b1-4) Organic Group:

(b1-4-1) Linear or branched alkyl group, in which a part or the whole of hydrogen atoms may be substituted by halogen atoms, preferably fluorine atoms.

(b1-4-2) Alkyl group having functional group such as a carboxyl group, a hydroxyl group, a nitrile group or an amino group.

(b1-4-3) Aryl group which may be substituted.
(b1-4-4) Alkyl group having ether bond, in which a part or the whole of hydrogen atoms may be substituted by halogen atoms, preferably fluorine atoms.
(b1-4-5) Alkoxy group, in which a part or the whole of hydrogen atoms may be substituted by halogen atoms, preferably fluorine atoms.

Examples of the fluorine-containing polymer (C) having carbon-carbon double bond in its side chain and/or at an end of its trunk chain are fluorine-containing polymers disclosed in WO02/072706.

The fluorine-containing polymer disclosed in WO02/072706 is the same as the fluorine-containing polymer of the present invention represented by the formula (1), in which the heteroaromatic ring-containing group Y is a carbon-carbon double bond $Y^1$, and the polymer is a fluorine-containing polymer (Cl) having a number average molecular weight of 500 to 1,000,000 and represented by the formula (C1):

    (C1)

in which the structural unit Mc is a structural unit derived from a fluorine-containing ethylenic monomer and represented by the formula (Mc):

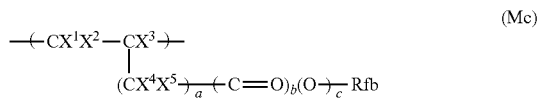    (Mc)

wherein $X^1$ and $X^2$ are the same or different and each is H or F; $X^3$ is H, F, $CH_3$ or $CF_3$; $X^4$ and $X^5$ are the same or different and each is H, F or $CF_3$; $Rf^b$ is an organic group in which 1 to 3 $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit N is a structural unit derived from a monomer copolymerizable with the fluorine-containing ethylenic monomer providing the structural unit Mc, and the structural unit Mc and the structural unit N are contained in amounts of from 0.1 to 100% by mole and from 0 to 99.9% by mole, respectively.

In this fluorine-containing polymer (C1), the structural unit Mc is a structural unit obtained by substituting the heteroaromatic ring-containing group of $CHZ^2CF_2$—Y of the structural unit M explained in the fluorine-containing polymer (1) by the carbon-carbon double bond $Y^1$, and except that, the afore-mentioned explanations of the structural unit M and the examples thereof can be cited.

In addition, the structural unit N and examples thereof are the same as those of the structural unit N of the formula (1), and also the monomer (n) and examples thereof are the same as those of the monomer (n) explained supra.

Examples of the carbon-carbon double bond $Y^1$ are, for instance, those exemplified below.
—CF=$CF_2$, —CH=$CF_2$; —CH=CHF, —CF=CF($CF_3$), —C($CF_3$)=$CF_2$, —C($CF_3$)=CF($CF_3$), —CCl=$CF_2$, —CF=CFCl, —CF=CFOR(R is an alkyl group which may be substituted by halogen atom), —CF=C($CF_3$)OR(R is an alkyl group which may be substituted by halogen atom), —C(OR)=$CF_2$ (R is an alkyl group which may be substituted by halogen atom).

In the fluorine-containing polymer (Cl), nonlimiting examples of especially preferable monomer usable for introducing a carbon-carbon double bond to its side chain are, for instance,
$CX_2$=CY($Rf^B$)$_n$CF=$CF_2$ (X is H or F; Y is H, F, or $CF_3$; $Rf^B$ is $CF_2$, $CH_2$, $CF_2CFCl$, $CF_2CF(CF_3)$ or $CF_2CH_2$; n is 0 or an integer of 1 to 20),
$CX_2$=CY($Rf^B$)$_n$—CH=$CF_2$ (X is H or F; Y is H, F or $CF_3$; $Rf^B$ is $CF_2$, $CH_2$, $CF_2CFCl$, $CF_2CF(CF_3)$ or $CF_2CH_2$; n is 0 or an integer of 1 to 20),
$CH_2$=CH($CF_2CH_2$)$_p$($CF_2$)$_n$($CH_2CF_2$)$_q$CH=$CF_2$ (n is 0 or an integer of 1 to 10; p is 0 or an integer of 1 to 10; q is 0 or an integer of 1 to 10),
$CH_2$=CH($CF_2CH_2$)$_p$($CF_2$)$_n$($CH_2CF_2$)$_q$CF=$CF_2$ (n is 0 or an integer of 1 to 10; p is 0 or an integer of 1 to 10; q is 0 or an integer of 1 to 10),
$CF_2$=CF($CF_2CH_2$)$_p$($CF_2$)$_n$($CH_2CF_2$)$_q$CH=$CF_2$ (n is 0 or an integer of 1 to 10; p is 0 or an integer of 1 to 10; q is 0 or an integer of 1 to 10),
$CF_2$=CF[$OCF_2CF(CF_3)$]$_n$O($CF_2$)$_m$CF=$CF_2$ (m is 0 or an integer of 1 to 10; n is 0 or an integer of 1 to 10),
$CF_2$=CF[$OCF_2CF(CF_3)$]$_n$O($CF_2$)$_m$CH=$CF_2$ (m is 0 or an integer of 1 to 10; n is 0 or an integer of 1 to 10),
$CF_2$=CF[$OCF_2CF(CF_3)$]$_n$O($CF_2$)$_m$CF=$CH_2$ (m is 0 or an integer of 1 to 10; n is 0 or an integer of 1 to 10),
$CF_2$=CF($OCF_2CF_2$)$_n$O($CF_2$)$_m$CF=$CF_2$ (m is 0 or an integer of 1 to 10; n is 0 or an integer of 1 to 10),
$CH_2$=CHO($CH_2$)$_m$($CF_2$)$_n$CF=$CF_2$ (m is 0 or an integer of 1 to 4; n is 0 or an integer of 1 to 20),
$CH_2$=CHO($CH_2$)$_m$($CF_2CH_2$)$_p$($CF_2$)$_n$($CH_2CF_2$)$_q$CH=$CF_2$ (m is 0 or an integer of 1 to 4; n is 0 or an integer of 1 to 10; p is 0 or an integer of 1 to 10; q is 0 or an integer of 1 to 10),
$CH_2$=$CHOCH_2CF(CF_3)$—[$OCF_2CF(CF_3)$]$_n$O($CF_2$)$_m$CF=$CF_2$ (m is 0 or an integer of 1 to 10; n is 0 or an integer of 1 to 10),
$CX_2$=$CYCO_2$($CH_2$)$_m$—($Rf^B$)$_n$CZ=$CF_2$ (X is H or F; Y is H, F, $CH_3$ or $CF_3$; Z is H, F or $CF_3$; $Rf^B$ is $CF_2$, $CF_2CFCl$, $CF_2CF(CF_3)$ or $CF_2CH_2$; m is an integer of 1 to 4; n is 0 or an integer of 1 to 20),
$CX_2$=CY—$C_6Z_4$—($CH_2$)$_m$($Rf^B$)$_n$CZ=$CF_2$ (X is H or F; Y is H, F, $CH_3$ or $CF_3$; Z is H or F; $Rf^B$ is $CF_2$, $CH_2$, $CF_2CFCl$, $CF_2CF(CF_3)$ or $CF_2CH_2$; m is 0 or an integer of 1 to 4; n is 0 or an integer of 1 to 20),
$CX_2$=CY—$C_6Z_4$—$CO_2$-($CH_2$)$_m$($Rf^B$)$_n$CZ=$CF_2$ (X is H or F; Y is H, F, $CH_3$ or $CF_3$; Z is H or F; $Rf^B$ is $CF_2$, $CH_2$, $CF_2CFCl$, $CF_2CF(CF_3)$ or $CF_2CH_2$; m is an integer of 1 to 4; n is 0 or an integer of 1 to 20), and
$CX_2$=CY—$C_6Z_4$—O—($CH_2$)$_m$($Rf^B$)$_n$CZ=$CF_2$ (X is H or F; Y is H, F, $CH_3$ or $CF_3$; Z is H or F; $Rf^B$ is $CF_2$, $CH_2$, $CF_2CFCl$, $CF_2CF(CF_3)$ or $CF_2CH_2$; m is an integer of 1 to 4; n is 0 or an integer of 1 to 20).

Also, in the fluorine-containing polymer (Cl), for introducing a carbon-carbon double bond to a polymer end, the following methods can be employed.
(c-1) Esterification reaction on an alcohol end
(c-2) Esterification reaction on a carboxylic acid end
(c-3) Decarbonation reaction on a carboxylic acid end
(c-4) Dehalogenation reaction on 1,2-dihalogen end
(c-5) Wittig reaction on a ketone end Out of these, the esterification reaction (c-1) on an alcohol end is preferable from the viewpoint of moderate reaction conditions, yield and the number of processing steps.

A represented method of the method (c-1) is a method of synthesizing a fluorine-containing polymer by copolymerization of a hydroxyl-containing monomer and then allowing the polymer to react with a carboxylic acid halide having a carbon-carbon double bond.

Examples of a hydroxyl-containing monomer for synthesizing a hydroxyl-containing polymer are as follows.

$CX_2=CY(Rf^B)_n-CH_2OH$ (X is H or F; Y is H, F, $CH_3$ or $CF_3$; $Rf^B$ is $CF_2$, $CH_2$, $CF_2CFCl$, $CF_2CF(CF_3)$ or $CF_2CH_2$; n is 0 or an integer of 1 to 20), $CH_2=CH(CF_2CH_2)_p(CF_2)_n(CH_2CF_2)_q(CH_2)_m-CH_2OH$ (n is 0 or an integer of 1 to 10; m is 0 or an integer of 1 to 3; p is 0 or an integer of 1 to 10; q is 0 or an integer of 1 to 10), $CF_2=CF(CF_2CH_2)_p(CF_2)_n(CH_2CF_2)_q(CH_2)_m-CH_2OH$ (n is 0 or an integer of 1 to 10; m is 0 or an integer of 1 to 3; p is 0 or an integer of 1 to 10; q is 0 or an integer of 1 to 10), $CF_2=CF[OCF_2CF(CF_3)]_nO(CF_2)_mCH_2OH$ (m is an integer of 1 to 10; n is 0 or an integer of 1 to 10), $CF_2=CF(OCF_2CF_2)_nO(CF_2)_mCH_2OH$ (m is an integer of 1 to 10; n is an integer of 1 to 10), $CH_2=CFCF_2O[CF(CF_3)CF_2O]_nCF(CF_3)CH_2OH$ (n is 0 or an integer of 1 to 10), $CF_2=CF(CF_2)_m[OCF(CF_3)CF_2O]_nCF(CF_3)CH_2OH$ (m is an integer of 1 to 10; n is 0 or an integer of 1 to 10), $CX_2=CYO(CH_2)_l-(CF_2)_m-(CH_2)_nOH$ (X is H or F; Y is H, F, $CH_3$ or $CF_3$; l is 0 or an integer of 1 to 4; m is 0 or an integer of 1 to 20; n is an integer of 1 to 4), $CX_2=CYCO_2(CH_2)_l-(CF_2)_m-(CH_2)_nOH$ (X is H or F; Y is H, F, $CH_3$ or $CF_3$; l is 0 or an integer of 1 to 4; m is 0 or an integer of 1 to 20; n is an integer of 1 to 4), $CX_2=CZ^1CO_2-(CH_2)_l(Rf^B)_m(CF_2)_n(Rf^B)_m(CH_2)_nOH$ (X is H or F; $Z^1$ is H, F, $CH_3$ or $CF_3$; $Rf^B$ is $CF_2CFCl$, $CF_2CF(CF_3)$ or $CF_2CH_2$; n is 0 or an integer of 1 to 10; m is 0 or an integer of 1 to 15; l is an integer of 1 to 4), $CX_2=CZ^1OCO_2-(CH_2)_l(Rf^B)_m(CF_2)_n(Rf^B)_m(CH_2)_nOH$ (X is H or F; $Z^1$ is H, F, $CH_3$ or $CF_3$; $Rf^B$ is $CF_2CFCl$, $CF_2CF(CF_3)$ or $CF_2CH_2$; n is 0 or an integer of 1 to 10; m is 0 or an integer of 1 to 15; l is an integer of 1 to 4), $CX_2=CY-C_6Z_4-O-H$ (X is H or F; Y is H, F, $CH_3$ or $CF_3$; Z is H or F), $CX_2=CY-C_6Z_4-(CH_2)_l-(CF_2)_m-(CH_2)_nOH$ (X is H or F; Y is H, F, $CH_3$ or $CF_3$; Z is H or F; l is 0 or an integer of 1 to 4; m is 0 or an integer of 1 to 20; n is an integer of 1 to 4), $CX_2=CY-C_6Z_4-O-(CH_2)_l-(CF_2)_m-(CH_2)_nOH$ (X is H or F; Y is H, F, $CH_3$ or $CF_3$; Z is H or F; l is 0 or an integer of 1 to 4; m is 0 or an integer of 1 to 20; n is an integer of 1 to 4), $CX_2=CY-C_6Z_4-CO_2(CH_2)_l-(CF_2)_m-(CH_2)_nOH$ (X is H or F; Y is H, F, $CH_3$ or $CF_3$; Z is H or F; l is 0 or an integer of 1 to 4; m is 0 or an integer of 1 to 20; n is an integer of 1 to 4)

In addition, examples of a carboxylic acid halide having a carbon-carbon double bond which is allowed to react with a hydroxyl-containing polymer are as follows.

$CF_2=CX(Rf^B)_nCOY$ (X is H, F, $CH_3$ or $CF_3$; Y is halogen atom; $Rf^B$ is $CF_2$, $CH_2$, $CF_2CFCl$, $CF_2CF(CF_3)$ or $CF_2CH_2$; n is 0 or an integer of 1 to 20), $CF_2=CX-C_6Z_4-COY$ (X is H, F, $CH_3$ or $CF_3$; Y is halogen atom; Z is H or F), and $CF_2=CXO-C_6Z_4-COY$ (X is H, F, $CH_3$ or $CF_3$; Y is halogen atom; Z is H or F)

Example of the heteroaromatic ring compound (D) having a N—H group in its ring which is subjected to addition reaction with the carbon-carbon double bond of the fluorine-containing polymer (C1) to introduce a heteroaromatic ring-containing group to the fluorine-containing polymer (C1) is a heteroaromatic ring compound (D1) represented by the formula (D1):

wherein

is a moiety forming a heteroaromatic ring together with a nitrogen atom, and the whole or a part of its hydrogen atoms may be replaced by the same or different organic groups.

There can be used, as this compound (D1), the afore-mentioned compounds explained in the heteroaromatic ring compound (A) having a N—H group which is used for synthesizing the fluorine-containing ethylenic monomer (m).

In the high molecular reaction method, the heteroaromatic ring compound (D) having a N—H group is allowed to react with the fluorine-containing polymer (C) in the presence or absence of alkali metal. There can be employed, as a method and conditions of this reaction, the afore-mentioned method and conditions used in the synthesis of the fluorine-containing ethylenic monomer (m), and therefore explanations of them are omitted.

According to such a high molecular reaction method (Preparation Process 2), an optional kind of heteroaromatic ring group Y can be introduced to an optional position in an optional amount.

Especially preferable examples of the fluorine-containing polymer (1) of the present invention obtained by the Preparation Process 1 (polymerization method) and Preparation Process 2 (high molecular reaction method) are those having Rf exemplified below from the viewpoint of easy synthesis and availability.

A fluorine-containing polymer having an imidazole skeleton represented by the structural formula (1-1):

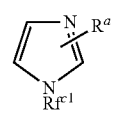

wherein $R^a$s are the same or different, and each is halogen atom, a functional group or an organic group and may be present or may not be present, and when $R^a$s are present, the whole or a part of hydrogen atoms of the heteroaromatic ring are substituted by them; $Rf_{c1}$ is a polymer residue defined by deleting Y from the formula (1).

$R^a$s are the same or different, and each is preferably H, F, Cl, —$CH_3$, —$C_2H_5$, —$C_3H_7$, —$C_4H_9$, —COOR, —CN, -Ph (phenyl), —$CH_2CN$, —$CH_2COOR$, —$CH_2SR$, —$CH_2CH(NR_2)COOR$, —$(CF)_nF$, —$(CF)_nH$, —$CF_2CF(CF_3)H$ or —$(CF_2CH_2)_nH$, where Rs are the same or different and each is a hydrocarbon group having 1 to 10 carbon atoms; n is an integer of 1 to 10,000.

$Rf^{c1}$ is preferably one represented by the formula (c-1):

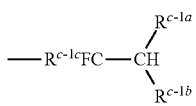

wherein $R^{c-1a}$ is a polymer residue defined by deleting Rf from the formula (1); $R^{c-1b}$ is F, —$(CF_2)_qF$, —$O(CF_2)_qF$, —$CF(CF_3)_2$, —$(OCF_2CF(CF_3))_p$—$O(CF_2)_qF$, —$(OCF_2CF(CF_3))_p$—$OCF_2CF_2CF=CH_2$, —$(OCF_2CF(CF_3))_p$—$OCF_2CF_2CF_2CH_2I$, —$(OCF_2CF(CF_3))_p$—$O(CF_2)_qCFClCF_2Cl$, —$(OCF_2CF(CF_3))_p$—$O(CF_2)_qCF_2I$, —$(CF_2)_q$—$(OCF(CF_3)CF_2)_pOCF(CF_3)COOR$, —$(CF_2)_q$—$(OCF(CF_3)CF_2)_pOCF(CF_3)CH_2OR$, —$(CF_2CF_2)_l$—$(CF_2CF(CF_3))_m$—$(CF_2CH_2)_n$-A, —$(OCF_2CF(CF_3))_x$—$(OCF_2CF_2)_y$—$(OCF_2CF_2CF_2)_z$—$(OCF_2CF_2CH_2)_w$-A, —$CF_2CHFOCF_2CF_2CF=CF_2$—B, or —$CF_2CH_2$—$(CF_2)_n$—$CH_2CF_2$—B, where Rs are the same or different, and each is a monovalent hydrocarbon group having 1 to 10 carbon groups; A is H, F or a polymer end group; B is a residue defined by deleting $Rf^{c1}$ group from the formula (1-1); q is an integer of 1 to 9 independently in each formula; p is 0 or an integer of 1 to 20 independently in each formula; r is an integer of 1 to 10,000; l, m and n are independently 0 or an integer of 1 to 5,000, and the sum of l, m and n is an integer of 10 to 10,000; w, x, y and z are independently 0 or an integer of 1 to 30, and the sum of w, x, y and z is an integer of 3 to 60; $R^{c-1c}$ is F, H, —$CF_3$, —$CF(CF_3)_2$ or —$CF_2CF(CF_3)_2$.

A fluorine-containing polymer having a pyrrole skeleton represented by the structural formula (1-2):

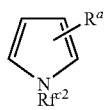

wherein $R^a$s are the same or different, and each is halogen atom, a functional group or an organic group and may be present or may not be present, and when $R^a$s are present, the whole or a part of hydrogen atoms of the heteroaromatic ring are substituted by them; $Rf^{c2}$ is a polymer residue defined by deleting Y from the formula (1).

Preferable examples of $R^a$ and $Rf^{c2}$ are the same as those of $R^a$ and $Rf^{c1}$ of the structural formula (1-1), respectively.

A fluorine-containing polymer having a pyrazole skeleton represented by the structural formula (1-3):

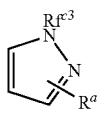

wherein $R^a$s are the same or different, and each is halogen atom, a functional group or an organic group and may be present or may not be present, and when $R^a$s are present, the whole or a part of hydrogen atoms of the heteroaromatic ring are substituted by them; $Rf^{c3}$ is a polymer residue defined by deleting Y from the formula (1).

Preferable examples of $R^a$ and $Rf^{c3}$ are the same as those of $R^a$ and $Rf^{c1}$ of the structural formula (1-1), respectively.

A fluorine-containing polymer having a triazole skeleton represented by the structural formula (1-4):

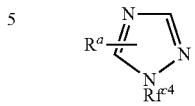

wherein $R^a$s are the same or different, and each is halogen atom, a functional group or an organic group and may be present or may not be present, and when $R^a$s are present, the whole or a part of hydrogen atoms of the heteroaromatic ring are substituted by them; $Rf^{c4}$ is a polymer residue defined by deleting Y from the formula (1).

Preferable examples of $R^a$ and $Rf^{c4}$ are the same as those of $R^a$ and $Rf^{c1}$ of the structural formula (1-1), respectively.

A fluorine-containing polymer having an indole skeleton represented by the structural formula (1-5):

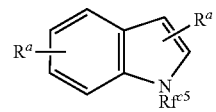

wherein $R^a$s are the same or different, and each is halogen atom, a functional group or an organic group and may be present or may not be present, and when $R^a$s are present, the whole or a part of hydrogen atoms of the heteroaromatic ring and/or the aromatic ring are substituted by them; $Rf^{c5}$ is a polymer residue defined by deleting Y from the formula (1).

Preferable examples of $R^a$ and $Rf^{c5}$ are the same as those of $R^a$ and $Rf^{c1}$ of the structural formula (1-1), respectively.

A fluorine-containing polymer having a purine skeleton represented by the structural formula (1-6):

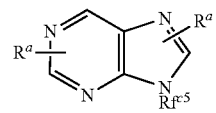

wherein $R^a$s are the same or different, and each is halogen atom, a functional group or an organic group and may be present or may not be present, and when $R^a$s are present, the whole or a part of hydrogen atoms of the heteroaromatic ring and/or the aromatic ring are substituted by them; $Rf^{c6}$ is a polymer residue defined by deleting Y from the formula (1).

Preferable examples of $R^a$ and $Rf^{c6}$ are the same as those of $R^a$ and $Rf^{c1}$ of the structural formula (1-1), respectively.

A fluorine-containing polymer having a purine derivative skeleton represented by the structural formula (1-7):

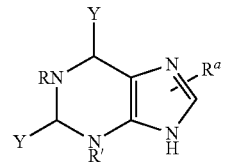

wherein $R^a$s are the same or different, and each is halogen atom, a functional group or an organic group and may be present or may not be present; Ys are the same or different and each is =O, —NRR', —OR, F or $F_2$; R and R' are the same or different and each is hydrogen atom, an alkyl group, an arylalkyl group, an organosilicon group, an alkoxy group or a carboxyester group; $Rf^{c7}$ is a polymer residue defined by deleting Y from the formula (1).

Preferable examples of $R^a$ and $Rf^{c7}$ are the same as those of $R^a$ and $Rf^{c1}$ of the structural formula (1-1), respectively.

Nonlimiting examples of the fluorine-containing polymer (1) having a heteroaromatic ring of the present invention are polymers having the following structural unit alone or having it in combination with the structural unit N.

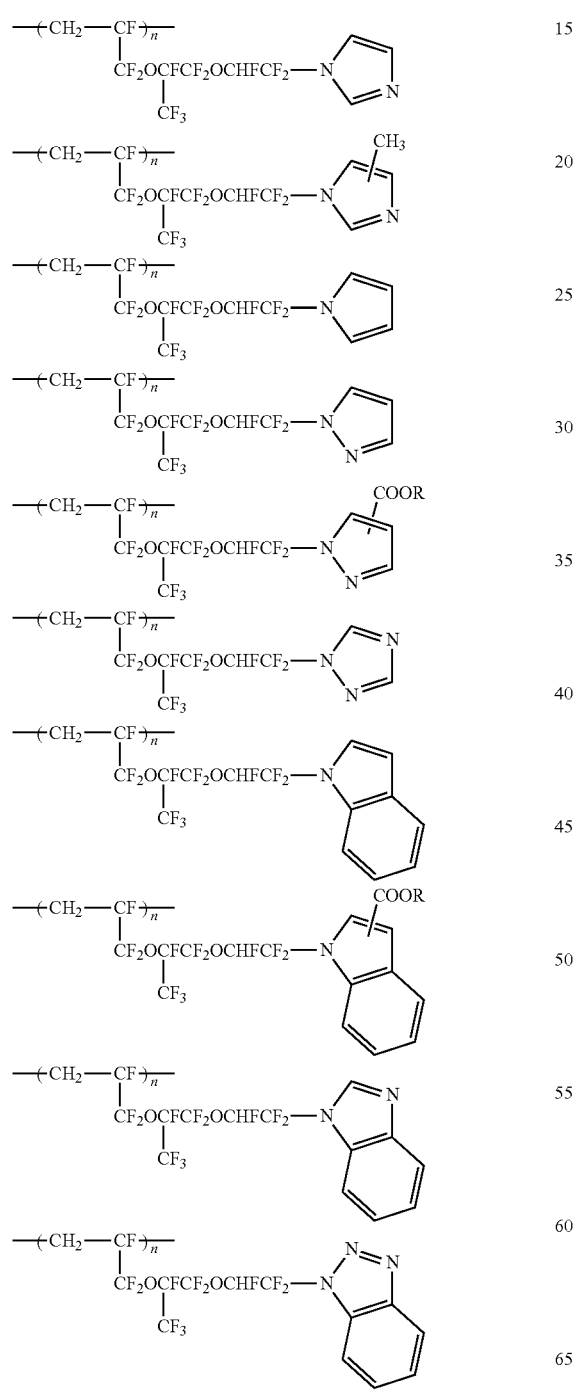

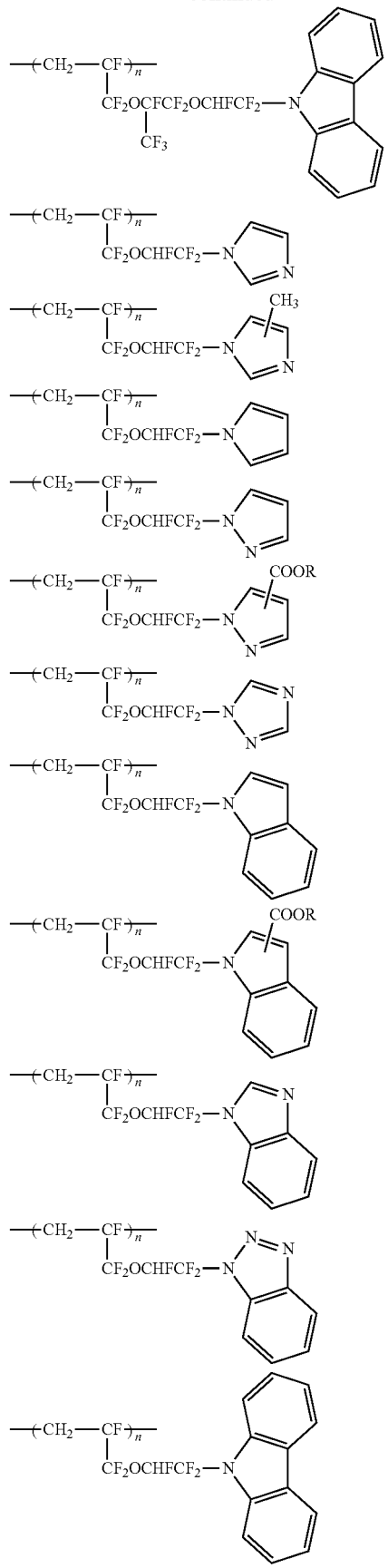

-continued

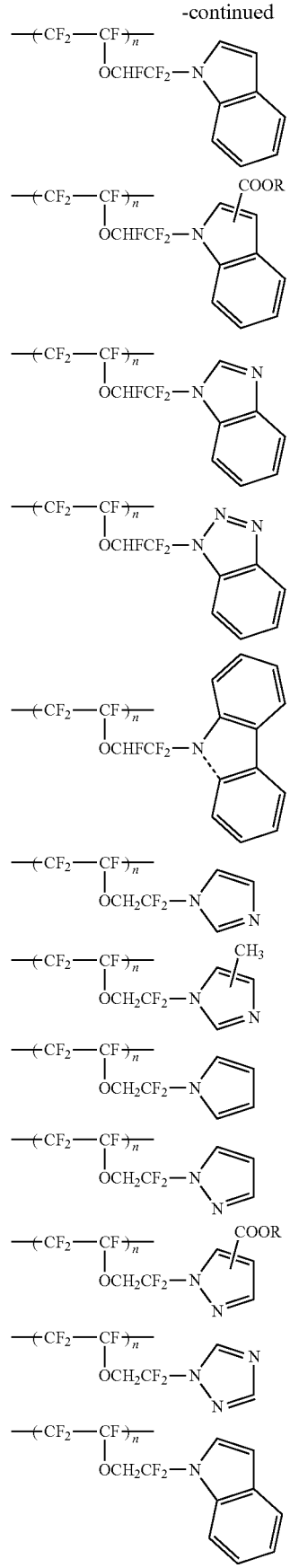
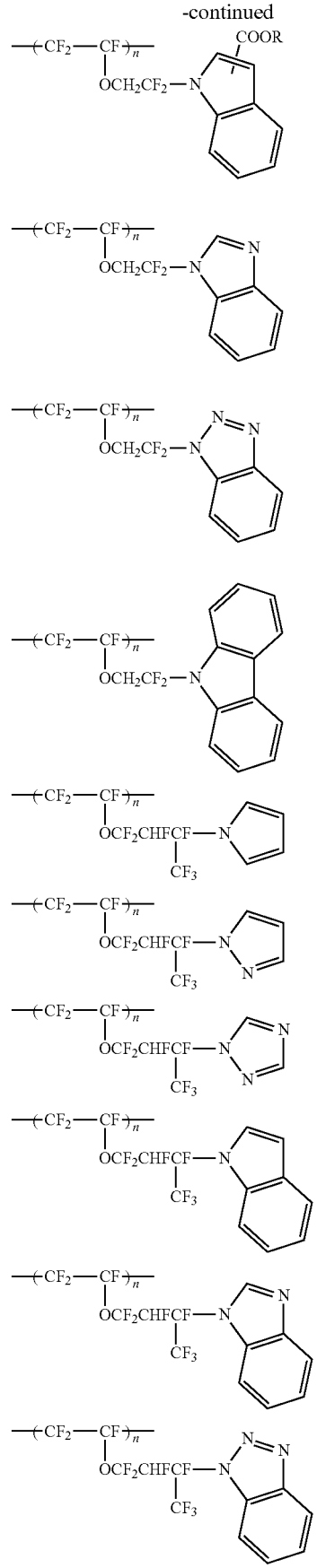

-continued
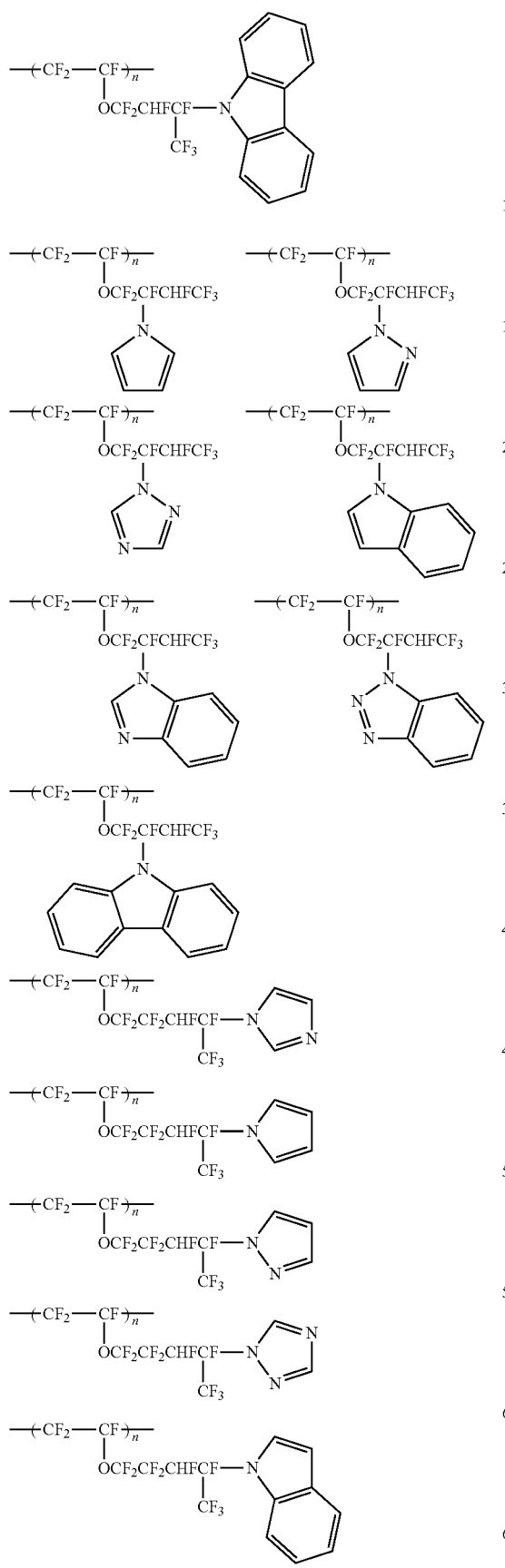
-continued
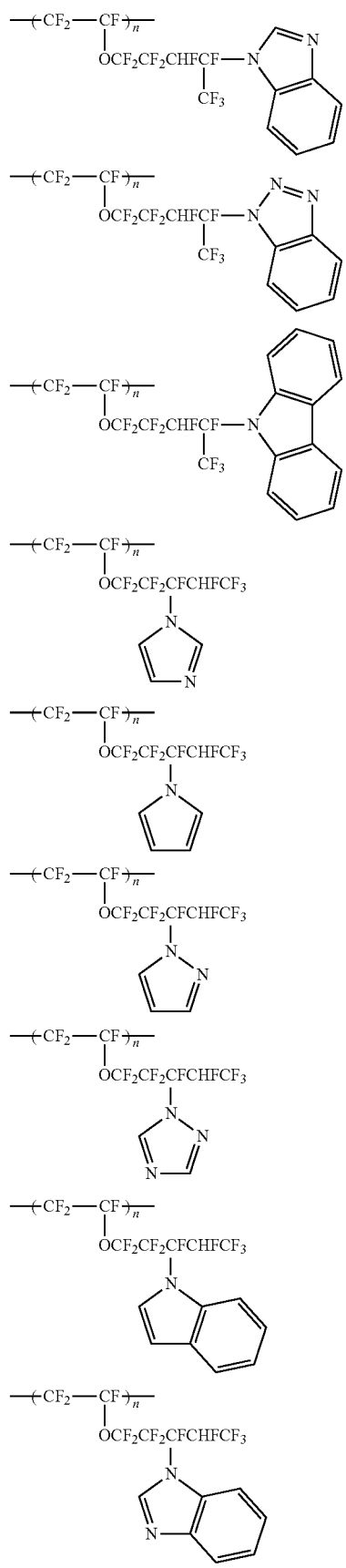

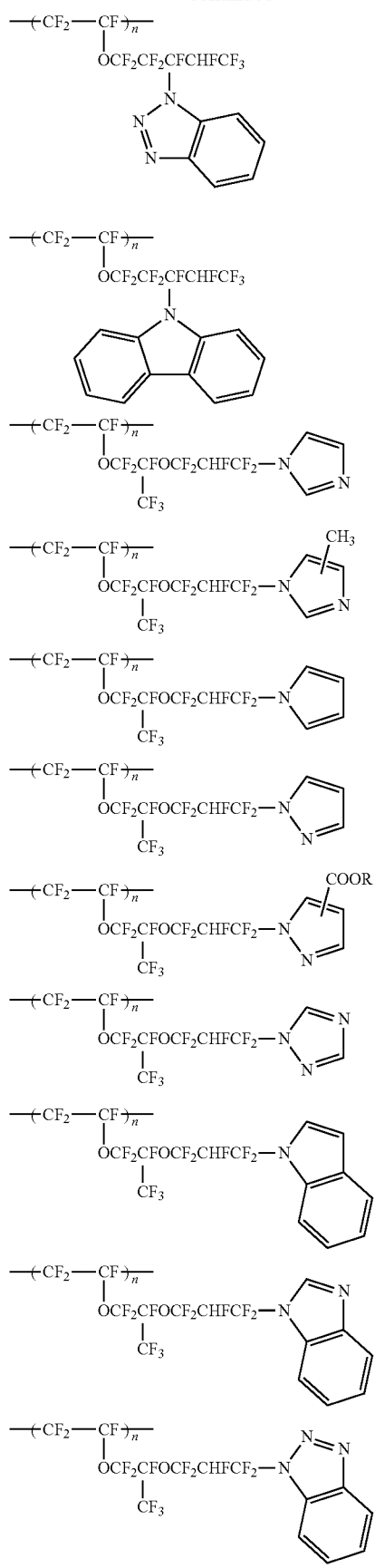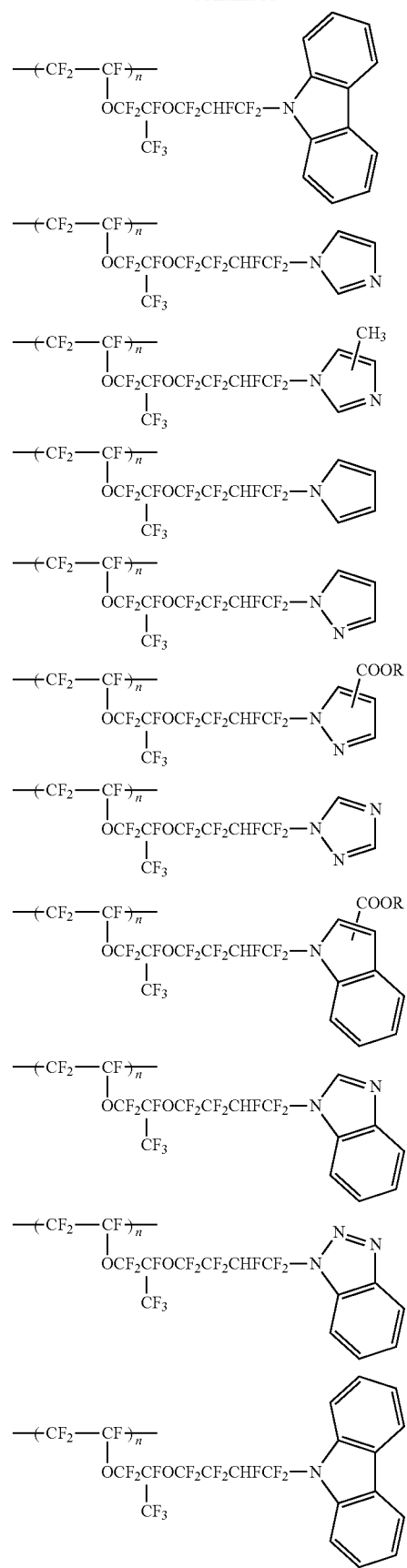

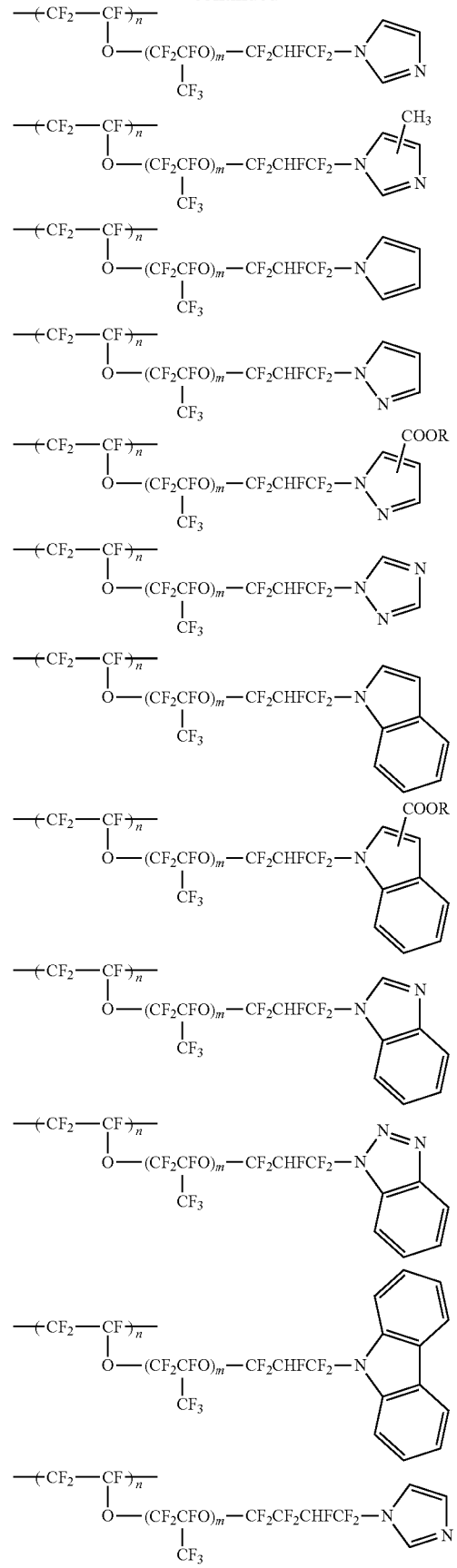
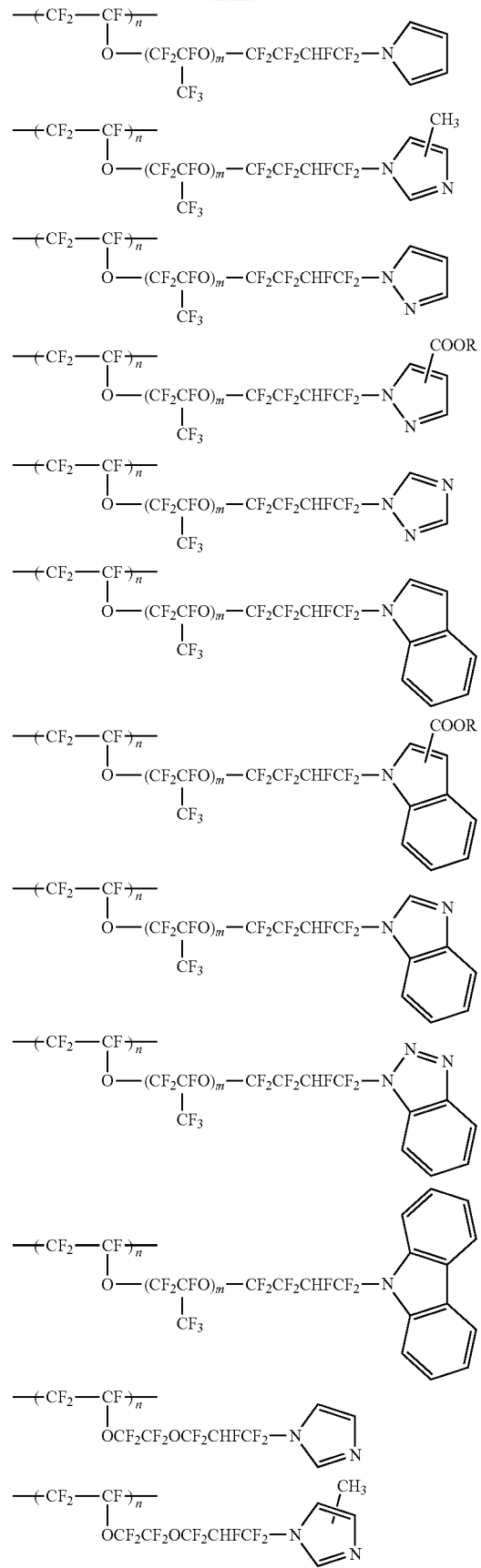

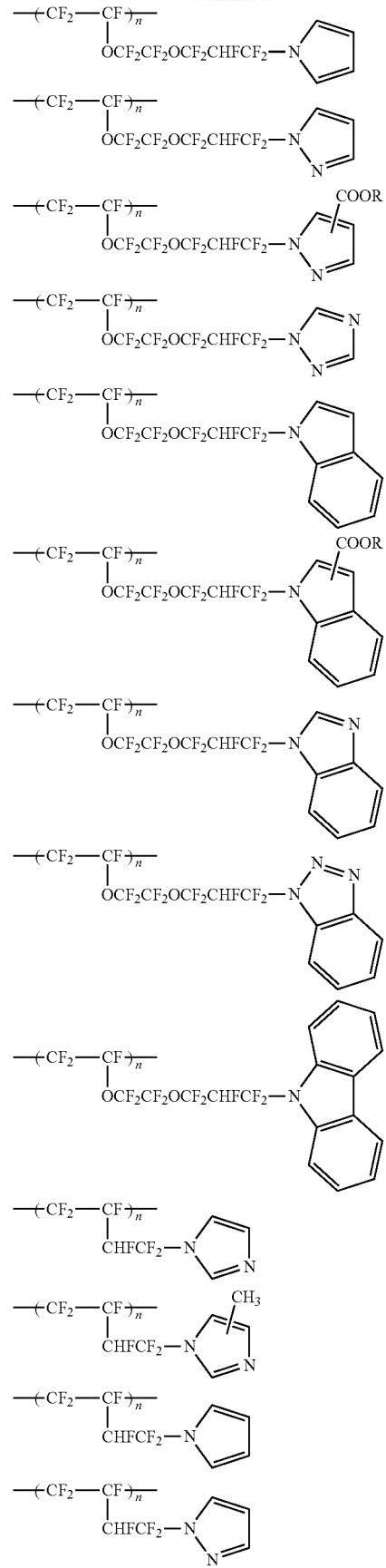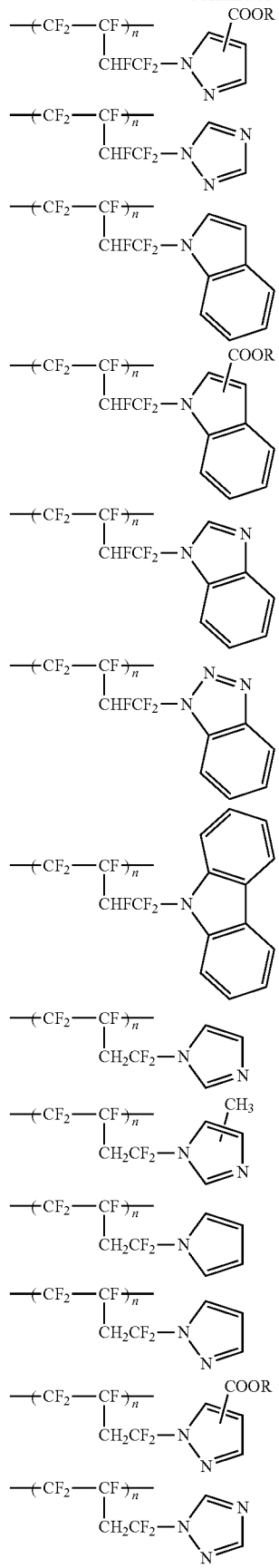

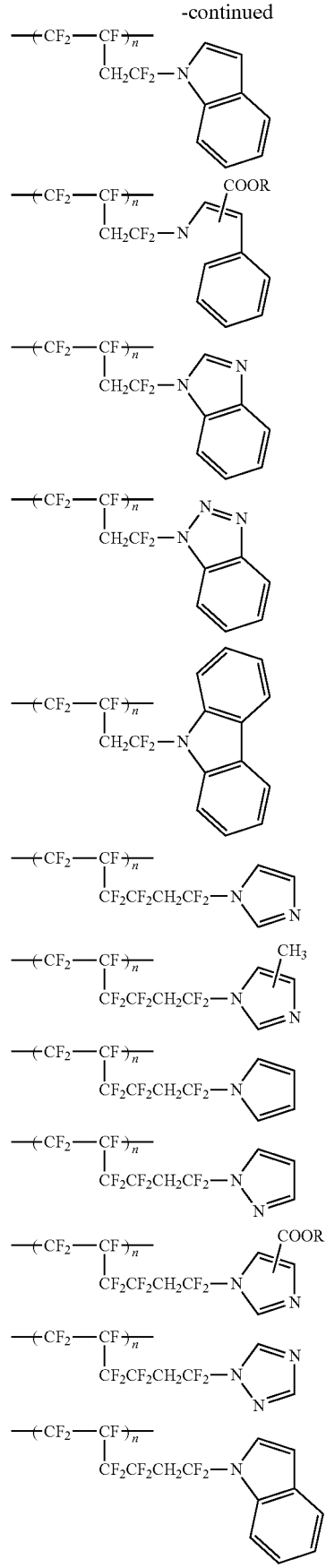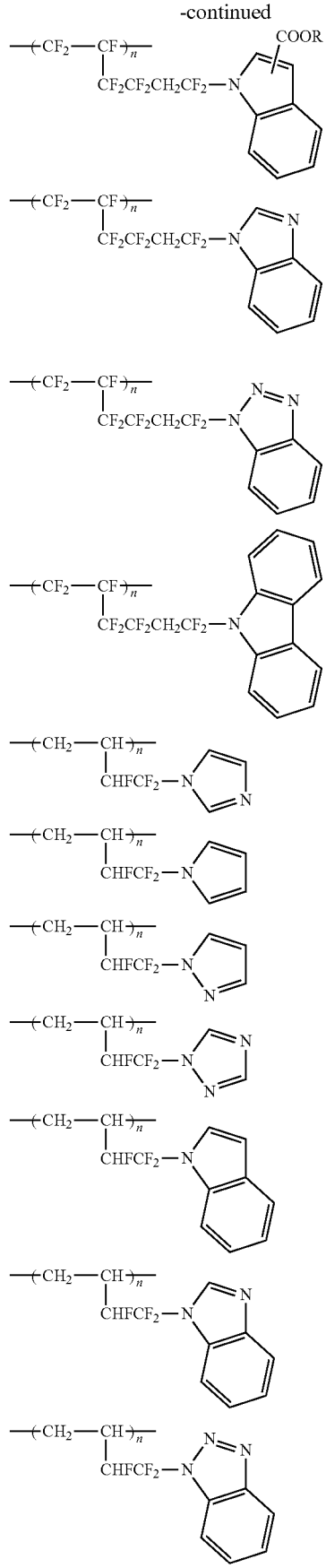

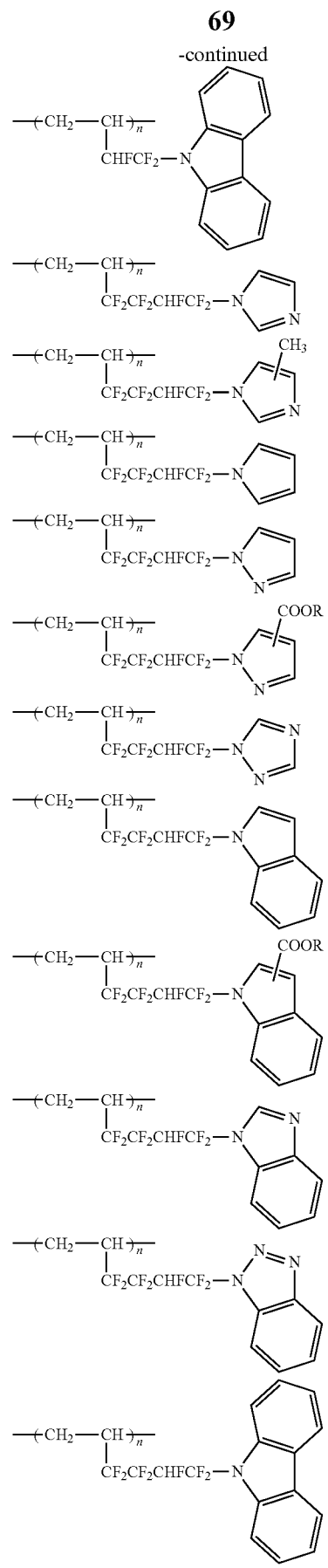
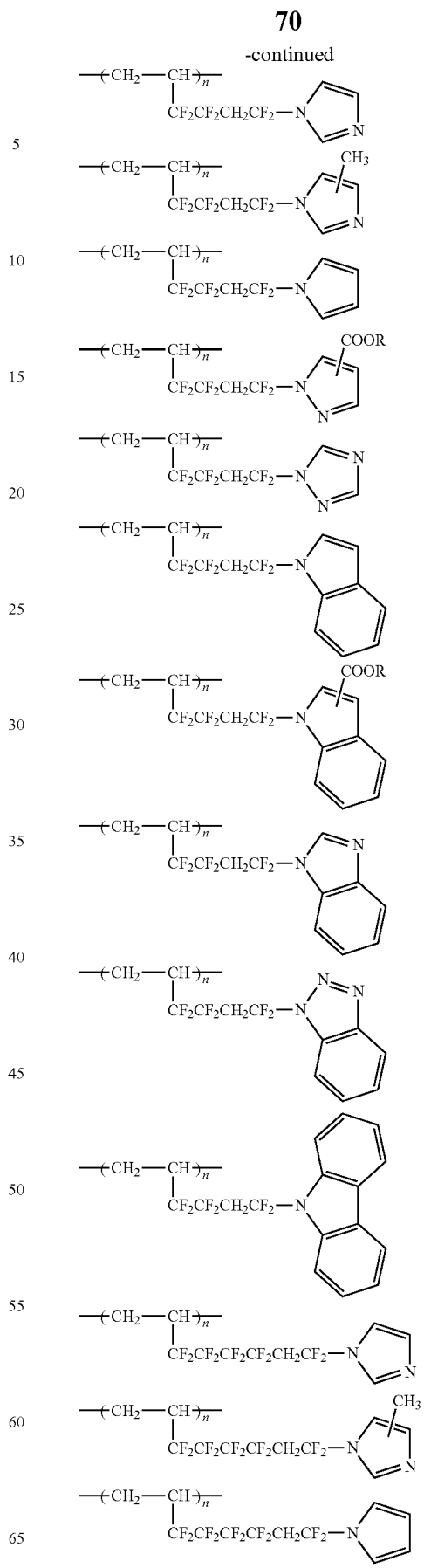

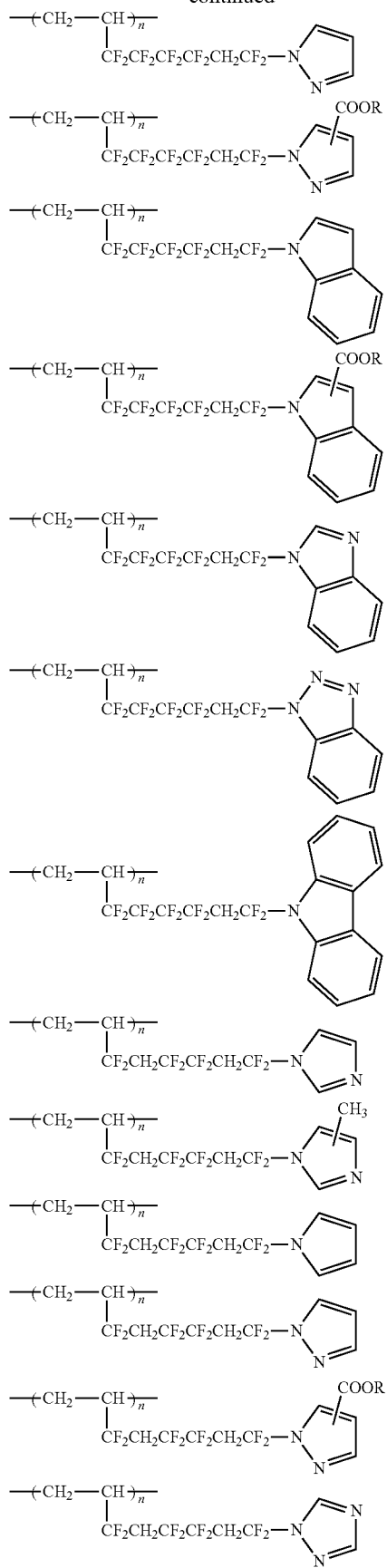
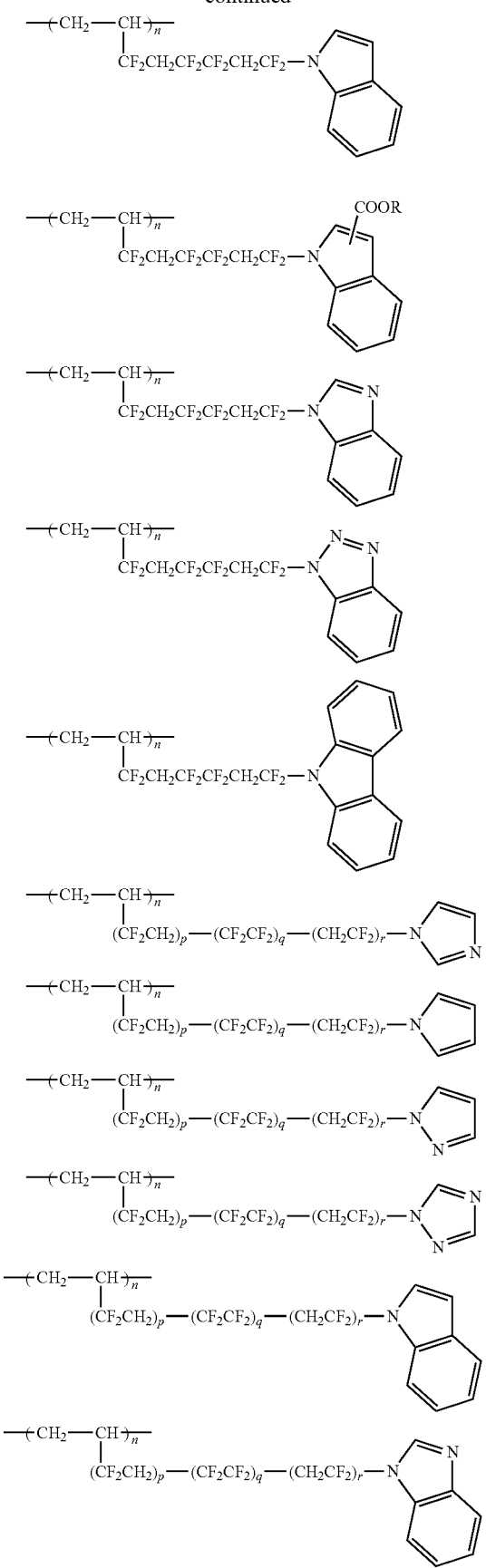

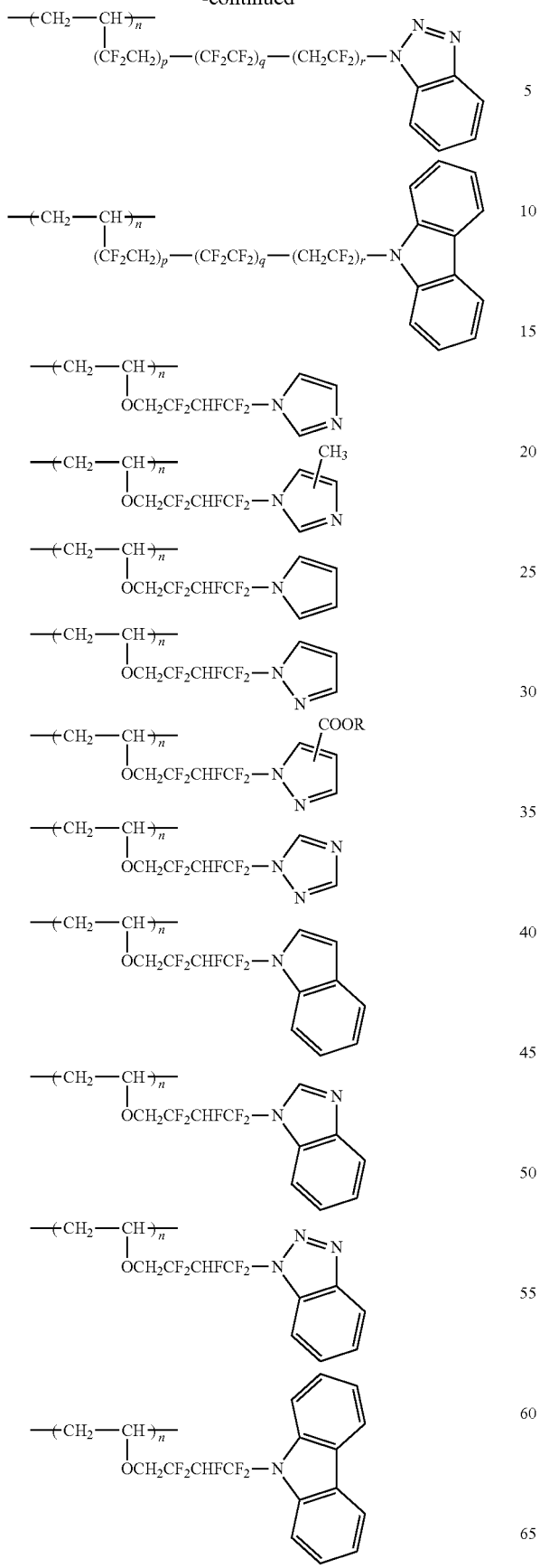
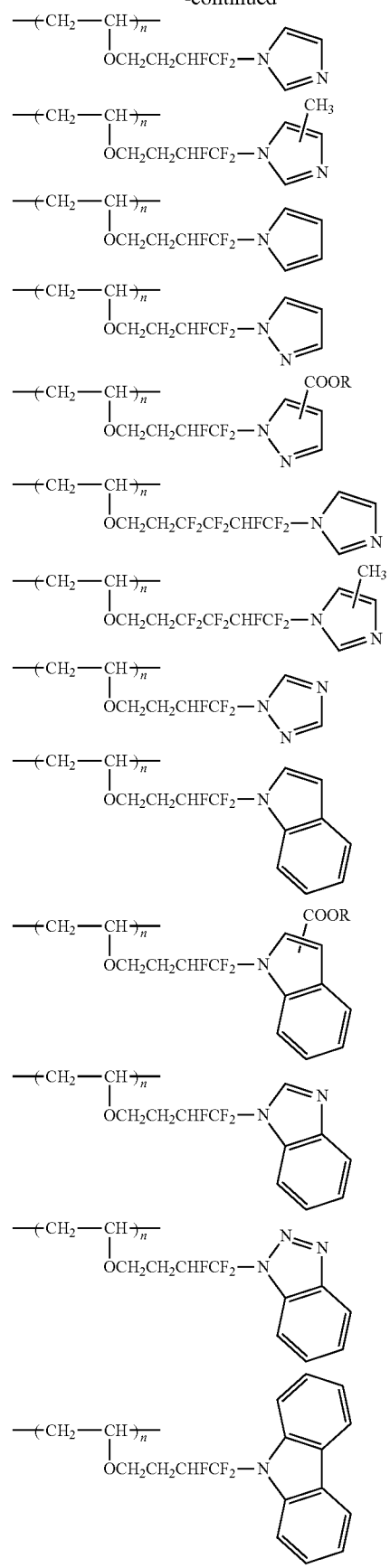

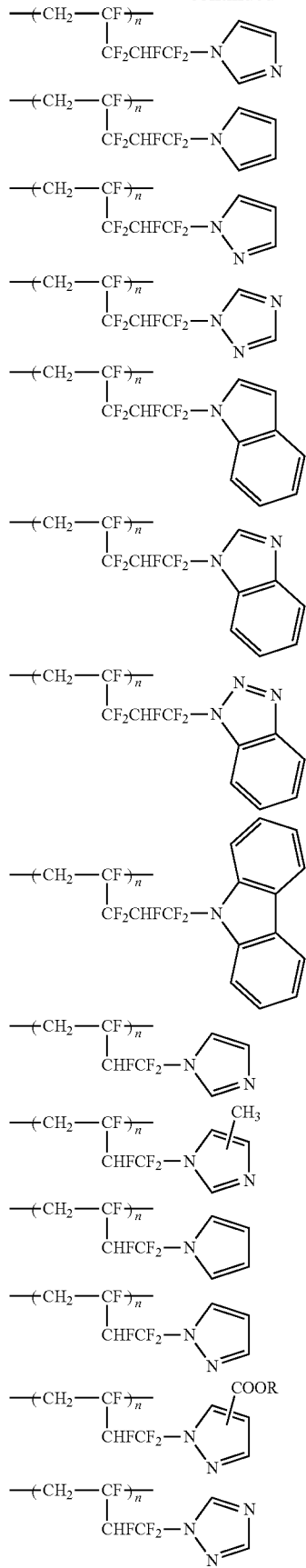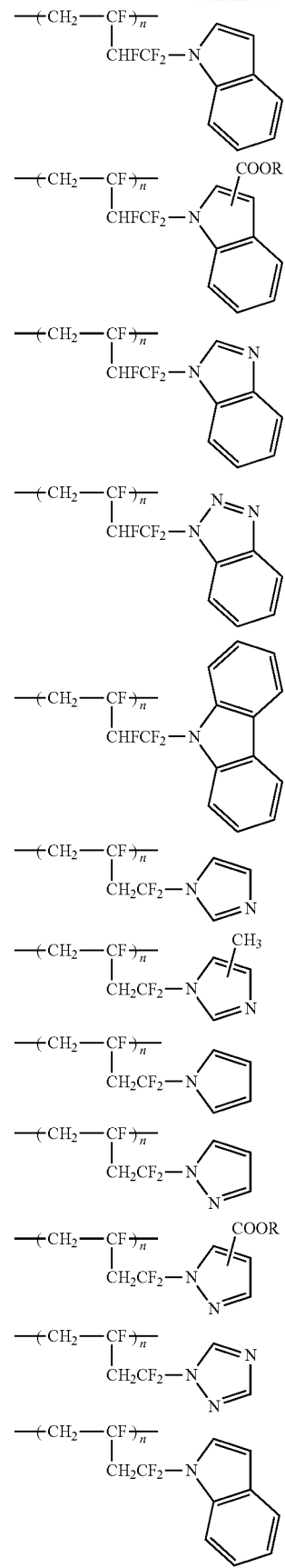

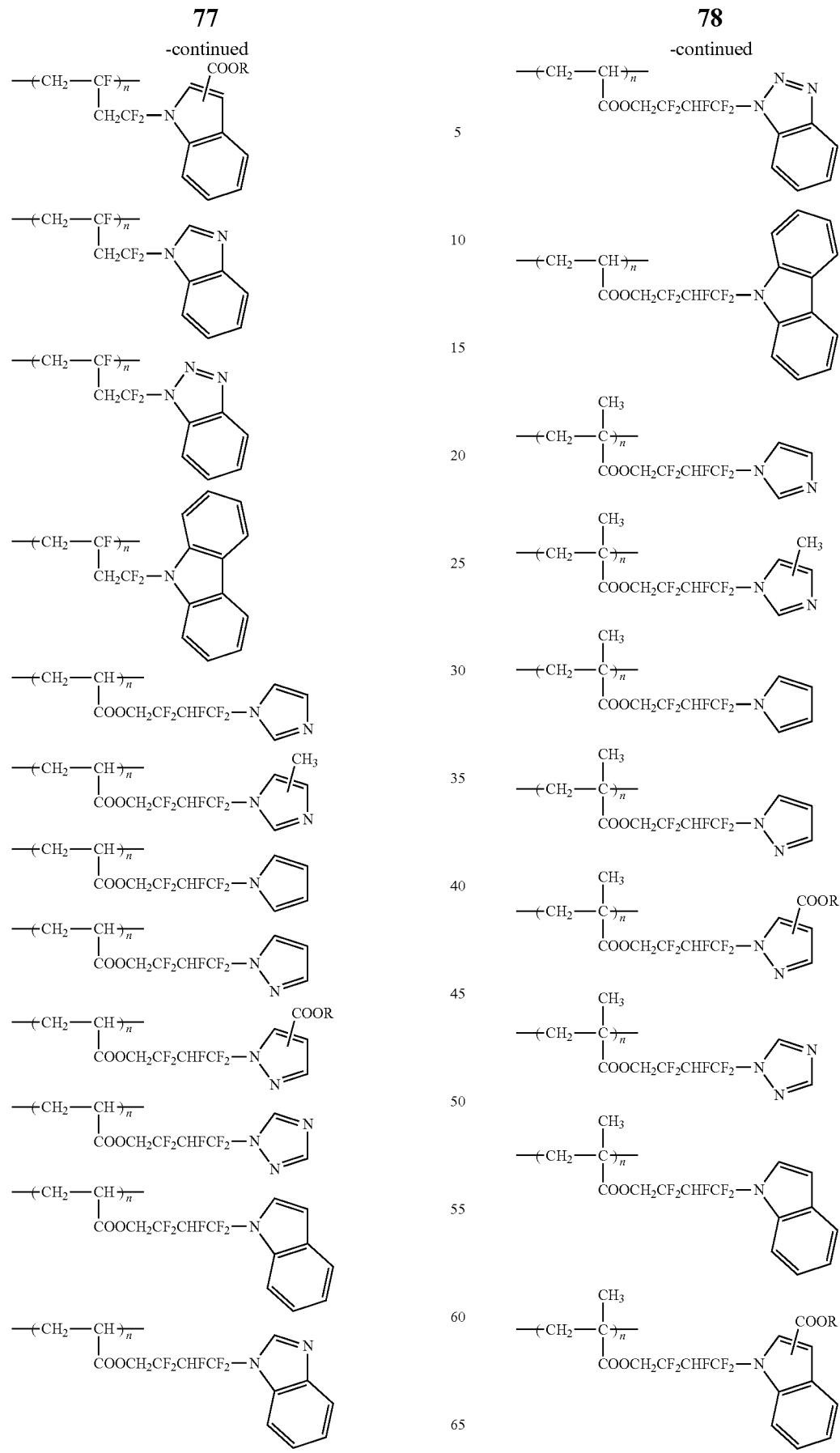

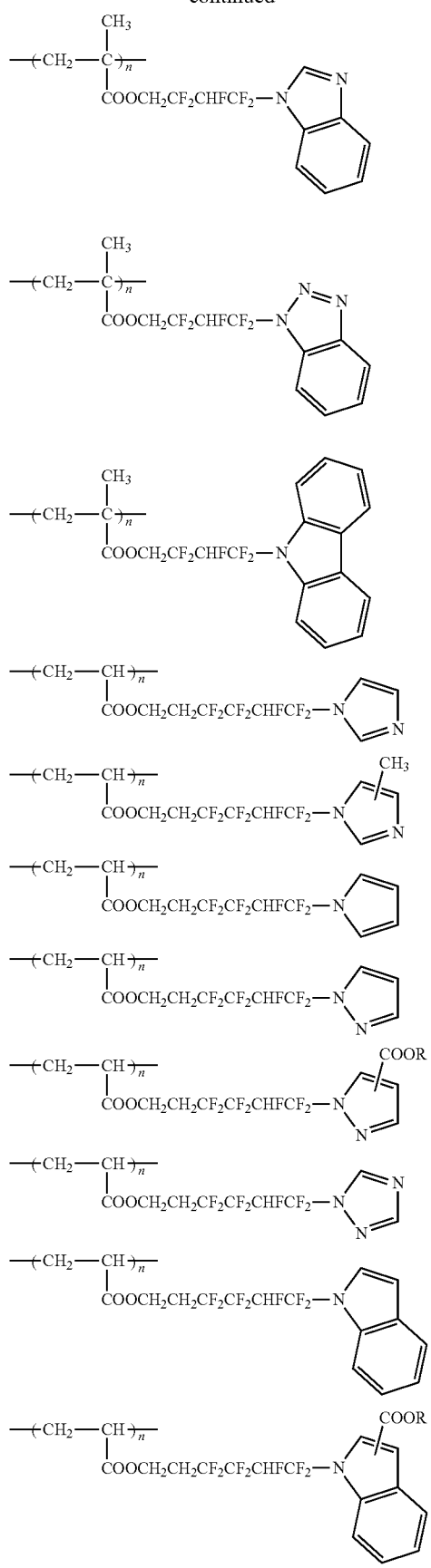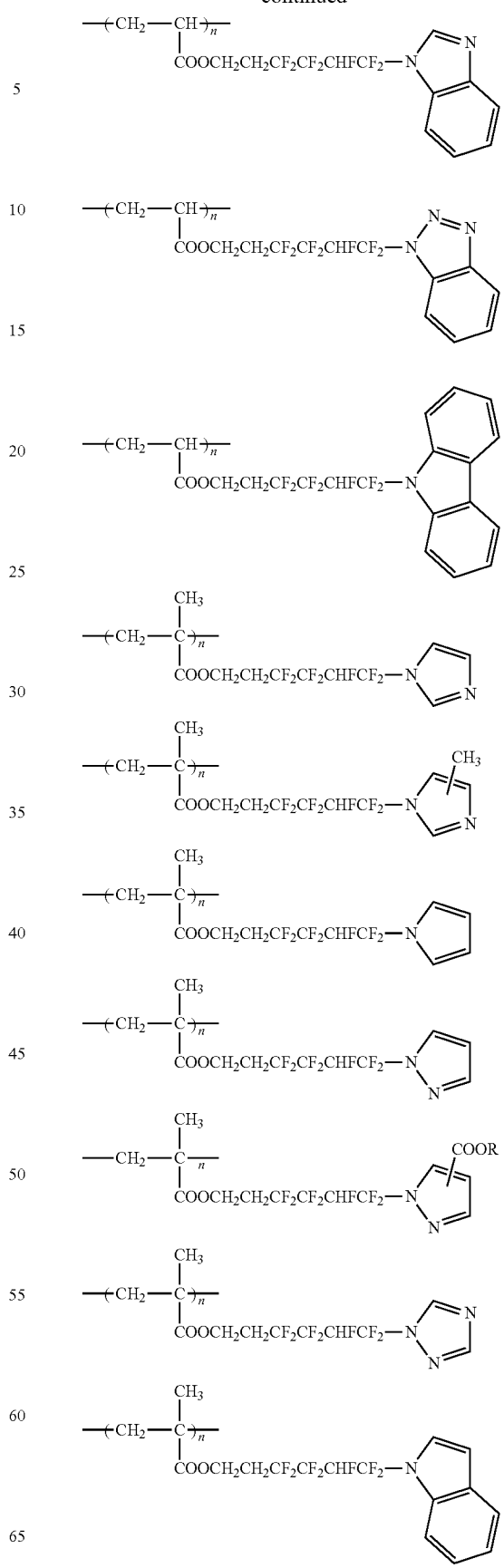

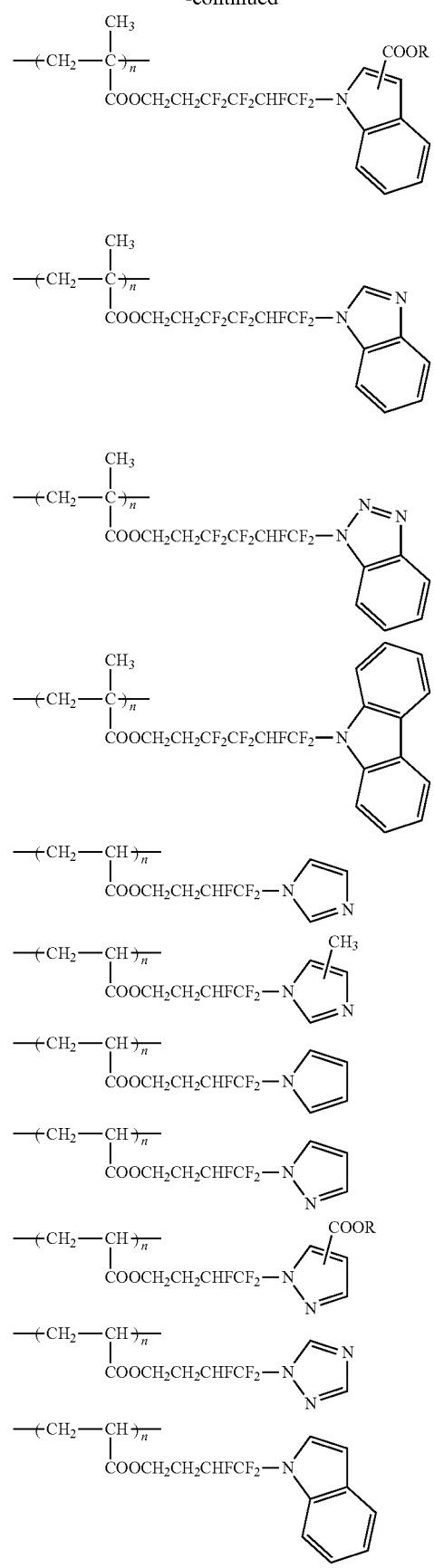
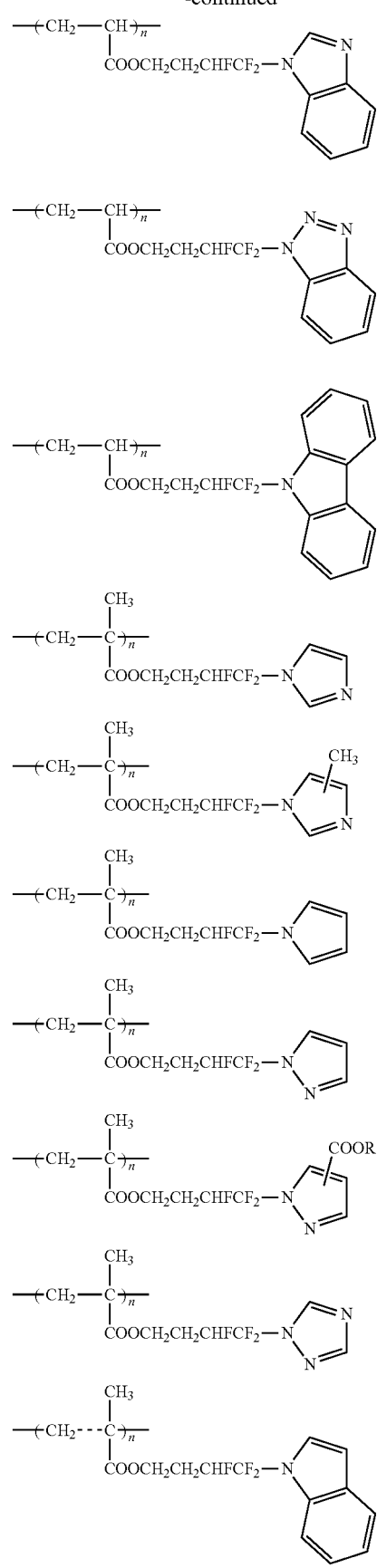

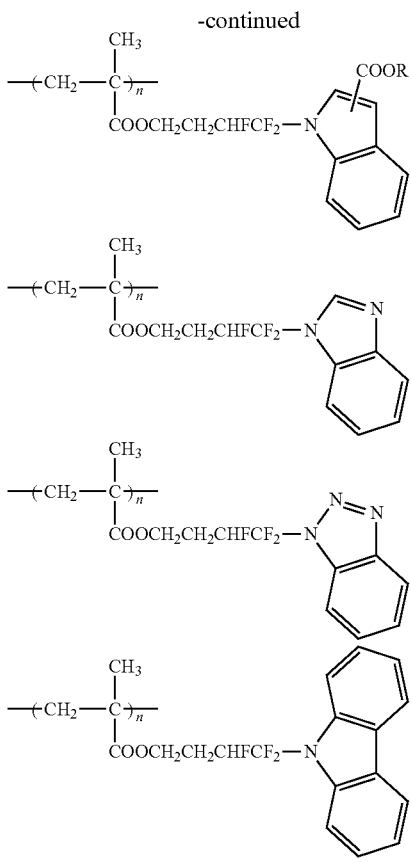

wherein n is from 1 to 5,000; m is from 0 to 8; p is from 0 to 10; q is from 0 to 8; r is from 1 to 10.

Preferable examples of the monomer (n) providing the structural unit N are one kind or two or more kinds of fluorine-containing monomers, and nonlimiting examples thereof are, for instance, tetrafluoroethylene (TFE), vinylidene fluoride (VdF), chlorotrifluoroethylene (CTFE), trifluoroethylene, $CH_2=CFCF_2O[CF(CF_3)CFCF_2O]_nCF(CF_3)COOR$ (R is H or alkyl; n is from 0 to 3), $CH_2=CFCF_2O[CF(CF_3)CFCF_2O]_nCF(CF_3)CH_2OH$ (n is from 0 to 3), $CH_2=CFCF_2O[CF(CF_3)CFCF_2O]_nCFHCF_3$ (n is from 0 to 3), $CH_2=CFCF_2O[CF(CF_3)CFCF_2O]_nCF(CF_3)CN$ (n is from 0 to 3), VdF/hexafluoropropylene (HFP), VdF/TFE, VdF/CTFE, VdF/perfluoro(alkyl vinyl ether) (PAVE), VdF-(meth)acrylic acid, VdF-(meth)acrylic acid ester, ethylene/TFE, propylene/TFE, TFE/HFP, TFE/PAVE, TFE/$CF_2=CFO-[CF_2CF(CF_3)O]_x-(CF_2)_ySO_2F$ (x is from 0 to 8; y is from 1 to 10), TFE/$CF_2=CFO-[CF_2CF(CF_3)O]_x-(CF_2)_ySO_3M$ (M is H or alkali metal: x is from 0 to 8; y is from 1 to 10), tetrafluoroethylene/perfluoro-2,2-dimethyl-1,3-dioxole, ethylene/chlorotrifluoroethylene, VdF/TFE/HFP, and VdF/TFE/PAVE.

The fluorine-containing polymer (1) of the present invention is not only useful as a starting material for the ionic group-containing fluorine-containing polymer (2) of the present invention but also expectable as a material containing any of various heteroaromatic ring compounds having stable fluorine-containing heteroaromatic ring and a curing agent such as an epoxy resin or a polyurethane resin.

Many of fine particles of metals including rare metals are used as a catalyst, and it is known that the smaller the particle size is, the higher a catalytic activity per unit weight is. In this case, ultra fine particles of metal having a particle size of nm (nanometer) level are difficult to exist stably since surface metal atoms are bonded to be easily agglomerated. Therefore, protection and stabilization are attempted by using a surfactant or a non-fluorine-containing polymer such as poly(N-vinyl-2-pyrrolidone or poly(2-vinylpyridine) (Mathias Brust et al., J. Chem. Soc., Chem. Commun., 801, 1994, Naoki Toshima et al., Chemistry Letters, 1245, 1985). Also, JP11-60890A discloses that a nano fiber containing a large amount of fine metal particles and being capable of containing metal at such a high concentration as is not seen in conventional metal/organic polymer complex materials can be formed by preparing a metal/organic polymer complex comprising polyvinyl pyridine containing ultra fine particles of metal.

The fluorine-containing polymer (1) of the present invention is also useful as a material for dispersing metal at nano level.

Then the ionic group-containing fluorine-containing polymer (2) of the present invention is explained below.

The ionic group-containing fluorine-containing polymer (2) of the present invention has a number average molecular weight of from 500 to 1,000,000 and is represented by the formula (2):

 (2)

in which the structural unit MI is a structural unit derived from a fluorine-containing ethylenic monomer and represented by the formula (MI):

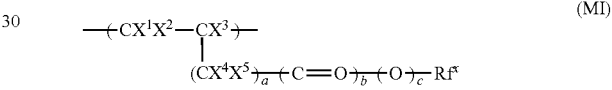 (MI)

wherein $X^1$ and $X^2$ are the same or different and each is H or F; $X^3$ is H, F, $C_{1-13}$ or $CF_3$; and $X^5$ are the same or different and each is H, F or $CF_3$; $Rf^B$ is an organic group, in which $-Y^a$ ($Y^a$ is:

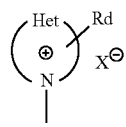

where

is a moiety forming a heteroaromatic ring together with a nitrogen atom, and the whole or a part of its hydrogen atoms may be replaced by the same or different organic groups; Rd is H or a monovalent organic group; X is a counter anion) is bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit N is a structural unit derived from a monomer copolymerizable with the fluorine-containing ethylenic monomer providing the structural unit MI, and the structural unit MI and the structural unit N are contained in amounts of from 0.1 to 100% by mole and from 0 to 99.9% by mole, respectively.

It is preferable that —Y$^a$ is a group having an imidazole skeleton and represented by:

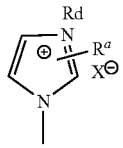

wherein R$^a$s are the same or different, and each is halogen atom, a functional group or an organic group and may be present or may not be present, and when R$^a$s are present, the whole or a part of hydrogen atoms of the heteroaromatic ring are substituted by them; Rd is H or a monovalent organic group; X is a counter anion, since it is easy to adjust dispersibility of metal particles and carbon materials, compatibility of the ionic compound, dispersibility of carbon materials, adhesion to another material, electrical properties, mechanical properties and thermal properties.

With respect to R$^a$, Rd and X, since a liquid state is easily showed at room temperature, Rf$^x$ is preferably one having the perfluoroalkylene group having a branched chain of the formula (b-4) and/or the fluoroether unit of the formula (b-5), further preferably one having the perfluoroalkylene group having a branched chain of the formula (b-4) and at least two CF$_3$ groups or at least two oxygen atoms and/or the fluoroether unit of the formula (b-5).

In addition, the end of at least one of R$^a$ and RP may be the polymerizable group (b-6). Examples of the polymerizable group are, for instance, carbon-carbon double bond, hydroxyl group, carboxyl group, amino group, isocyanate group, thiol group and thioisocyanate group, especially preferably carbon-carbon double bond.

It is preferable that —Y$^a$ is bonded to the trunk chain and/or the end of side chain of Rf$^x$, from the viewpoint that characteristics of the heteroaromatic ring are easily exhibited.

The structural unit MI is preferably a structural unit MI1 derived from a fluorine-containing ethylenic monomer and represented by the formula (MI1):

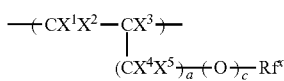 (MI1)

wherein X$^1$, X$^2$, X$^3$, X$^4$, X$^5$, Rf$^x$, a and c are as defined in the formula (MI), from the viewpoint of satisfactory polymerizability, especially satisfactory homopolymerizability and satisfactory copolymerizability with other fluorine-containing ethylenic monomer.

More specifically, there are a structural unit MI2 derived from a fluorine-containing ethylenic monomer and represented by the formula (MI2):

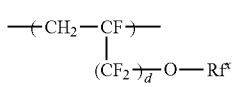 (MI2)

wherein Rf$^x$ is as defined in the formula (MI); d is an integer of 1 to 20, a structural unit MI3 derived from a fluorine-containing ethylenic monomer and represented by the formula (MI3):

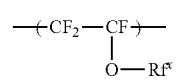 (MI3)

wherein Rf$^x$ is as defined in the formula (MI),
a structural unit MI4 derived from a fluorine-containing ethylenic monomer and represented by the formula (MI4):

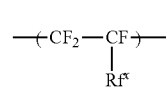 (MI4)

wherein Rf$^x$ is as defined in the formula (MI), and
a structural unit MI5 derived from a fluorine-containing ethylenic monomer and represented by the formula (MI5):

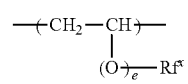 (MI5)

wherein Rf$^x$ is as defined in the formula (MI); e is 0 or 1.

The ionic group-containing fluorine-containing polymer (2) can be prepared by the following methods.
(I) The salt forming compound (E) is acted on the fluorine-containing polymer (1), and as case demands, anion exchange is carried out.
(II) When the fluorine-containing polymer (1) is prepared by a polymerization method (Preparation Process 1), a monomer (mi) having Ya in the form of salt instead of Y is used as the fluorine-containing ethylenic monomer (m).
(III) When the fluorine-containing polymer (1) is prepared by a high molecular reaction method (Preparation Process 2), a heteroaromatic ring compound salt (DI) in the form of salt is used as the heteroaromatic ring compound (D).

In any of the above-mentioned methods, for example, an acid or alkylating agent represented by the formula (E1):

Rd-X$^1$ is preferable as the salt forming compound (E) to be used for forming a salt.

In the case of an acid (Rd=H), inorganic acids such as HF, HCl, HBr, HI, HClO$_4$, HNO$_3$, H$_2$CO$_3$, H$_2$SO$_4$, HBF$_4$, HPF$_6$, HSbF$_6$, HAlCl$_4$, HAlF$_4$, HAsF$_6$ and HSO$_3$F, and organic acids such as R—SO$_3$H, R—COOH, R—P(O)(OH)$_2$ and R$_2$—P(O)OH can be used.

In addition, in the case of alkylating agents (Rd is an alkyl group), there are compounds having X$^1$ of F, Cl, Br, I, —OSO$_2$R, —OCO$_2$R, —OCOR or —OP(O)R$_2$ (R is a monovalent hydrocarbon group).

Examples of Rd are, for instance, hydrogen atom; linear or branched alkyl groups having 1 to 10 carbon atoms such as CH$_3$, C$_2$H$_5$, n-C$_3$H$_7$, i-C$_3$H$_7$ and C$_4$H$_9$; linear or branched fluoroalkyl groups having a unit such as CF$_3$, C$_2$F$_5$, n-C$_3$F$_7$, i-C$_3$F$_7$, C$_4$F$_9$, CF$_2$CF$_2$Cl, CF$_2$CF$_2$Br, CF$_2$CF$_2$I, CH$_2$CF$_3$, (CF$_2$CF$_2$)$_v$H (v is an integer of 1 to 5), CF$_2$CHFCF$_3$, CF$_2$CH$_3$, CF$_2$CFClH, CF$_2$CH(CF$_3$)$_2$, CF$_3$CH$_2$CH$_2$, C$_2$F$_5$CH$_2$CH$_2$, n-C$_3$F$_7$CH$_2$CH$_2$, i-C$_3$F$_7$CH$_2$CH$_2$, C$_4$F$_9$CH$_2$CH$_2$, —CH$_2$CH$_2$C$_2$F$_4$—CH$_2$CH$_2$—, —CH$_2$CH$_2$C$_4$F$_8$CH$_2$CH$_2$— or —Cl$_2$CH$_2$C$_6$F$_{12}$CH$_2$CH$_2$—; linear or branched hydroxyalkyl groups which may have fluorine and has a unit such as —(CF$_2$)$_v$CH$_2$—OR (v is 0 or an integer of 1 to 10; R is hydrogen atom or an alkyl group which may be substituted by hydrogen atom or halogen atom), —CH$_2$(CF$_2$CF$_2$)$_v$CH$_2$— OR (v is an integer of 1 to 5; R is hydrogen atom or an alkyl group which may be substituted by hydrogen atom or halogen atom), —CH$_2$CH$_2$(CF$_2$CF$_2$)$_v$CH$_2$—OR (v is an integer of 1 to 5; R is hydrogen atom or an alkyl group which may be substituted by hydrogen atom or halogen atom), —CH$_2$CH$_2$(CF$_2$CF$_2$)$_v$CH$_2$CH$_2$—OR (v is an integer of 1 to 5; R is hydrogen atom or an alkyl group which may be substituted by hydrogen atom or halogen atom) or —CH$_2$(CF$_2$CF$_2$)$_v$CH$_2$CH$_2$—OR (v is an integer of 1 to 5; R is a hydrogen atom or an alkyl group which may be substituted by hydrogen atom or halogen atom).

With respect to the reaction conditions for acting the salt forming compound (E), there can be employed usual conditions for salt forming reaction or alkylation reaction which are described in, for example, Y. L. Yagupolskii et al., J. Fluorine Chem., 126, pp. 669-672 (2005), C. E. Song et al., Chem. Comm., p. 1695 (2000), R. Hagiwara et al., J. Fluorine Chem., 99, p. 1 (1999), A. E. Visser et al., Green Chem., 2, p. 1 (2000) and M. Yoshizawa et al., Electrochem. Solid-State Lett., 4, E25 (2001).

For example, in the case where an acid is used as the salt forming compound (E), it is preferable to carry out the reaction at a reaction temperature of −30° C. to 150° C. in the absence of a solvent or by using a solvent such as diethyl ether, t-butyl methyl ether, diisopropyl ether, dibutyl ether, tetrahydrofuran, dioxane, dimethoxyethane, diglyme, triglyme, tetraglyme, ethyl acetate, methyl acetate, propyl acetate, butyl acetate, dimethyl sulfoxide, sulfolane, benzene, toluene, xylene, chloroform, methylene chloride, dichloroethane, trichloroethane, dichloropentafluoropropane, dichlorofluoroethane, trichlorotrifluoroethane, tetrachlorohexafluorobutane, dichlorooctafluorobutane, pentachloropentafluorohexane, dibromotetrafluoroethane, perfluorohexane, perfluoro(butyl tetrahydrofuran) or perfluorotributylamine, though it depends on kind of the fluorine-containing polymer (1), kind of the fluorine-containing ethylenic monomer (m) and kind of the fluorine-containing heteroaromatic ring compound (D) (salt forming method 1).

In addition, in the case where an alkylating agent is used as the salt forming compound (E), it is preferable to carry out the reaction at a reaction temperature of −30° C. to 150° C. in the absence of a solvent or by using a solvent such as diethyl ether, t-butyl methyl ether, diisopropyl ether, dibutyl ether, tetrahydrofuran, dioxane, dimethoxymethane, dimethoxyethane, diglyme, triglyme, tetraglyme, N,N-dimethylformamide, N,N-dimethylacetamide, N-methylpyrrolidone, ethyl acetate, methyl acetate, propyl acetate, butyl acetate, dimethyl sulfoxide, sulfolane, hexamethylphosphoric triamide, benzene, toluene, xylene, chloroform, methylene chloride, dichloroethane, trichloroethane, dichloropentafluoropropane, dichlorofluoroethane, trichlorotrifluoroethane, tetrachlorohexafluorobutane, dichlorooctafluorobutane, pentachloropentafluorohexane, dibromotetrafluoroethane, perfluorohexane, perfluoro(butyl tetrahydrofuran) or perfluorotributylamine, though it depends on kind of the fluorine-containing polymer (1), kind of the fluorine-containing ethylenic monomer (m) and kind of the fluorine-containing heteroaromatic ring compound (D) (salt forming method 2).

When the fluorine-containing polymer (1), the fluorine-containing ethylenic monomer (m) and the fluorine-containing heteroaromatic ring compound (D) are compounds having an imidazole skeleton, for example, a fluorine-containing imidazole compound or a fluorine-containing benzimidazole compound, a fluorine-containing purine compound or a fluorine-containing purine derivative, the above-mentioned salt forming reaction proceeds especially satisfactorily, and Rd is bonded to nitrogen atom other than the nitrogen atom bonded to Rf of the fluorine-containing heteroaromatic ring to give a cation and X$^1$ becomes a counter anion.

Further as case demands, by anion exchange of the counter anion of the salt of fluorine-containing heteroaromatic ring compound obtained by acting the salt forming compound (E) mentioned above, the counter anion can be changed to various anions.

Examples of a compound usable for the anion exchange are, for instance, M-ClO$_4$, M-NO$_3$, M2-SO$_4$, M$_2$-CO$_3$, M-BF$_4$, M-BCl$_4$, M-PFe, M-SbF$_6$, M-AlCl$_4$, M-Al$_2$Cl$_7$, M-AlF$_4$, M-AsF$_6$, M-N(CN)$_2$, M-F, a mixture of M-F and HF, M-N(SO$_2$R)(SO$_2$R'), M-OSO$_2$R, M-OCOR, M-OP(O)R$_2$, (M-O)$_2$P(O)R, M-C(SO$_2$R)$_2$(SO$_2$R') and M-[RCOCH-COR'], wherein R and R' are the same or different and each is —(CF$_2$)$_n$F (n=1 to 20) or —CF(CF$_3$)OCF$_3$, —CF(CF$_3$)—[OCF$_2$CF(CF$_3$)]$_n$—O(CF$_2$)$_m$—F, —CF(CF$_3$)—[OCF$_2$CF(CF$_3$)]$_n$—O(CF$_2$)$_m$—CFClCF$_2$Cl, —CF(CF$_3$)—[OCF$_2$CF(CF$_3$)]$_n$—O(CF$_2$)$_m$—CF$_2$I, —CF(CF$_3$)—[OCF$_2$CF(CF$_3$)]$_n$—OCF$_2$CF$_2$CF=CH$_2$, —CF(CF$_3$)—[OCF$_2$CF(CF$_3$)]$_n$—OCF$_2$CF$_2$CF$_2$CH$_2$I, —CF(CF$_3$)—[OCF$_2$CF(CF$_3$)]$_n$—OCF$_2$CF$_2$SO$_2$X, —(CF$_2$)$_m$—[OCF(CF$_3$)CF$_2$]$_n$OCF(CF$_3$)COOX, —(CF$_2$)$_m$—[OCF(CF$_3$)CF$_2$]$_n$OCF(CF$_3$)CH$_2$OX, —(CF$_2$CF$_2$)$_p$—(CF$_2$CF(CF$_3$))$_q$—(CF$_2$CH$_2$)$_r$—(CF$_2$CFCl)$_s$-A, or —(OCF$_2$CF(CF$_3$))$_x$—(OCF$_2$CF$_2$)$_y$—(OCF$_2$CF$_2$CF$_2$)$_z$—(OCF$_2$CF$_2$CH$_2$)$_w$—(OCF$_2$)$_v$-A (in these formulas, A represents H, F, an end group of a polymerization initiator or a modified group thereof; n and m are the same or different and each is 0 or an integer of 1 to 10; each of p, q, r and s is independently 0 or an integer of 1 to 5,000, and the sum of p, q, r and s is an integer of 10 to 10,000; each of x, y, z, v and w is independently 0 or an integer of 1 to 60, and the sum of x, y, z, w and v is an integer of 3 to 60); M is Li, Na, K, Rb, Cs, ½ Mg, ⅓ Al, Ag, ½ Zn, ½ Ni, ⅓ Fe, H or NH$_4$; X is an alkyl group which has 1 to 20 carbon atoms and may be substituted by halogen atom.

In addition, the compound may be a polymer chain containing 1 to 100% by mass of a polymer unit represented by:

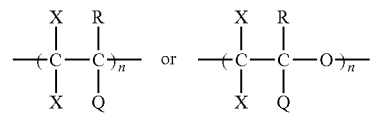

wherein X is H or F; R is H, F, CH$_3$ or CF$_3$; Q is -Q$^{1-}$, —[OCF$_2$CF(CF$_3$)]$_{0-10}$O(CF$_2$)$_{0-8}$-Q$^{1-}$, —(CF$_2$)$_{0-8}$—[OCF(CF$_3$)CF$_2$]$_{0-10}$OCF(CF$_3$)-Q$^{1-}$, —(CH$_3$)$_{0-8}$(CF$_2$)$_{0-20}$(CH$_3$)$_{0-8}$-Q$^{1-}$ or —(C$_6$H$_4$)(CH$_3$)$_{0-8}$-Q$^{1-}$ (Q$^{1-}$s are the same or different and each is COO$^-$ or SO$^{3-}$). It is desirable that a number average molecular weight of the polymer chain is about 1×10$^3$ to about 8×10$^5$, from the viewpoint of solubility of the polymer in a solvent.

A copolymerizable comonomer is not limited particularly, and may be optionally selected depending on characteristics intended to be imparted. Nonlimiting examples of preferable comonomers are, for instance, CF$_2$=CF$_2$, CF$_2$=CF(CF$_3$), CF$_2$=CFCl, CF$_2$=CH$_2$, CF$_2$=CFH, perfluoro(butenylvinyl ether), perfluoro-2,2-dimethyldioxole, perfluorodioxole, CH$_2$=CH$_2$, CH$_2$=CH(C$_{1-13}$), CH$_2$=CHCH=CH$_2$, CH$_2$=CHCl, CH$_2$=CCl$_2$, CH$_2$=CHCO$_2$R (R is hydrogen atom or an alkyl group which may be substituted by hydrogen atom or halogen atom), CH$_2$=C(CH$_3$)CO$_2$R(R is hydrogen atom or an alkyl group which may be substituted by hydrogen atom or halogen atom), CH$_2$=CFCO$_2$R(R is hydrogen atom or an alkyl group which may be substituted by hydrogen atom or halogen atom), $CH_2=C(CF_3)CO_2R$ (R is hydrogen atom or an alkyl group which may be substituted by hydrogen atom or halogen atom), $CH_2=CHC_6X^5$ (X is H or F), $CH_2=C(CH_3)C_6X^5$ (X is H or F), $CH_2=CFC_6X_5$ (X is H or F), $CH_2=C(CF_3)C_6X_5$ (X is H or F), $CH_2=CHCN$, $CH_2=C(CH_3)CN$, $CH_2=CFCN$, $CH_2=C(CF_3)CN$, $CH_2=CHOCO_2R$ (R is an alkyl group which may be substituted by hydrogen atom or halogen atom), $CH_2=CHOR$ (R is an alkyl group which may be substituted by hydrogen atom or halogen atom), $CH_2=CFCF_2CF_2O[CF(CF_3)CF_2]_nOCF(CF_3)COOR$ (n is 0 or an integer of 1 to 20; R is hydrogen atom or an alkyl group which may be substituted by hydrogen atom or halogen atom), $CH_2=CFCF_2CF_2O[CF(CF_3)CF_2]_nOCF(CF_3)CH_2OR$ (n is 0 or an integer of 1 to 20; R is hydrogen atom or an alkyl group which may be substituted by hydrogen atom or halogen atom), $CH_2=CFCF_2CF_2O[CF(CF_3)CF_2]_nOCHFCF_3$ (n is 0 or an integer of 1 to 20), sulfur dioxide, ethylene oxide, propylene oxide, tetrafluoroethylene oxide, hexafluoropropylene oxide, fluorophosgene and hexafluoroacetone.

Examples of the salt —$Y^a$ are fluoride, chloride, bromide, iodide, perchlorate, nitrate, sulfate, carbonate, tetrafluoroborate, hexafluorophosphate, hexafluoroantimonate, tetrachloroaluminate, tetrafluoroaluminate, hexafluoroarsenate, fluorosulfonate, dicyanamide salt, $F(HF)_n$ salt (n=1 to 10), bisperfluoro(C1 to C20)alkylsulfonylamide salt (two alkyl groups are the same or different), perfluoro(C1 to C20)alkylsulfonate, perfluoro(C1 to C20)alkylcarboxylate, perfluoro(C1 to C20)alkylphosphonate, trisperfluoro(C1 to C20)alkylsulfonyl carbonate (three alkyl groups are the same or different), 1-perfluoroalkyl-3-perfluoro(C1 to C10)alkyl-1,3-diketonate (two alkyl groups are the same or different), dichlorocuprate, tetrachloroborate, heptachlorodialuminate and trichlorozincate.

Of the ionic group-containing fluorine-containing polymers (2) of the present invention, nonlimiting examples of polymers having an ionic imidazole skeleton are as follows.

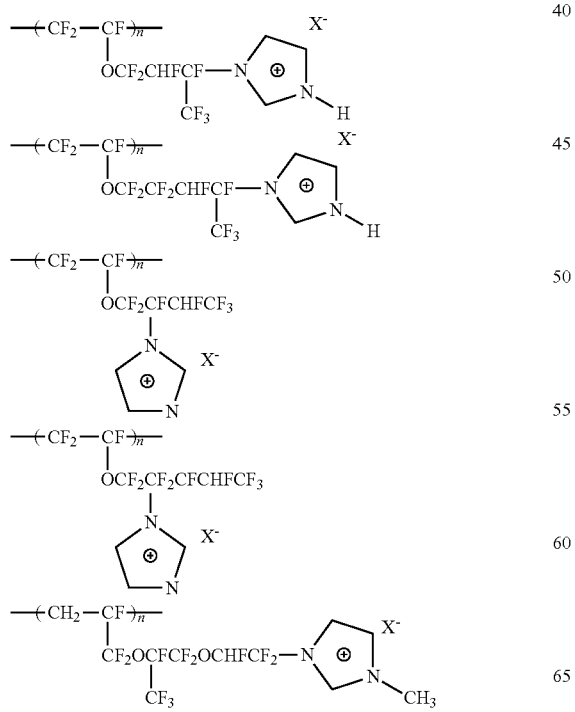

-continued

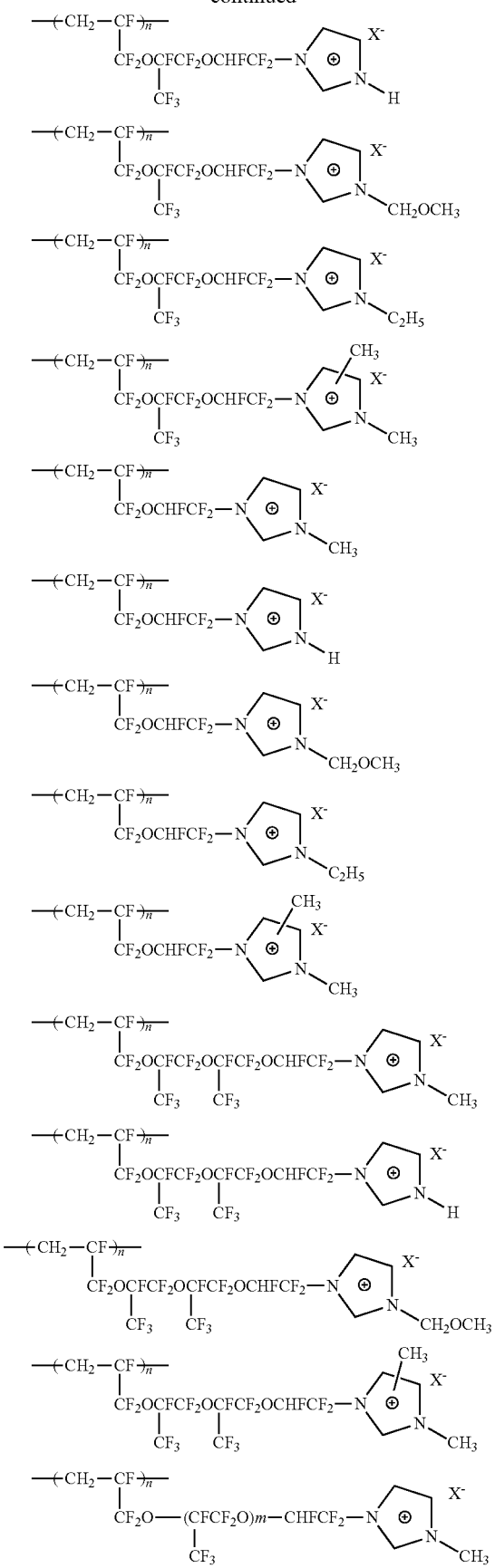

91

-continued $$\text{—(CH}_2\text{—CF)}_n\text{—}$$
$$|$$
$$\text{CF}_2\text{O—(CFCF}_2\text{O)}_m\text{—CHFCF}_2\text{—N}^{\oplus}\text{···NH} \quad X^-$$
$$|$$
$$\text{CF}_3$$

$$\text{—(CF}_2\text{—CF)}_n\text{—}$$
$$|$$
$$\text{OCHFCF}_2\text{—N}^{\oplus}\text{···N—CH}_3 \quad X^-$$

$$\text{—(CF}_2\text{—CF)}_n\text{—}$$
$$|$$
$$\text{OCHFCF}_2\text{—N}^{\oplus}\text{···N—CH}_2\text{OCH}_3 \quad X^-$$

$$\text{—(CF}_2\text{—CF)}_n\text{—}$$
$$|$$
$$\text{OCHFCF}_2\text{—N}^{\oplus}\text{···NH} \quad X^-$$

$$\text{—(CF}_2\text{—CF)}_n\text{—}$$
$$|$$
$$\text{OCHFCF}_2\text{—N}^{\oplus}\text{···N—C}_2\text{H}_5 \quad X^-$$

$$\text{—(CF}_2\text{—CF)}_n\text{—}$$
$$|$$
$$\text{OCHFCF}_2\text{—N}^{\oplus}(\text{CH}_3)\text{···N—CH}_3 \quad X^-$$

$$\text{—(CF}_2\text{—CF)}_n\text{—}$$
$$|$$
$$\text{OCH}_2\text{CF}_2\text{—N}^{\oplus}\text{···N—CH}_3 \quad X^-$$

$$\text{—(CF}_2\text{—CF)}_n\text{—}$$
$$|$$
$$\text{OCH}_2\text{CF}_2\text{—N}^{\oplus}\text{···NH} \quad X^-$$

$$\text{—(CF}_2\text{—CF)}_n\text{—}$$
$$|$$
$$\text{OCH}_2\text{CF}_2\text{—N}^{\oplus}\text{···N—CH}_2\text{OCH}_3 \quad X^-$$

$$\text{—(CF}_2\text{—CF)}_n\text{—}$$
$$|$$
$$\text{OCF}_2\text{CHFCF}_2\text{—N}^{\oplus}\text{···N—CH}_3 \quad X^-$$

$$\text{—(CF}_2\text{—CF)}_n\text{—}$$
$$|$$
$$\text{OCF}_2\text{CHFCF}_2\text{—N}^{\oplus}\text{···NH} \quad X^-$$

$$\text{—(CF}_2\text{—CF)}_n\text{—}$$
$$|$$
$$\text{OCF}_2\text{CHFCF}_2\text{—N}^{\oplus}\text{···N—CH}_2\text{OCH}_3 \quad X^-$$

$$\text{—(CF}_2\text{—CF)}_n\text{—}$$
$$|$$
$$\text{OCF}_2\text{CHFCF}_2\text{—N}^{\oplus}\text{···N—C}_2\text{H}_5 \quad X^-$$

$$\text{—(CF}_2\text{—CF)}_n\text{—}$$
$$|$$
$$\text{OCF}_2\text{CHFCF}_2\text{—N}^{\oplus}(\text{CH}_3)\text{···N—CH}_3 \quad X^-$$

92

-continued $$\text{—(CF}_2\text{—CF)}_n\text{—}$$
$$|$$
$$\text{OCF}_2\text{CHFCF}_2\text{—N}^{\oplus}\text{···N—CH}_3 \quad X^-$$

$$\text{—(CF}_2\text{—CF)}_n\text{—}$$
$$|$$
$$\text{OCF}_2\text{CF}_2\text{CHFCF}_2\text{—N}^{\oplus}\text{···NH} \quad X^-$$

$$\text{—(CF}_2\text{—CF)}_n\text{—}$$
$$|$$
$$\text{OCF}_2\text{CF}_2\text{CHFCF}_2\text{—N}^{\oplus}\text{···N—CH}_2\text{OCH}_3 \quad X^-$$

$$\text{—(CF}_2\text{—CF)}_n\text{—}$$
$$|$$
$$\text{OCF}_2\text{CF}_2\text{CHFCF}_2\text{—N}^{\oplus}\text{···N—C}_2\text{H}_5 \quad X^-$$

$$\text{—(CF}_2\text{—CF)}_n\text{—}$$
$$|$$
$$\text{OCF}_2\text{CF}_2\text{CHFCF}_2\text{—N}^{\oplus}(\text{CH}_3)\text{···N—CH}_3 \quad X^-$$

$$\text{—(CF}_2\text{—CF)}_n\text{—}$$
$$|$$
$$\text{OCF}_2\text{CFOCF}_2\text{CHFCF}_2\text{—N}^{\oplus}\text{···N—CH}_3 \quad X^-$$
$$|$$
$$\text{CF}_3$$

$$\text{—(CF}_2\text{—CF)}_n\text{—}$$
$$|$$
$$\text{OCF}_2\text{CFOCF}_2\text{CHFCF}_2\text{—N}^{\oplus}\text{···NH} \quad X^-$$
$$|$$
$$\text{CF}_3$$

$$\text{—(CF}_2\text{—CF)}_n\text{—}$$
$$|$$
$$\text{OCF}_2\text{CFOCF}_2\text{CHFCF}_2\text{—N}^{\oplus}\text{···N—CH}_2\text{OCH}_3 \quad X^-$$
$$|$$
$$\text{CF}_3$$

$$\text{—(CF}_2\text{—CF)}_n\text{—}$$
$$|$$
$$\text{OCF}_2\text{CFOCF}_2\text{CF}_2\text{CHFCF}_2\text{—N}^{\oplus}\text{···N—CH}_3 \quad X^-$$
$$|$$
$$\text{CF}_3$$

$$\text{—(CF}_2\text{—CF)}_n\text{—}$$
$$|$$
$$\text{OCF}_2\text{CFOCF}_2\text{CF}_2\text{CHFCF}_2\text{—N}^{\oplus}\text{···NH} \quad X^-$$
$$|$$
$$\text{CF}_3$$

$$\text{—(CF}_2\text{—CF)}_n\text{—}$$
$$|$$
$$\text{O—(CF}_2\text{CFO)}_m\text{—CF}_2\text{CHFCF}_2\text{—N}^{\oplus}\text{···N—CH}_3 \quad X^-$$
$$|$$
$$\text{CF}_3$$

$$\text{—(CF}_2\text{—CF)}_n\text{—}$$
$$|$$
$$\text{O—(CF}_2\text{CFO)}_m\text{—CF}_2\text{CHFCF}_2\text{—N}^{\oplus}\text{···NH} \quad X^-$$
$$|$$
$$\text{CF}_3$$

$$\text{—(CF}_2\text{—CF)}_n\text{—}$$
$$|$$
$$\text{O—(CF}_2\text{CFO)}_m\text{—CF}_2\text{CF}_2\text{CHFCF}_2\text{—N}^{\oplus}\text{···N—CH}_3 \quad X^-$$
$$|$$
$$\text{CF}_3$$

$$\text{—(CF}_2\text{—CF)}_n\text{—}$$
$$|$$
$$\text{O—(CF}_2\text{CFO)}_m\text{—CF}_2\text{CF}_2\text{CHFCF}_2\text{—N}^{\oplus}\text{···NH} \quad X^-$$
$$|$$
$$\text{CF}_3$$

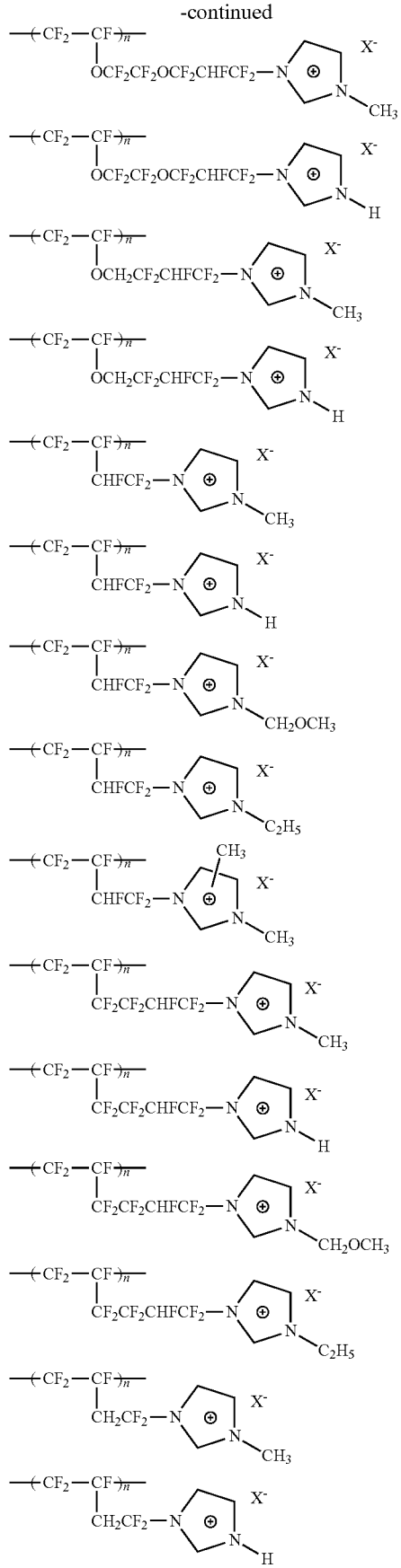
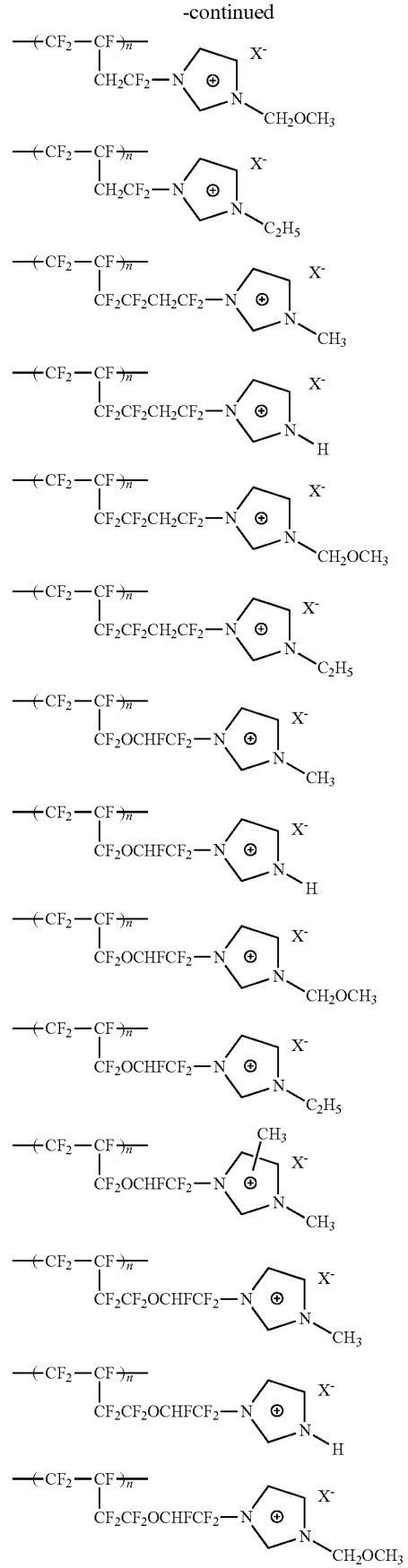

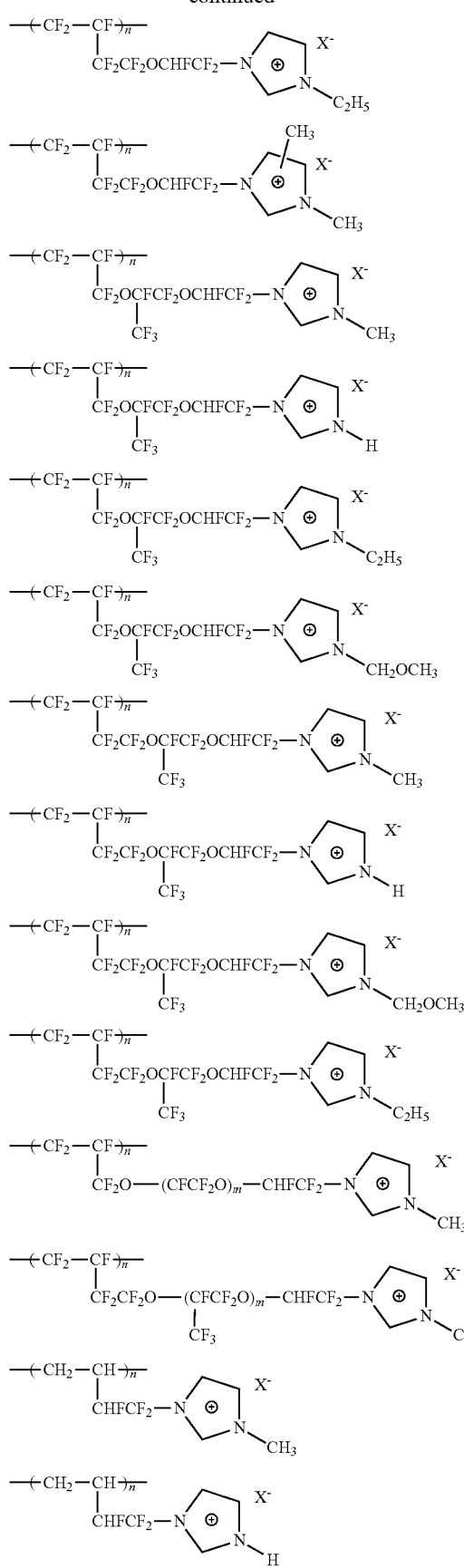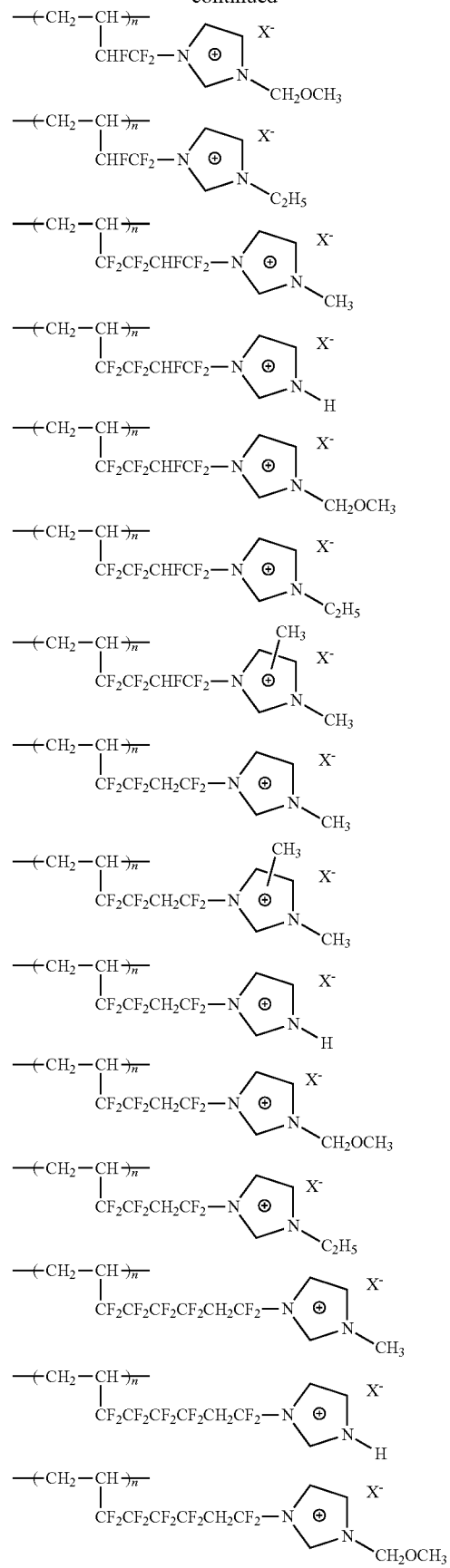

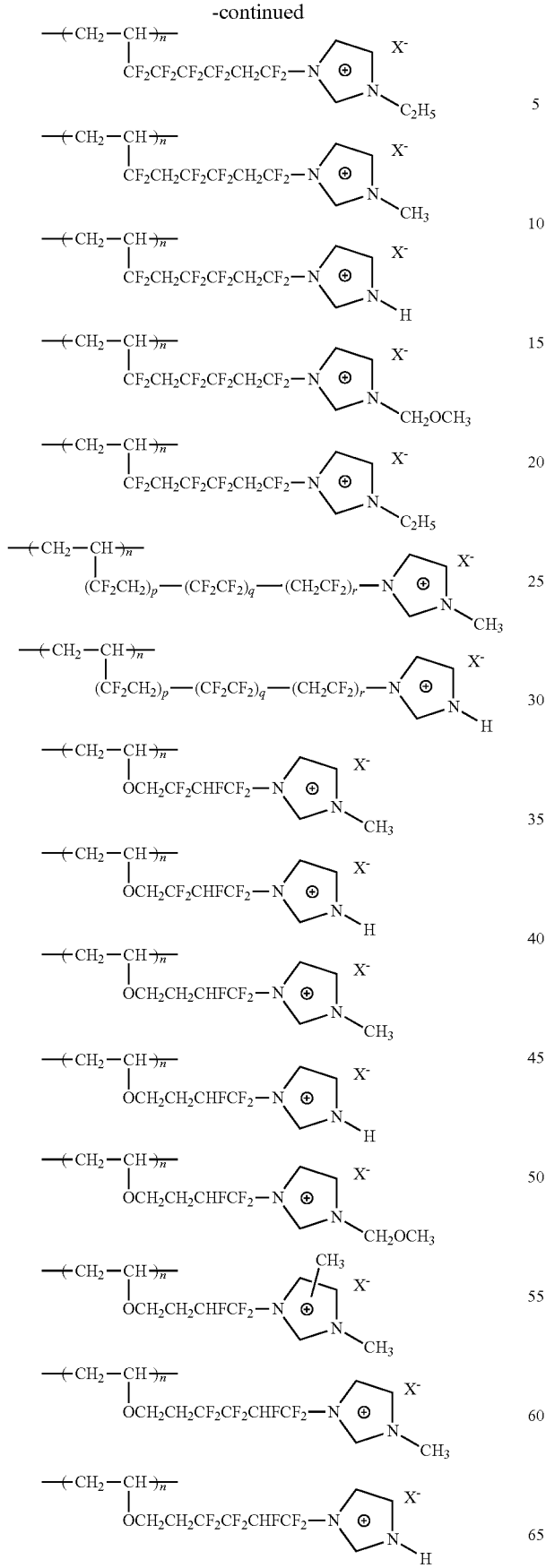
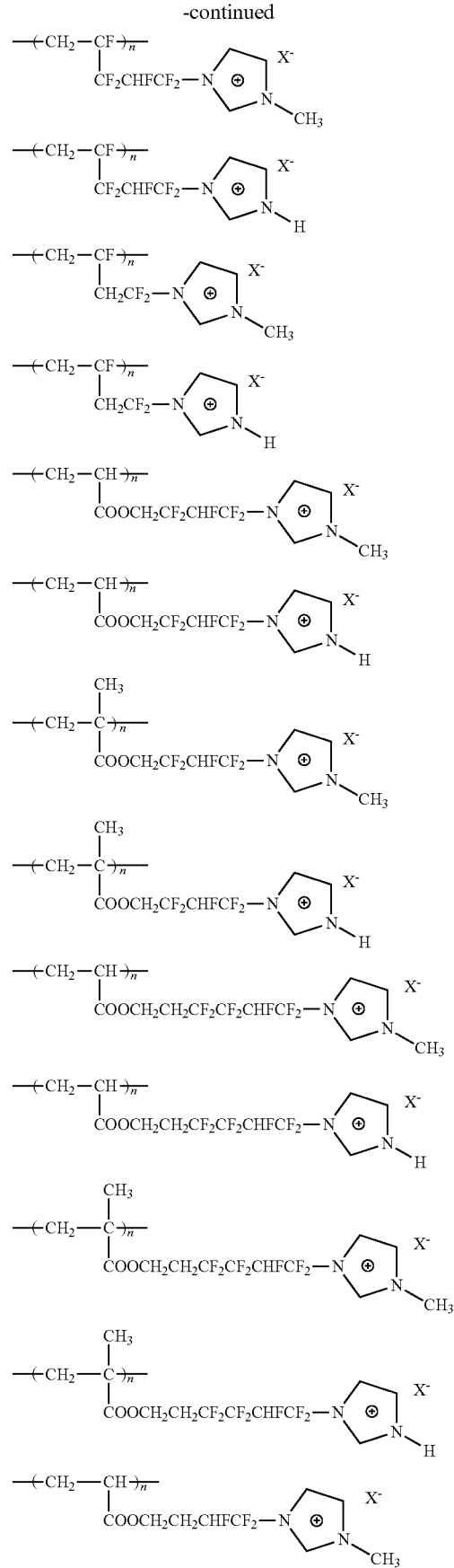

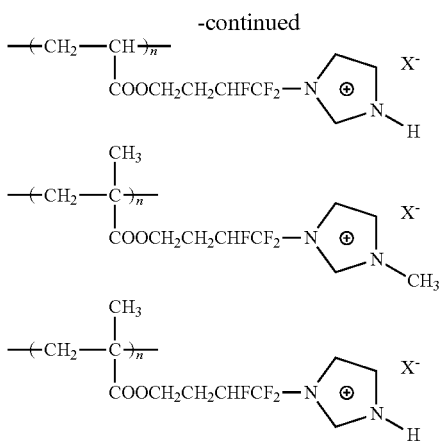

wherein n is from 1 to 4,000; m is from 0 to 8, p is from 0 to 10; q is from 0 to 8; r is from 1 to 10; $X^-$ is $F^-$, $Cl^-$, $Br^-$, $I^-$, $ClO_4^-$, $NO_3^-$, $H(HF)_x^-$, $\frac{1}{2}CO_3^{2-}$, $\frac{1}{2}SO_4^{2-}$, $BF_4^-$, $PF_6^-$, $SbF_6^-$, $(CN)_2N^-$, $(CF_3SO_2)_2N^-$, $(C_2F_5SO_2)_2N^-$, $[F(CF_2)_xSO_2]_2N^-$, $[F(CF_2)_xSO_2](CF_3SO_2)N^-$, $CF_3SO_3^-$, $C_2F_5SO_3^-$, $F(CF_2)_xSO_3^-$, $CH_3SO_3^-$, $H(CH_2)_ySO_3^-$, $PhSO_3^-$, $CH_3C_6H_4SO_3^-$, $CF_3CO_2^-$, $F(CF_2)_xCO_2^-$, $H(CF_2)_xCO_2^-$, $CF_3O[CF(CF_3)CF_2O]_xCF(CF_3)CO_2^-$, $C_3F_7O[CF(CF_3)CF_2O]_xCF(CF_3)CO_2^-$, $CH_3CO_2^-$, $H(CH_2)_yCO_2^-$, $PhCO_2^-$, $(CF_3CO)_2CH^-$, $[F(CF_2)_xCO]_2CH^-$, $[F(CF_2)_xCO](CF_3CO)CH^-$, $(CF_3SO_2)_3C^-$, $(C_2F_5SO_2)_3C^-$, $[F(CF_2)_xSO_2]_3C^-$, $[F(CF_2)_xSO_2](CF_3SO_2)_2C^-$, $\frac{1}{2}CF_3P(O)(O^-)_2$, $\frac{1}{2}C_2F_5P(O)(O^-)_2$, $\frac{1}{2}F(CF_2)_xP(O)(O^-)_2$, $(CF_3)_2P(O)O^-$, $(C_2F_5)_2P(O)O^-$, $[F(CF_2)_x]_2P(O)O^-$, $(CF_3)[F(CF_2)_x]P(O)O^-$, $(CF_3)[H(CH_2)_y]P(O)O^-$, $(C_2F_5)[H(CH_2)_y]P(O)O^-$, or $[F(CF_2)_x][H(CH_2)_y]P(O)O^-$, where x is from 1 to 10; y is from 1 to 8.

The ionic group-containing fluorine-containing polymer (2) of the present invention can be used as various materials comprising heteroaromatic ring compounds having a stable fluorine-containing heteroaromatic ring, for example, ionic polymers having various functions useful for solid or gel polymer electrolytes for fuel cell, secondary battery, capacitor, dye-sensitized solar cell and electrochromic device; reaction media having a complex forming action and/or stabilizing action in chemical reactions; catalyst for chemical reactions; separating agent in gas separation and liquid separation; ion exchange membrane; coating agent having sterilizing action and/or antistatic action; coating agent and ion exchange membrane for small parts for improving dispersibility and/or electrophoretic mobility of natural or synthetic fiber, woven fabric, knitted fabric, fleece, net, mat, film or sheet comprising natural or synthetic fiber. Further the polymer is also useful as materials for electrochemical actuator element.

It is known that usually when a hydrocarbon ionic liquid is mixed to a perfluoro solvent, it is separated and are not mixed to each other, and an ionic liquid having a fluoroalkyl chain has an effect of dispersing a hydrocarbon ionic liquid in a perfluoro solvent (T. L. Merrigan et al., Chem. Comm., pp. 2051-2052 (2000)), and it is also known that when a hydrocarbon ionic liquid is mixed to Nation (trade mark of Du Pont) which is a fluorine-containing resin having a sulfonic acid group, cation exchange occurs and there is an effect that properties as an electrolyte rather than properties as a solvent are exhibited (T. Schafer, et al., Chem. Comm., pp. 2594-2596 (2005)). In such applications, it is considered that when an ionic liquid having a fluoroalkyl chain is used for resins having a high content of fluorine atoms, cation exchange can be carried out more effectively.

Therefore, if the group-containing even ionic fluorine-containing polymer (2) is a solid at normal temperature, as described in the above-mentioned publications, by dispersing or dissolving the ionic group-containing fluorine-containing polymer (2) in an other polymer, a solvent or an ionic liquid, ionic conductivity and a function of accelerating dispersion of additives can be exhibited by participation of a fluorine-containing heteroaromatic ring structure.

The present invention also relates to a polymer composition comprising (I) the fluorine-containing polymer (1) having heteroaromatic ring and/or the ionic group-containing fluorine-containing polymer (2) of the present invention and (II) the nano filler.

Suitable as the nano filler (II) is a nano carbon material.

To the composition of the present invention may be further blended a fluorine-containing or non-fluorine-containing ionic liquid.

An amount of the nano filler (II) may be optionally selected depending on purpose, required characteristics, application and kind of the nano filler, and is from 0.1 to 30 parts by mass, preferably from 1.0 to 15 parts by mass based on 100 parts by mass of the fluorine-containing polymer (I) of the present invention.

Examples of the nano filler (II) which can be suitably used in the present invention are those exemplified below.

Examples of the nano filler are nano carbon materials, metal- and hetero atom-containing compounds, and nano particles of metal, and at least one of them can be selected and used. Herein "nano filler" means a filler, in which at least a part thereof has a structure (in the form of particle, sheet, layer, needle, bar, fiber or tube) of nano level (from 0.1 nm to 1,000 nm). Each of the above-mentioned nano fillers is explained below.

(A) Nano Carbon Materials

Nano carbon materials are compounds comprising carbon atoms and having a structure of nano level, and examples thereof are as follows.

(a) Fullerene

Fullerene is a carbon molecule comprising 60 or more carbon atoms and having a structure formed by bonding in a spherical form.

(b) Carbon Nano Ball (Carbon Black)

Carbon nano ball is a black or grayish black powder produced by thermal decomposition of hydrocarbon subjected to incomplete combustion.

(c) Carbon Nano Fiber

Carbon nano fiber is synthesized by thermal decomposition of carbon sources of gaseous phase by using a metallic catalyst such as iron and cobalt. With respect to a structure of a fibrous carbon, there are known three kinds of orientation of carbon network to a fiber axis, that is, parallel (ribbon type), vertical (platelet type) and inclined (herringbone type).

(d) Carbon Nanotube

Carbon nanotube is a kind of carbon nano fiber. It is a kind of "Fullerene" in which a six-membered ring network (graphene sheet) is in the form of a single layer or a coaxial tubular multi-layer. Carbon nanotube having a single layer is called a single wall nanotube (SWNT), and one having a multi-layer is called a multi wall nanotube (MWNT). Especially one having two layers is called a double wall nanotube (DWNT).

Examples of these nano carbon materials are those disclosed in Chemical Industry Vol. 56, pp. 50-62 (2005) and Langmuir, Vol. 11, pp. 3,682-3,866 (1995). In these nano carbon materials, a carbon nano fiber is preferable, and a carbon nanotube is especially preferable.

(B) Metal- and Hetero Atom-Containing Compounds

These are compounds comprising metal and hetero atom as main components. Examples of metal are alkali metals (lithium, sodium, potassium, etc.), alkali earth metals (calcium, magnesium, barium, etc.), transition metals (titanium, vanadium, niobium, chromium, molybdenum, tungsten, iron, manganese, ruthenium, cobalt, nickel, palladium, platinum, copper, silver, gold, zinc, cadmium, mercury, lanthanide group metals, actinoid group metals, etc.), and typical metal elements (aluminum, silicon, gallium, indium, tin, bismuth, lead, etc.). Examples of hetero atoms are boron of group 13 of Periodic Table, nitrogen, phosphorus and arsenic of group 15 of Periodic Table, oxygen, sulfur, selenium and tellurium of group 16 of Periodic Table, and fluorine, chlorine, bromine and iodine of group 17 of Periodic Table. In the embodiment of the present invention, boron, nitrogen, phosphorus, oxygen and sulfur are preferable as a hetero atom.

Examples of this metal- and hetero atom-containing compound are metallic oxides (clay mineral, double hydroxide, perovskite and other metallic oxides), metallic phosphates and metal chalcogenides. Of these, metallic oxides are preferable. Also among these metal- and hetero atom-containing compounds, compounds having a structure of particle form, compounds having a structure of layer or sheet form and compounds having a structure of needle, bar, fiber or tube form are especially preferable. Further metal- and hetero atom-containing compounds having a structure of layer form are especially preferable.

Specific examples of metal- and hetero atom-containing compound are those exemplified below.

(a) Clay Minerals

Clay minerals (hereinafter may be referred to as "clays") are silicate minerals, etc. having a layered structure formed by laminating a lot of sheets. The sheet forming a layer may be one obtained by bonding a lot of tetrahedrons comprising silicate on a plane level or may be one obtained by bonding a lot of octahedrons comprising aluminum and magnesium on a plane level. Clay minerals may be natural clay minerals, treated natural clay minerals or synthesized clay minerals such as swellable fluorinated mica.

Examples of the above-mentioned clay minerals are not limited particularly, and there are montmorillonite, bentonite, kaolinite, imogolite, mica, hectorite, fluorohectorite, saponite, beidellite, nontronite, stevensite, vermiculite, halloysite, volkonskoite, suconite, margadite and kenyarite. In the embodiment of the present invention, at least one of them can be selected and used.

Among these clay minerals, those of sheet (layered) form are preferable. Usually one layer of clay mineral of sheet (layered) form has a thickness of several nanometers or less. Especially preferable thickness of a sheet (layer) is not more than 2 nm.

(b) Double Hydroxides

A double hydroxide is, for example, one of layered compounds comprising layered sheets of positively charged divalent or trivalent metallic hydroxides represented by the following general formula (3):

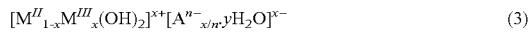

wherein $M^{II}$ is a divalent metal; $M^{III}$ is a trivalent metal; $A^{n-}$ is an anion containing an anion of aromatic amino carboxylic acid; n is the number of valences of the above-mentioned anion; x is a value of from 0 to 0.4; y is a real number larger than 0. For compensating positive charge of the hydroxide sheets, anion is incorporated between the layers.

In the present invention, especially double hydroxides of particle form, double hydroxides of layer or sheet form, and double hydroxides of needle, bar or fiber form are preferable, and further double hydroxides of layer form are especially preferable.

(c) Perovskite

Perovskite is one kind of tetragonal crystal structure. The same crystal structure as perovskite is called perovskite structure. For example, transition metal oxides comprising three elements of RMO3 like $BaTiO_3$ (barium titanate) have this crystal structure. Perovskite has ideally a unit cell of cubic system, and metals R are positioned at each top of the cube, metal M is positioned at a body center, and oxygens O are positioned at each center face of the cube. Examples of perovskite are those raised in Catalyst, Vol. 47, pp. 290-294 (2005). In the embodiments of the present invention, especially perovskite of particle form, perovskite of layer or sheet form, and perovskite of needle, bar or fiber form are preferable, and further perovskite of layer form is especially preferable.

(d) Other Metallic Oxides

There are metallic oxides having a size of nano level and a structure of particle, layer, sheet, needle, bar, fiber or tube form other than the metallic oxides classified above.

Examples of metallic oxides other than those classified above are silica, alumina, iron oxide, zinc oxide, zirconia and titania. In addition, for example, there are metallic oxides exemplified in Catalyst, Vol. 47, pp. 279-294 (2005).

(e) Metal Phosphates

There are, for example, metal phosphates represented by the following general formula (4):

$$M(HPO_4)_2 \tag{4}$$

wherein M represents Ti, Zr, Ce or Sn, and the general formula (5):

$$Zr(ROPO_3)_2 \tag{5}$$

wherein R represents H, $R^h$ or Me.

Among these, especially metal phosphates of particle form, metal phosphates of layer or sheet form, and metal phosphates of needle, bar or fiber form are preferable, and further metal phosphates of layer form are especially preferable.

(f) Metal Chalcogenides (Sulfur, Selenium, Tellurium)

There are, for example, metal chalcogenides represented by the following general formula (6):

$$MX_2 \tag{6}$$

wherein M represents Ti, Zr, Hf, V, Nb, Ta, Mo or W; X is S or Se, and the general formula (7):

$$MPX_3 \tag{7}$$

wherein M represents Mg, V, Mn, Fe, Co, Ni, Zn, Cd or In; X is S or Se.

(C) Nano Particles of Metal

Nano particles of metal are metal particles having a particle size of from 1 to 100 nanometers (1 nanometer is a-one-to-a-million millimeter). Metal constituting the nano particles of metal is one kind or at least two kinds of metals selected from the group consisting of Ag, Au, Cu, Pt, Pd, W, Ni, Ta, In, Sn, Zn, Cr, Fe, Co and Si, or an alloy comprising at least two kinds of these metals, and is optionally selected depending on purpose and application.

The ionic liquid (III) which may be optionally added are called a normal temperature molten salt or is simply called a molten salt, and is a salt showing a molten state within a wide temperature range including normal temperature (room temperature).

In the present invention, various known ionic liquids can be used, and preferable are those which are stable and show a molten state at normal temperature (room temperature) or at a temperature as close to normal temperature as possible. In the present invention, ionic liquids in a molten state at normal temperature having a conductivity of not less than 0.1 $Sm^{-1}$ are preferable.

Examples of ionic liquids to be suitably used in the present invention are those comprising any of cations (preferably an imidazolium ion) represented by the following formulas (I) to (IV) and an anion ($X^-$).

Formula (I):

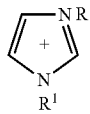

Formula (II):

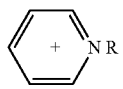

[NR$_x$H$_{4-x}$]$^+$     Formula (III)

[PR$_x$H$_{4-x}$]$^+$     Formula (IV)

In these formulas (I) to (IV), R is an alkyl group which has 1 to 12 carbon atoms and may have halogen atom or an alkyl group having ether bond which has the total number of carbon atoms and oxygen atoms of from 3 to 12 and may have halogen atom, and in the formula (I), $R^1$ is an alkyl group which has 1 to 4 carbon atoms and may have halogen atom or is hydrogen atom. In the formula (I), it is preferable that R and $R^1$ are not the same. In the formulas (III) and (IV), each of x is an integer of 1 to 4.

Further there can be used salts of fluorine-containing imidazole compound represented by the formula (V):

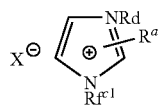

wherein $R^a$s are the same or different, and each is halogen atom, a functional group or an organic group and may be present or may not be present, and when $R^a$s are present, the whole or a part of hydrogen atoms of the heteroaromatic ring are substituted by them; $Rf^{c1}$ is a fluoroalkyl group represented by the formula (c):

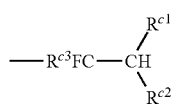

where $R^{c1}$, $R^{c2}$ and $R^{c3}$ are the same or different and each is H, halogen atom, a functional group or a monovalent organic group which may be substituted by halogen atom, may have ether bond and may have polymerizable group, or a monovalent organic group which may have one or more residues defined by deleting $Rf^{c1}$ from the formula (V); Rd is H or a monovalent organic group; X is a counter anion.

Of these salts of fluorine-containing imidazole compound, those other than the compounds having $Rf^{c1}$ of —$CFHCF_3$, —$CF_2CFZ^3H$ or —$CF=CFZ^3$ ($Z^3$ is F or Cl) are novel compounds.

The salts of fluorine-containing imidazole compound represented by the formula (V) can be prepared by allowing the imidazole compound represented by the formula (A):

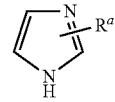

wherein $R^a$s are the same or different, and each is halogen atom, a functional group or an organic group and may be present or may not be present, and when $R^a$s are present, the whole or a part of hydrogen atoms of the heteroaromatic ring are substituted by them, to react with the fluoroalkene (B) represented by the formula (B):

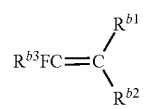

wherein $R^{b1}$, $R^{b2}$ and $R^{b3}$ are the same or different and each is H, halogen atom, a functional group or a monovalent organic group which may be substituted by halogen atom, may have ether bond and may have polymerizable group, to synthesize a fluorine-containing imidazole compound represented by the formula (C):

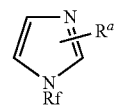

wherein $R^a$s are the same or different, and each is halogen atom, a functional group or an organic group and may be present or may not be present, and when $R^a$s are present, the whole or a part of hydrogen atoms of the heteroaromatic ring are substituted by them; Rf is $Rf^1$ where $Rf^1$ is the same as the formula (c) or is a monovalent organic group which may have at least one residue defined by deleting Rf group from the formula (C), and then acting a salt forming compound on the fluorine-containing imidazole compound and as case demands, carrying out anion exchange.

Nonlimiting examples of imidazole compound cation are, for instance, non-fluorine-containing imidazole compound cations such as 1-ethyl-3-methylimidazolium cation, 1-methyl-3-propylimidazolium cation, 1-isopropyl-3-methylimidazolium cation, 1-butyl-3-methylimidazolium cation, 1-isobutyl-3-methylimidazolium cation, 1-sec-butyl-3-methylimidazolium cation, 1-methoxymethyl-3-methylimidazolium cation, 1-methoxyethyl-3-methylimidazolium cation, 1-ethyl-3-propylimidazolium cation, 1-ethyl-3-isopropylimidazolium cation, 1-ethyl-3-butylimidazolium cation, 1-ethyl-3-isobutylimidazolium cation, 1-ethyl-3-sec-butylimidazolium cation, 1-ethyl-3-methoxymethylimidazolium cation, 1-ethyl-3-methoxyethylimidazolium cation, 1-methylimidazolium cation, 1-ethylimidazolium cation, 1-propylimidazolium cation, 1-isopropylimidazolium cation, 1-butylimidazolium cation, 1-isobutylimidazolium cation, 1-sec-butylimidazolium cation, 1-methoxymethylimidazolium cation, 1-methoxyethylimidazolium cation, 1,2-dimethyl-3-ethylimidazolium cation, 1,2-dimethyl-3-propylimidazolium cation, 1,2-dimethyl-3-isopropylimidazolium cation, 1,2-dimethyl-3-butylimidazolium cation, 1,2-dimethyl-3-isobutylimidazolium cation, 1,2-dimethyl-3-sec-butylimidazolium cation, 1,2-dimethyl-3-methoxymethylimidazolium cation and 1,2-dimethyl-3-methoxyethylimidazolium cation; and fluorine-containing imidazole compound cations such as 1-methyl-3-trifluoromethylimidazolium cation, 1-difluoromethyl-3-methylimidazolium cation, 1-methyl-3-pentafluoroethylimidazolium cation, 1-methyl-3-(2,2,2-trifluoroethyl)imidazolium cation, 1-(1,1-difluoroethyl)-3-methylimidazolium cation, 1-methyl-3-(1,1,2,2-tetrafluoroethyl)imidazolium cation, 1-(2-chloro-1,1,2-trifluoroethyl)-3-methylimidazolium cation, 1-heptafluoropropyl-3-methylimidazolium cation, 1-heptafluoroisopropyl-3-methylimidazolium cation, 1-(1,1,2,3,3,3-hexafluoropropyl)-3-methylimidazolium cation, 1-methyl-3-(1,1,2,3,3,4,4,4-octafluorobutyl)imidazolium cation, 1-methyl-3-(2-trifluoromethoxy-1,1,2-trifluoroethyl)imidazolium cation, 1-(2-heptafluoropropoxy-1,1,2-trifluoroethyl)-3-methylimidazolium cation, 1-ethyl-3-trifluoromethylimidazolium cation, 1-difluoromethyl-3-ethylimidazolium cation, 1-ethyl-3-pentafluoroethylimidazolium cation, 1-ethyl-3-(2,2,2-trifluoroethyl)imidazolium cation, 1-(1,1-difluoroethyl)-3-ethylimidazolium cation, 1-ethyl-3-(1,1,2,2-tetrafluoroethyl) imidazolium cation, 1-(2-chloro-1,1,2-trifluoroethyl)-3-ethylimidazolium cation, 1-ethyl-3-heptafluoropropylimidazolium cation, 1-ethyl-3-heptafluoroisopropylimidazolium cation, 1-ethyl-3-(1,1,2,3,3,3-hexafluoropropyl)imidazolium cation, 1-ethyl-3-(1,1,2,3,3,4,4,4-octafluorobutyl)imidazolium cation, 1-ethyl-3-(2-trifluoromethoxy-1,1,2-trifluoroethyl)imidazolium cation, 1-ethyl-3-(2-heptafluoropropoxy-1,1,2-trifluoroethyl)imidazolium cation, 1-trifluoromethylimidazolium cation, 1-difluoromethylimidazolium cation, 1-pentafluoroethylimidazolium cation, 1-(2,2,2-trifluoroethyl)imidazolium cation, 1-(1,1-difluoroethyl)imidazolium cation, 1-(1,1,2,2-tetrafluoroethyl)imidazolium cation, 1-(2-chloro-1,1,2-trifluoroethyl)imidazolium cation, 1-heptafluoropropylimidazolium cation, 1-heptafluoroisopropylimidazolium cation, 1-(1,1,2,3,3,3-hexafluoropropyl)imidazolium cation, 1-(1,1,2,3,3,4,4,4-octafluorobutyl)imidazolium cation, 1-(2-trifluoromethoxy-1,1,2-trifluoroethyl)imidazolium cation, 1-(2-heptafluoropropoxy-1,1,2-trifluoroethyl)imidazolium cation, 2-fluoro-1-ethyl-3-methylimidazolium cation, 2-fluoro-1-methyl-3-propylimidazolium cation, 2-fluoro-1-isopropyl-3-methylimidazolium cation, 2-fluoro-1-butyl-3-methylimidazolium cation, 2-fluoro-1-isobutyl-3-methylimidazolium cation, 2-fluoro-1-sec-butyl-3-methylimidazolium cation, 2-fluoro-1-methoxymethyl-3-methylimidazolium cation, 2-fluoro-1-methoxyethyl-3-methylimidazolium cation, 2-fluoro-1-methyl-3-trifluoromethylimidazolium cation, 2-fluoro-1-methyl-3-pentafluoroethylimidazolium cation, 2-fluoro-1-methyl-3-(2,2,2-trifluoroethyl)imidazolium cation, 2-fluoro-1-(1,1-difluoroethyl)-3-methylimidazolium cation, 2-fluoro-1-methyl-3-(1,1,2,2-tetrafluoroethyl)imidazolium cation, 1-(2-chloro-1,1,2-trifluoroethyl)-2-fluoro-3-methylimidazolium cation, 2-fluoro-1-heptafluoropropyl-3-methylimidazolium cation, 2-fluoro-1-heptafluoroisopropyl-3-methylimidazolium cation, 2-fluoro-1-(1,1,2,3,3,3-hexafluoropropyl)-3-methylimidazolium cation, 2-fluoro-1-methyl-3-(1,1,2,3,3,4,4,4-octafluorobutyl)imidazolium cation, 2-fluoro-1-methyl-3-(2-trifluoromethoxy-1,1,2-trifluoroethyl) imidazolium cation, 2-fluoro-1-(2-heptafluoropropoxy-1,1,2-trifluoroethyl)-3-methylimidazolium cation, 1,2-dimethyl-3-trifluoromethylimidazolium cation, 1,2-dimethyl-3-pentafluoroethylimidazolium cation, 1,2-dimethyl-3-(2,2,2-trifluoroethyl) imidazolium cation, 1,2-dimethyl-a-(1,1-difluoroethyl)imidazolium cation, 1,2-dimethyl-3-(1,1,2,2-tetrafluoroethyl) imidazolium cation, 1,2-dimethyl-3-(2-chloro-1,1,2-trifluoroethyl)imidazolium cation, 1,2-dimethyl-3-heptafluoropropylimidazolium cation, 1,2-dimethyl-3-heptafluoroisopropylimidazolium cation, 1,2-dimethyl-3-(1,1,2,3,3,3-hexafluoropropyl) imidazolium cation, 1,2-dimethyl-3-(1,1,2,3,3,4,4,4-octafluorobutyl) imidazolium cation, 1,2-dimethyl-3-(2-trifluoromethoxy-1,1,2-trifluoroethyl) imidazolium cation, and 1,2-dimethyl-3-(2-heptafluoropropoxy-1,1,2-trifluoroethyl)imidazolium cation.

Preferable as the anion ($X^-$) is at least one kind selected from tetrafluoroboric acid anion, hexafluorophosphoric acid anion, bis(trifluoromethanesulfonyl)imidic acid anion, perchloric acid anion, tris(trifluoromethanesulfonyl)carbonic acid anion, trifluoromethanesulfonic acid anion, dicyanamide anion, trifluoroacetic acid anion, organic carboxylic acid anion and halogen ion.

An amount of the ionic liquid (III) is 1.0 to 60 parts by mass, preferably 5.0 to 40 parts by mass based on 100 parts by mass of the fluorine-containing polymer (I).

The ionic group-containing fluorine-containing polymer (2) of the present invention is useful as a material for an electrochemical actuator element as mentioned above. The electrochemical actuator element produced using the ionic group-containing fluorine-containing polymer (2) of the present invention is explained below.

Electrochemical actuator is expected as an actuator having a small size, and being light in weight and good in flexibility in the field of medical equipment, for industrial use and in the field of personal robot and micro machine.

Represented examples of an actuator element are an actuator element of a three-layered structure comprising the ion conducting layer and at least two electrode layers which are formed on the surface of the ion conducting layer and are insulated from each other, in which bending or deformation can be caused by applying an electric potential difference to the electrode layers, and an actuator element of a five-layered structure comprising the ion conducting layer, at least two electrode layers which are formed on the surface of the ion conducting layer and are insulated from each other, and conductive layers formed on the surfaces of the electrode layers, in which bending or deformation can be caused by applying an electric potential difference to the conductive layers (JP2005-176428A).

The ion conducting layer basically comprises a polymer and an ionic liquid, and the electrode layer basically comprises a polymer, an ionic liquid and a conductive material.

The ionic group-containing fluorine-containing polymer (2) of the present invention can be used alone (instead of the both of conventional polymer and ionic liquid) or in combination with the above-mentioned ionic liquid, as an ionic polymer material constituting the ion conducting layer and the electrode layer.

A conductive nano filler can be preferably used as a conductive material used for the electrode layer, and among the above-mentioned nano fillers, conductive ones can be preferably used. Especially preferable are conductive nano carbon materials, especially carbon nano tubes.

The electrochemical actuator element using the ionic group-containing fluorine-containing polymer (2) of the present invention can be put into practical use for wide applications since it can be driven at low voltage with stable and quick response in the air or in vacuo, is high in mechanical strength including flexibility, has long term repeated durability, and makes small-sizing easy because of very easy production method and a simple structure.

Example

The present invention is then explained by means of examples and synthesis examples, but is not limited to them.
Measuring methods used in the present invention are as follows.
(Identification of Compounds)
Compounds are identified according to $^1$H-NMR analysis, $^{19}$F-NMR analysis and elemental analysis.
NMR measuring equipment: available from BRUKER
Measuring condition of $^1$H-NMR: 300 MHz (tetramethylsilane=0 ppm)
Measuring condition of $^{19}$F-NMR: 282 MHz (trichlorofluoromethane=0 ppm)
IR analysis: Measuring is carried out at room temperature with a Fourier-transform infrared spectrophotometer 1760× available from Perkin Elmer Co., Ltd.

Synthesis Example 1

Into a 50 ml autoclave was poured 6.81 g (100 mmol, melting point: 89° C.) of imidazole, and evacuation and replacement by nitrogen were carried out three times at room temperature. After the inside of a system was evacuated, tetrafluoroethylene (TFE) was introduced until the inside pressure of the system reached 0.1 MPa·G. Then the temperature of the reaction system was increased to 100° C. which was not less than the melting point of imidazole, and TFE was further introduced to maintain the inside pressure of the reaction system at 0.3 to 0.5 MPa·G. Supply of TFE was stopped when the amount of TFE reached 1.1 equivalents (11 g=110 mmol) to imidazole, and stirring was continued at 100° C. Eight hours after starting of the stirring, the inside of the reaction system was brought to room temperature, followed by evacuation and distillation in such a state to obtain 14.5 g of distillate at 93° C./96 mmHg (yield: 86%).
According to a NMR analysis, it was confirmed that this product was 1-(1,1,2,2-tetrafluoroethyl)imidazole. To this crude reaction product was added ethyl trifluoroacetate (2.84 g=20 mmol), and yield by a $^{19}$F-NMR analysis based on ethyl trifluoroacetate was 98%.
$^{19}$F-NMR (CD$_3$COCD$_3$): δ−102.3 (2F), −142.3 (2F) ppm
$^1$H-NMR (CD$_3$COCD$_3$): δ6.82 (1H, tt), 7.18 (1H, s), 7.48 (1H, s), 8.04 (1H, s) ppm Synthesis Example 2

Into a 50 ml autoclave were poured 1.36 g (20 mmol) of imidazole and tetrahydrofuran (30 ml), and the inside of the autoclave was cooled to −78° C., and evacuation and replacement by nitrogen were carried out three times. After the inside of a system was evacuated, TFE was introduced until the inside pressure of the system reached 0.1 MPa·G. Then the temperature of the reaction system was increased to 100° C. which was not less than the melting point of imidazole, and TFE was further introduced to maintain the inside pressure of the reaction system at 0.3 to 0.5 MPa·G. Supply of TFE was stopped when the amount of TFE reached 1.1 equivalents (2.2 g=22 mmol) to imidazole, and stirring was continued at 100° C. Fifteen hours after starting of the stirring, the inside of the reaction system was brought to room temperature, followed by evacuation, and ethyl trifluoroacetate (1.42 g=10 mmol) was added to this crude reaction product. Yield by a $^{19}$F-NMR analysis based on ethyl trifluoroacetate was 89%.

Synthesis Example 3

Into a 50 ml autoclave were poured 6.81 g (100 mmol) of imidazole and tetrahydrofuran (1.0 ml) as a melting point depressor, and the inside of the autoclave was cooled to −78° C., and evacuation and replacement by nitrogen were carried out three times. After the inside of a system was evacuated, TFE was introduced until the inside pressure of the system reached 0.1 MPa·G. Then the temperature of the reaction system was increased to 50° C., and TFE was further introduced to maintain the inside pressure of the reaction system at 0.3 to 0.5 MPa·G. Supply of TFE was stopped when the amount of TFE reached 1.1 equivalents (11 g=110 mmol) to imidazole, and stirring was continued at 50° C. Eight hours after starting of the stirring, the inside of the reaction system was brought to room temperature, followed by evacuation to terminate the reaction. To this crude reaction product was added 2.84 g (20 mmol) of ethyl trifluoroacetate, and yield by a $^{19}$F-NMR analysis based on ethyl trifluoroacetate was 92%.

Synthesis Example 4

Into a 50 ml autoclave were poured 10.6 g (100 mmol) of potassium salt of imidazole and tetrahydrofuran (30 ml), and the inside of the autoclave was cooled to −78° C., and evacuation and replacement by nitrogen were carried out three times. After the inside of a system was evacuated, TFE was introduced until the inside pressure of the system reached 0.1 MPa·G. Then the temperature of the reaction system was increased to 100° C., and TFE was further introduced to maintain the inside pressure of the reaction system at 0.3 to 0.5 MPa·G. Supply of TFE was stopped when the amount of TFE reached 1.1 equivalents (11 g=110 mmol) to the potassium salt of imidazole, and stirring was continued at 100° C. Fifteen hours after starting of the stirring, the inside of the reaction system was brought to room temperature, followed by evacuation to terminate the reaction. To this crude reaction product was added 2.84 g (20 mmol) of ethyl trifluoroacetate, and it was confirmed by a $^{19}$F-NMR analysis based on ethyl trifluoroacetate that 1-(1,1,2,2-tetrafluoroethyl)imidazole had been produced at yield of 13% and 1-(1,2,2-trifluoroethenyl)imidazole had been produced at yield of 56%. Also according to gas chromatography analysis, it was confirmed that 14% of imidazole remained.
Then the entire crude reaction product was poured into water (30 ml), and subjected to extraction with ethyl acetate. After separation of an organic layer, drying with magnesium sulfate was carried out and concentration under reduced pressure was conducted. Then thereto was added 1.46 g (10 mmol) of benzotrifluoride, and it was confirmed by a $^{19}$F-NMR analysis based on benzotrifluoride that 1-(1,1,2,2-tetrafluoroethyl)imidazole had been produced at yield of 7% and 1-(1,2,2-trifluoroethenyl)imidazole had been produced at yield of 39%.

Synthesis Example 5

Into a 50 ml autoclave were poured 0.20 g (5 mmol) of metallic potassium and tetrahydrofuran (10 ml), and the inside of the autoclave was cooled to −78° C., and evacuation and replacement by nitrogen were carried out three times. Then thereto was added a solution obtained by dissolving 1.36 g (20 mmol) of imidazole in tetrahydrofuran (10 ml) at 10° C. over 30 minutes under pressurized nitrogen atmosphere. Thereafter tetrafluoroethylene (TFE) was introduced until the inside pressure of the system reached 0.1 MPa·G. Then the temperature of the reaction system was increased to 100° C., and TFE was further introduced to maintain the inside pressure of the reaction system at 0.3 to 0.5 MPa·G. Supply of TFE was stopped when the amount of TFE reached 1.1 equivalents (2.2 g=22 mmol) to imidazole, and stirring was continued at 100° C. Eight hours after starting of the stirring, the inside of the reaction system was brought to room temperature, followed by evacuation to terminate the reaction. To this crude reaction product was added 1.42 g (10 mmol) of ethyl trifluoroacetate, and it was confirmed by a $^{19}$F-NMR analysis based on ethyl trifluoroacetate that 1-(1,1,2,2-tetrafluoroethyl)imidazole had been produced at yield of 55% and 1-(1,2,2-trifluoroethenyl)imidazole had been produced at yield of 23%. Also according to gas chromatography, it was confirmed that 9% of imidazole remained.

Then the entire crude reaction product was poured into water (30 ml), and subjected to extraction with ethyl acetate. After separation of an organic layer, drying with magnesium sulfate was carried out and concentration under reduced pressure was conducted. Then thereto was added 1.46 g (10 mmol) of benzotrifluoride, and it was confirmed by a $^{19}$F-NMR analysis based on benzotrifluoride that 1-(1,1,2,2-tetrafluoroethyl)imidazole had been produced at yield of 41% and 1-(1,2,2-trifluoroethenyl)imidazole had been produced at yield of 19%.

Synthesis Example 6

Into a 50 ml autoclave was poured 6.81 g (100 mmol) of imidazole, and evacuation and replacement by nitrogen were carried out three times at room temperature. After the inside of a system was evacuated, hexafluoropropylene (HFP) was introduced until the inside pressure of the system reached 0.1 MPa·G. Then the temperature of the reaction system was increased to 100° C. which was not less than the melting point of imidazole, and HFP was further introduced to maintain the inside pressure of the reaction system at 0.3 to 0.5 MPa·G. Supply of HFP was stopped when the amount of HFP reached 1.1 equivalents (17 g=110 mmol) to imidazole, and stirring was continued at 100° C. Eight hours after starting of the stirring, the inside of the reaction system was brought to room temperature, followed by evacuation and distillation in such a state to obtain 16.5 g of distillate at 93° C./53 mmHg (yield: 76%).

According to a NMR analysis, it was confirmed that this product was 1-(1,1,2,3,3,3-hexafluoropropyl)imidazole. To this crude reaction product was added 2.84 g (20 mmol) of ethyl trifluoroacetate, and yield by a $^{19}$F-NMR analysis based on ethyl trifluoroacetate was 83%.

$^{19}$F-NMR (CD$_3$COCD$_3$): δ−73.9 (3F), −84.4 (1F), −91.2 (1F), −210.0 (1F) ppm $^{1}$H-NMR (CD$_3$COCD$_3$): δ6.26 (1H, m), 7.18 (1H, s), 7.53 (1H, s), 8.09 (1H, s) ppm Synthesis Example 7

Into a 50 ml autoclave was poured 6.71 g (100 mmol, melting point of −23° C.) of pyrrole, and evacuation and replacement by nitrogen were carried out three times at room temperature. After the inside of a system was evacuated, hexafluoropropylene (HFP) was introduced until the inside pressure of the system reached 0.1 MPa·G. Then the temperature of the reaction system was increased to 60° C., and HFP was further introduced to maintain the inside pressure of the reaction system at 0.3 to 0.5 MPa·G. Supply of HFP was stopped when the amount of HFP reached 1.1 equivalents (17 g=110 mmol) to pyrrole, and stirring was continued at 100° C. Eight hours after starting of the stirring, the inside of the reaction system was brought to room temperature, followed by evacuation and distillation in such a state to obtain 18.0 g of distillate at 108° C. (yield: 83%).

According to a NMR analysis, it was confirmed that this product was 1-(1,1,2,3,3,3-hexafluoropropyl)pyrrole. To this crude reaction product was added 2.84 g (20 mmol) of ethyl trifluoroacetate, and yield by a $^{19}$F-NMR analysis based on ethyl trifluoroacetate was 94%.

$^{19}$F-NMR (CD$_3$COCD$_3$): δ−74.2 (3F), −86.4 (1F), −89.5 (1F), −211.2 (1F) ppm $^{1}$H-NMR (CD$_3$COCD$_3$): δ6.26 (1H, m), 6.24 (2H, m), 6.75 (2H, m) ppm Synthesis Example 8

Into a 50 ml autoclave was poured 6.81 g (100 mmol, melting point of 67° C.) of pyrazole, and evacuation and replacement by nitrogen were carried out three times at room temperature. After the inside of a system was evacuated, hexafluoropropylene (HFP) was introduced until the inside pressure of the system reached 0.1 MPa·G. Then the temperature of the reaction system was increased to 75° C., and HFP was further introduced to maintain the inside pressure of the reaction system at 0.3 to 0.5 MPa·G. Supply of HFP was stopped when the amount of HFP reached 1.1 equivalents (17 g=110 mmol) to pyrazole, and stirring was continued at 100° C. Eight hours after starting of the stirring, the inside of the reaction system was brought to room temperature, followed by evacuation and distillation in such a state to obtain 19.2 g of distillate at 88° C./96 mmHg (yield: 88%).

According to a NMR analysis, it was confirmed that this product was 1-(1,1,2,3,3,3-hexafluoropropyl)pyrazole. To this crude reaction product was added 2.84 g (20 mmol) of ethyl trifluoroacetate, and yield by a $^{19}$F-NMR analysis based on ethyl trifluoroacetate was 91%.

$^{19}$F-NMR (CD$_3$COCD$_3$): δ−75.5 (3F), −83.8 (1F), −90.0 (1F), −214.2 (1F) ppm $^{1}$H-NMR (CD$_3$COCD$_3$): δ6.10 (1H, m), 6.26 (1H, m), 7.74 (2H, s) ppm Synthesis Example 9

Into a 50 ml autoclave was poured 6.91 g (100 mmol, melting point of 120° C.) of 1,2,4-triazole, and evacuation and replacement by nitrogen were carried out three times at room temperature. After the inside of a system was evacuated, hexafluoropropylene (HFP) was introduced until the inside pressure of the system reached 0.1 MPa·G. Then the temperature of the reaction system was increased to 135° C., and HFP was further introduced to maintain the inside pressure of the reaction system at 0.3 to 0.5 MPa·G. Supply of HFP was stopped when the amount of HFP reached 1.1 equivalents (17 g=110 mmol) to 1,2,4-triazole, and stirring was continued at 100° C. Eight hours after starting of the stirring, the inside of the reaction system was brought to room temperature, followed by evacuation and distillation in such a state to obtain 17.5 g of distillate at 90° C./90 mmHg (yield: 80%).

According to a NMR analysis, it was confirmed that this product was 1-(1,1,2,3,3,3-hexafluoropropyl)-1,2,4-triazole. To this crude reaction product was added 2.84 g (20 mmol) of ethyl trifluoroacetate, and yield by a $^{19}$F-NMR analysis based on ethyl trifluoroacetate was 87%.

$^{19}$F-NMR (CD$_3$COCD$_3$): δ−72.6 (3F), −88.9 (1F), −93.4 (1F), −211.4 (1F) ppm $^1$H-NMR (CD$_3$COCD$_3$): δ6.25 (1H, m), 8.09 (1H, s), 8.38 (1H, s) ppm Synthesis Example 10

Into a 50 ml autoclave were poured 8.21 g (100 mmol, melting point of 142° C.) of 2-methylimidazole and tetrahydrofuran (3.0 ml) as a melting point depressor, and evacuation and replacement by nitrogen were carried out three times at −78° C. After the inside of a system was evacuated, hexafluoropropylene (HFP) was introduced until the inside pressure of the system reached 0.1 MPa·G. Then the temperature of the reaction system was increased to 100° C., and HFP was further introduced to maintain the inside pressure of the reaction system at 0.3 to 0.5 MPa·G. Supply of HFP was stopped when the amount of HFP reached 1.1 equivalents (17 g=110 mmol) to 2-methylimidazole, and stirring was continued at 100° C. Eight hours after starting of the stirring, the inside of the reaction system was brought to room temperature, followed by evacuation and distillation in such a state to obtain 20.1 g of distillate at 78° C./24 mmHg (yield: 86%).

According to a NMR analysis, it was confirmed that this product was 2-methyl-1-(1,1,2,3,3,3-hexafluoropropyl)imidazole. To this crude reaction product was added 2.84 g (20 mmol) of ethyl trifluoroacetate, and yield by a $^{19}$F-NMR analysis based on ethyl trifluoroacetate was 96%.

$^{19}$F-NMR (CD$_3$COCD$_3$): δ−73.9 (3F), −84.4 (1F), −91.2 (1F), −210.0 (1F) ppm $^1$H-NMR (CD$_3$COCD$_3$): δ2.65 (3H, s), 6.26 (1H, m), 7.15 (1H, s), 7.50 (1H, s) ppm Synthesis Example 11

Into a 50 ml autoclave was poured 11.7 g (100 mmol, melting point of 52° C.) of indole, and evacuation and replacement by nitrogen were carried out three times at room temperature. After the inside of a system was evacuated, tetrafluoroethylene (TFE) was introduced until the inside pressure of the system reached 0.1 MPa·G. Then the temperature of the reaction system was increased to 60° C., and TFE was further introduced to maintain the inside pressure of the reaction system at 0.3 to 0.5 MPa·G. Supply of TFE was stopped when the amount of TFE reached 1.1 equivalents (11 g=110 mmol) to indole, and stirring was continued at 60° C. Eight hours after starting of the stirring, the inside of the reaction system was brought to room temperature, followed by evacuation and distillation in such a state to obtain 16.0 g of distillate at 77° C./8.0 mmHg (yield: 74%).

According to a NMR analysis, it was confirmed that this product was 1-(1,1,2,2-tetrafluoroethyl)indole. To this crude reaction product was added 2.84 g (20 mmol) of ethyl trifluoroacetate, and yield by a $^{19}$F-NMR analysis based on ethyl trifluoroacetate was 87%.

$^{19}$F-NMR (CD$_3$COCD$_3$): δ−98.1 (2F), −144.6 (2F) ppm $^1$H-NMR (CD$_3$COCD$_3$): δ6.23 (1H, m), 6.52 (1H, s), 7.00-7.30 (4H, m), 7.65 (1H, m) ppm Synthesis Example 12

Into a 50 ml autoclave were poured 12.0 g (100 mmol, melting point of 214° C.) of purine and tetrahydrofuran (3.0 ml) as a melting point depressor, and the inside of the autoclave was cooled to −78° C., and evacuation and replacement by nitrogen were carried out three times. After the inside of a system was evacuated, tetrafluoroethylene (TFE) was introduced as a melting point depressor until the inside pressure of the system reached 0.1 MPa·G. Then the temperature of the reaction system was increased to 120° C., and TFE was further introduced to maintain the inside pressure of the reaction system at 0.3 to 0.5 MPa·G. Supply of TFE was stopped when the amount of TFE reached 1.1 equivalents (11 g=110 mmol) to purine, and stirring was continued at 120° C. Eight hours after starting of the stirring, the inside of the reaction system was brought to room temperature and evacuated, followed by dissolution in ethanol and re-crystallization with hexane to obtain 13.6 g of a solid (yield: 62%).

According to a NMR analysis, it was confirmed that this product was 1-(1,1,2,2-tetrafluoroethyl)purine. To this crude reaction product was added 2.84 g (20 mmol) of ethyl trifluoroacetate, and yield by a $^{19}$F-NMR analysis based on ethyl trifluoroacetate was 77%.

$^{19}$F-NMR (CD$_3$COCD$_3$): δ−93.6 (2F), −140.9 (2F) ppm $^1$H-NMR (CD$_3$COCD$_3$): δ7.25 (1H, s), 8.70 (1H, s), 9.00 (1H, s), 9.21 (1H, s) ppm Synthesis Example 13

Into a 50 ml autoclave were poured 18.1 g (100 mmol, melting point of 274° C.) of theophylline which was a purine derivative, and tetrahydrofuran (5.0 ml) as a melting point depressor. The inside of the autoclave was cooled to −78° C.; and evacuation and replacement by nitrogen were carried out three times. After the inside of a system was evacuated, tetrafluoroethylene (TFE) was introduced until the inside pressure of the system reached 0.1 MPa·G. Then the temperature of the reaction system was increased to 120° C., and TFE was further introduced to maintain the inside pressure of the reaction system at 0.3 to 0.5 MPa·G. Supply of TFE was stopped when the amount of TFE reached 1.1 equivalents (11 g=110 mmol) to theophylline, and stirring was continued at 120° C. Eight hours after starting of the stirring, the inside of the reaction system was brought to room temperature and evacuated, followed by dissolution in ethanol and re-crystallization with hexane to obtain 14.5 g of a solid (yield: 52%).

According to a NMR analysis, it was confirmed that this product was 1-(1,1,2,2-tetrafluoroethyl)theophylline. To this crude reaction product was added 2.84 g (20 mmol) of ethyl trifluoroacetate, and yield by a $^{19}$F-NMR analysis based on ethyl trifluoroacetate was 81%.

$^{19}$F-NMR (DMSO-d$_6$): δ−95.8 (2F), −140.1 (2F) ppm

1H-NMR (DMSO-d$_6$): δ3.24 (3H, s), 3.44 (3H, s), 7.30 (1H, m), 7.98 (1H, s) ppm Synthesis Example 14

Into a 50 ml autoclave was poured 21.2 g (100 mmol, melting point of 83° C.) of N-(t-butoxycarbonyl)histamine which was an imidazole compound. The inside of the autoclave was cooled to −78° C., and evacuation and replacement by nitrogen were carried out three times. After the inside of a system was evacuated, tetrafluoroethylene (TFE) was introduced until the inside pressure of the system reached 0.1 MPa·G. Then the temperature of the reaction system was increased to 90° C., and TFE was further introduced to maintain the inside pressure of the reaction system at 0.3 to 0.5 MPa·G. Supply of TFE was stopped when the amount of TFE reached 1.1 equivalents (11 g=110 mmol) to N-(t-butoxycarbonyl)histamine, and stirring was continued at 90° C. Eight hours after starting of the stirring, the inside of the reaction system was brought to room temperature and evacuated, followed by dissolution in chloroform and re-crystallization with hexane to obtain 17.6 g of a solid (yield: 63%).

According to a NMR analysis, it was confirmed that this product was N-(t-butoxycarbony)-$N^1$-(1,1,2,2-tetrafluoroethyl)histamine. To this crude reaction product was added 2.84 g (20 mmol) of ethyl trifluoroacetate, and yield by a $^{19}$F-NMR analysis based on ethyl trifluoroacetate was 91%.

$^{19}$F-NMR (CD$_3$COCD$_3$): δ−100.4 (2F), −139.8 (2F) ppm
$^1$H-NMR (CD$_3$COCD$_3$): δ1.31 (9H, s), 2.70-3.10 (4H, m), 6.80 (1H, s), 7.27 (1H, m), 7.54 (1H, s) ppm Synthesis Example 15

Into a 50 ml autoclave were poured 31.8 g (100 mmol) of Nα-(t-butoxycarbonyl)tryptophan methyl ester which was an indole compound, and tetrahydrofuran (5.0 ml) as a melting point depressor. The inside of the autoclave was cooled to −78° C., and evacuation and replacement by nitrogen were carried out three times. After the inside of a system was evacuated, tetrafluoroethylene (TFE) was introduced until the inside pressure of the system reached 0.1 MPa·G. Then the temperature of the reaction system was increased to 120° C., and TFE was further introduced to maintain the inside pressure of the reaction system at 0.3 to 0.5 MPa·G. Supply of TFE was stopped when the amount of TFE reached 1.1 equivalents (11 g=110 mmol) to Nα-(t-butoxycarbonyl)tryptophan methyl ester, and stirring was continued at 120° C. Eight hours after starting of the stirring, the inside of the reaction system was brought to room temperature and evacuated, followed by refining of a crude reaction product as it was with a developing solvent of hexane and ethyl acetate of 4:1 by using silica gel chromatography to obtain 34.6 g of a product (yield: 82%).

According to a NMR analysis, it was confirmed that this product was Nα-(t-butoxycarbonyl)-$N^1$-(1,1,2,2-tetrafluoroethyl)tryptophan methyl ester. To this crude reaction product was added 2.84 g (20 mmol) of ethyl trifluoroacetate, and yield by a $^{19}$F-NMR analysis based on ethyl trifluoroacetate was 87%.

$^{19}$F-NMR (CD$_3$COCD$_3$): δ−102.4 (2F), −142.0 (2F) ppm
$^1$H-NMR (CD$_3$COCD$_3$): δ1.31 (9H, s), 2.80-3.80 (2H, m), 3.64 (3H, s), 6.50-7.80 (6H, m) ppm Synthesis Example 16

Into a 50 ml autoclave was poured 6.81 g (100 mmol) of imidazole, and evacuation and replacement by nitrogen were carried out three times at room temperature. After the inside of a system was evacuated, vinylidene fluoride was introduced until the inside pressure of the system reached 0.1 MPa·G. Then the temperature of the reaction system was increased to 100° C. which was not less than the melting point of imidazole, and perfluoro(methyl vinyl ether) (PMVE) was introduced to maintain the inside pressure of the reaction system at 0.3 to 0.5 MPa·G. Supply of vinylidene fluoride was stopped when the amount of vinylidene fluoride reached 1.1 equivalents (7.1 g=110 mmol) to imidazole, and stirring was continued at 100° C. Eight hours after starting of the stirring, the inside of the reaction system was brought to room temperature and evacuated, followed by distillation in such a state to obtain 11.9 g of distillate at 99° C. (yield: 90%).

According to a NMR analysis, it was confirmed that this product was 1-(1,1-difluoroethyl)imidazole. To this crude reaction product was added 2.84 g (20 mmol) of ethyl trifluoroacetate, and yield by a $^{19}$F-NMR analysis based on ethyl trifluoroacetate was 94%.

$^{19}$F-NMR (CD$_3$COCD$_3$): δ−93.2 (2F) ppm
$^1$H-NMR (CD$_3$COCD$_3$): δ1.96 (3H, t), 7.15 (1H, s), 7.46 (1H, s), 8.01 (1H, s) ppm Synthesis Example 17

Into a 50 ml autoclave was poured 6.81 g (100 mmol) of imidazole, and evacuation and replacement by nitrogen were carried out three times at room temperature. After the inside of a system was replaced by nitrogen gas atmosphere, the inside temperature of the autoclave was raised to 100° C. and 33.0 g (110 mmol) of perfluoro-2-methyl-2-pentene was introduced over one hour under pressurized nitrogen gas atmosphere. After stirring at 100° C. for eight hours, the inside of the reaction system was brought to room temperature and evacuated, followed by distillation in such a state to obtain 24.7 g of distillate at 76° C./4.0 mmHg (yield: 67%).

According to a NMR analysis, it was confirmed that this product was 1-(2H-perfluoro-1-ethyl-2-methylpropyl) imidazole. To this crude reaction product was added 2.84 g (20 mmol) of ethyl trifluoroacetate, and yield by a $^{19}$F-NMR analysis based on ethyl trifluoroacetate was 75%.

$^{19}$F-NMR (CD$_3$COCD$_3$): δ−72.9 (3F), −71.8 (3F), −78.9 (3F), −121.7 (2F), −139.7 (1F, m) ppm
$^1$H-NMR (CD$_3$COCD$_3$): δ3.86 (1H, m), 7.15 (1H, s), 7.46 (1H, s), 8.01 (1H, s) ppm Synthesis Example 18

Into a 50 ml autoclave was poured 6.81 g (100 mmol) of imidazole, and evacuation and replacement by nitrogen were carried out three times at room temperature. After the inside of a system was evacuated, perfluoro(methyl vinyl ether) (PMVE) was introduced until the inside pressure of the system reached 0.1 MPa·G. Then the temperature of the reaction system was increased to 100° C. which was not less than the melting point of imidazole, and PMVE was further introduced to maintain the inside pressure of the reaction system at 0.3 to 0.5 MPa·G. Supply of PMVE was stopped when the amount of PMVE reached 1.1 equivalents (18 g=110 mmol) to imidazole, and stirring was continued at 100° C. Eight hours after starting of the stirring, the inside of the reaction system was brought to room temperature and evacuated, followed by distillation in such a state to obtain 18.5 g of distillate at 76° C./83 mmHg (yield: 79%).

According to a NMR analysis, it was confirmed that this product was 1-(1,1,2-trifluoro-2-trifluoromethoxyethyl)imidazole. To this crude reaction product was added 2.84 g (20 mmol) of ethyl trifluoroacetate, and yield by a $^{19}$F-NMR analysis based on ethyl trifluoroacetate was 83%.

$^{19}$F-NMR (CD$_3$COCD$_3$): δ−58.6 (3F), −93.4 (1F), −95.0 (1F), −144.0 (1F) ppm
$^1$H-NMR (CD$_3$COCD$_3$): δ7.09 (1H, dt), 7.18 (1H, s), 7.49 (1H, s), 8.04 (1H, s) ppm Synthesis Example 19

Into a 50 ml three-necked flask was poured 6.81 g (100 mmol) of imidazole, and evacuation and replacement by nitrogen were carried out three times at room temperature. After the inside of a to system was replaced by nitrogen gas atmosphere, 43.2 g (100 mmol) of perfluoro vinyl ether:

$CF_2$=$CFOCF_2CF(CF_3)OC_3F_7$ (N2VE) was added dropwise at 90° C. over one hour. Then the inside temperature of the reaction system was increased to 100° C., and the stirring was continued. Eight hours after starting of the stirring, the inside of the reaction system was brought to room temperature, followed by distillation in such a state to obtain 40.0 g of distillate at 90° C./2.3 mmHg (yield: 80%).

According to a NMR analysis, it was confirmed that this product was 1-(2H-perfluoro-3,6-dioxa-5-methylnonyl)imidazole:

$$Im-CF_2CHFOCF_2CF(CF_3)OC_3F_7$$

wherein Im represents an imidazole ring. To this crude reaction product was added 2.84 g (20 mmol) of ethyl trifluoroacetate, and yield by a $^{19}$F-NMR analysis based on ethyl trifluoroacetate was 81%.

$^{19}$F-NMR (CD$_3$COCD$_3$): δ−78.5-1-81.5 (10F), −92.3-96.3 (2F), −128.7 (2F), −143.2 −144.0 (3F) ppm $^1$H-NMR (CD$_3$COCD$_3$): δ7.07-7.25 (1H, m), 7.17 (1H, s), 7.44 (1H, s), 7.99 (1H, s) ppm

Synthesis Example 20

Into a 50 ml three-necked flask was poured 6.81 g (100 mmol) of imidazole, and evacuation and replacement by nitrogen were carried out three times at room temperature. After the inside of a system was replaced by nitrogen gas atmosphere, 34.9 g (100 mmol) of fluoro vinyl ether:

$$CF_2=CFOCF_2CF_2CFClCF_2Cl$$

was added dropwise at 90° C. over one hour. Then the inside temperature of the reaction system was increased to 100° C., and the stirring was continued. Eight hours after starting of the stirring, the inside of the reaction system was brought to room temperature, followed by distillation in such a state to obtain 32.1 g of distillate at 83° C./3.4 mmHg (yield: 77%).

According to a NMR analysis, it was confirmed that this product was 1-(2H-perfluoro-6,7-dichloro-3-oxaheptyl)imidazole:

$$Im-CF_2CHFOCF_2CF_2CFClCF_2Cl,$$

wherein Im represents an imidazole ring. To this crude reaction product was added 2.84 g (20 mmol) of ethyl trifluoroacetate, and yield by a $^{19}$F-NMR analysis based on ethyl trifluoroacetate was 80%.

$^{19}$F-NMR (CD$_3$COCD$_3$): δ−63.7 (2F), −82.2 (2F), −93.8 (1F), −95.4 (1F), −117.3 (2F), −130.8 (1F), −145.7 (1F) ppm $^1$H-NMR (CD$_3$COCD$_3$): δ6.73 (1H, dt, J=52.8, 5.0 Hz), 7.19 (1H, s), 7.48 (1H, s), 8.04 (1H, s) ppm

Synthesis Example 21

Into a 50 ml three-necked flask were poured 6.83 g (100 mmol) of zinc and dioxane (20 g), followed by activation with dibromoethane under nitrogen gas atmosphere. The inside temperature of a system was increased to 100° C., and 20.9 g (50 mmol) of 1-(2H-perfluoro-6,7-dichloro-3-oxaheptyl)imidazole:

$$Im-CF_2CHFOCF_2CF_2CFClCF_2Cl,$$

wherein Im represents an imidazole ring, was added dropwise over thirty minutes. After stirring at 100° C. for eight hours, the inside of the reaction system was brought to room temperature, followed by filtration of a reaction solution with sellaite and distillation in such a state to obtain 12.3 g of distillate at 76° C./11 mmHg (yield: 71%).

According to a NMR analysis, it was confirmed that this product was 1-(2H-perfluoro-3-oxa-6-heptenyl)imidazole:

$$Im-CF_2CHFOCF_2CF_2CF=CF_2$$

wherein Im represents an imidazole ring.

$^{19}$F-NMR (CD$_3$COCD$_3$): δ−80.9 (2F), −91.8 (1F), −93.1 (1F), −95.5 (1F), −107.4 (1F), −121.6 (2F), −143.5 (1F), −190.8 (1F) ppm $^1$H-NMR (CD$_3$COCD$_3$): δ6.59 (1H, dt, J=52.2, 5.0 Hz), 7.20 (1H, s), 7.46 (1H, s), 8.02 (1H, s) ppm

Synthesis Example 22

Into a 50 ml three-necked flask was poured 6.81 g (100 mmol) of imidazole, and evacuation and replacement by nitrogen were carried out three times at room temperature. After the inside of a system was replaced by nitrogen gas atmosphere, 35.6 g (100 mmol) of fluoro vinyl ether:

$$CF_2=CFCF_2CF_2OCF(CF_3)COOCH_3$$

was added dropwise at 90° C. over one hour. Then the inside temperature of the reaction system was increased to 100° C., and stirring was continued. Eight hours after starting of the stirring, the inside of the reaction system was brought to room temperature and evacuated, followed by refining of a crude reaction product as it was with a developing solvent of hexane and ethyl acetate of 10:1 by using silica gel chromatography to obtain 37.7 g of a product (yield: 89%).

According to a NMR analysis, it was confirmed that this product was methyl 7-(1-imidazolyl)-6H-perfluoro-2-methyl-3-oxaheptanoate:

$$Im-CF_2CHFCF_2CF_2OCF(CF_3)COOCH_3,$$

wherein Im represents an imidazole ring. To this crude reaction product was added 2.84 g (20 mmol) of ethyl trifluoroacetate, and yield by a $^{19}$F-NMR analysis based on ethyl trifluoroacetate was 90%.

$^{19}$F-NMR (CD$_3$COCD$_3$): δ−72.8 (2F), −82.4 (3F), −87.4 (1F), −93.4 (1F), −114.3 (2F), −133.0 (1F), −207.8 (1F) ppm $^1$H-NMR (CD$_3$COCD$_3$): δ4.38 (1H, s), 6.32 (1H, m), 7.19 (1H, s), 7.52 (1H, s), 8.09 (1H, s) ppm

Synthesis Example 23

Into a 100 ml three-necked flask were poured 21.2 g (50 mmol) of methyl 7-(1-imidazolyl)-6H-perfluoro-2-methyl-3-oxaheptanoate and 50 g of methanol, and thereto was added dropwise 50 ml of 1N aqueous solution of sodium hydroxide, followed by stirring at room temperature for 24 hours. Then after evacuating the inside of a system and removing the solvent, the inside temperature was elevated to 60° C., followed by 24-hour drying to obtain a solid of carboxylic acid salt.

Into a 50 ml three-necked flask equipped with a distillation column were poured the carboxylic acid salt and 20 g of tetraglyme. The inside temperature was increased to 200° C. under reduced pressure of 30 mmHg, and a produced liquid was taken out. The obtained crude reaction product was subjected to distillation as it was, and 7.61 g of distillate at 71° C./12 mmHg was obtained (yield: 44%).

According to a NMR analysis, it was confirmed that this product was 1-(2H-perfluoro-5-oxa-6-heptenyl)imidazole:

$$Im-CF_2CHFCF_2CF_2OCF=CF_2$$

wherein Im represents an imidazole ring.

$^{19}$F-NMR (CD$_3$COCD$_3$): δ−76.4 (2F), −86.2 (1F), −92.0 (1F), −112.9 (1F), −115.6 (2F), −121.2 (1F), −135.8 (1F), −210.8 (1F) ppm $^1$H-NMR (CD$_3$COCD$_3$): δ6.25 (1H, m), 7.19 (1H, s), 7.52 (1H, s), 8.03 (1H, s) ppm

Synthesis Example 24

Into a 50 ml three-necked flask was poured 6.81 g (100 mmol) of imidazole, and evacuation and replacement by nitrogen were carried out three times at room temperature. After the inside of a system was replaced by nitrogen gas atmosphere, 35.8 g (100 mmol) of fluoro vinyl ether:

was added dropwise at 90° C. over one hour. Then the inside temperature of the reaction system was increased to 100° C., and stirring was continued. Eight hours after starting of the stirring, the inside of the reaction system was brought to room temperature, followed by distillation in such a state to obtain 33.2 g of distillate at 90° C./2.6 mmHg (yield: 78%).

According to a NMR analysis, it was confirmed that this product was 1-(2H,9H,9H-perfluoro-3,6-dioxa-5-methyl-8-nonenyl)imidazole:

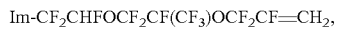

wherein Im represents an imidazole ring. To this crude reaction product was added 2.84 g (20 mmol) of ethyl trifluoroacetate, and yield by a $^{19}$F-NMR analysis based on ethyl trifluoroacetate was 81%.

$^{19}$F-NMR (CD$_3$COCD$_3$): δ−72.2 (2F), −78.3 (3F), −82.4 −84.5 (2F), −92.0 −94.5 (2F), −123.5 (1F), −143.2 (1F), −144.4 (1F) ppm $^{1}$H-NMR (CD$_3$COCD$_3$): δ5.34-5.59 (2H, m), 7.05-7.20 pH, m), 7.16 (1H, s), 7.43 (1H, s), 8.00 (1H, s) ppm Synthesis Example 25

Into a 50 ml autoclave was poured 6.81 g (100 mmol) of imidazole, and evacuation and replacement by nitrogen were carried out three times at room temperature. After the inside of a system was replaced by nitrogen gas atmosphere, the inside temperature was elevated to 100° C., and 12.5 g (45 mmol) of perfluorobutenyl vinyl ether:

$$CF_2{=}CFOCF_2CF_2CF{=}CF_2$$

was added dropwise over one hour under pressurized nitrogen gas atmosphere. Then after stirring at 100° C. for eight hours, the inside of the reaction system was brought to room temperature, followed by refining of a crude reaction product as it was with a developing solvent of hexane and ethyl acetate of 6:1 by using silica gel chromatography to obtain 14.0 g of a product (yield based on perfluorobutenyl vinyl ether: 75%).

According to a NMR analysis, it was confirmed that this product was 2-(1-imidazolyl)-1,2,2-trifluoroethyl=4-(1-imidazolyl)-1,1,2,2,3,4,4-heptafluorobutyl=ether:

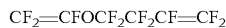

wherein Im represents an imidazole ring. To this crude reaction product was added 2.84 g (20 mmol) of ethyl trifluoroacetate, and yield by a $^{19}$F-NMR analysis based on ethyl trifluoroacetate was 78%.

$^{19}$F-NMR (CD$_3$COCD$_3$): δ−82.2 (2F), −86.4 (1F), −90.4 (1F), −92.5 (1F), −96.4 (1F), −118 (2F), −138.0 (1F), −203.9 (1F) ppm $^{1}$H-NMR (CD$_3$COCD$_3$): δ6.05-6.26 (1H, m), 6.98-7.09 (1H, m), 7.18 (1H, s), 7.50 (1H, s), 8.06 (1H, s) ppm Synthesis Example 26

Into a 100 ml three-necked flask was poured 6.81 g (100 mmol) of imidazole, and evacuation and replacement by nitrogen were carried out three times at room temperature. After the inside of a system was replaced by nitrogen gas atmosphere, the inside temperature was elevated to 90° C., and a solution prepared by adding 50 ml of diglyme to 59.0 g (100 mmol) of tetrafluoroethylene oligomer:

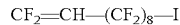

was added dropwise over one hour. After completion of the addition, the temperature of the reaction system was elevated to 100° C. and stirring was continued. Eight hours after starting of the stirring, the inside of the reaction system was brought to room temperature. The crude reaction product was subjected to refining as it was with a developing solvent of hexane and ethyl acetate of 8:1 by using silica gel chromatography to obtain 56.1 g of a product (yield: 85%).

According to a NMR analysis, it was confirmed that this product was 1-(2H,2H-perfluoro-10-iododecyl)imidazole:

Im-CF$_2$CH$_2$—(CF$_2$)$_8$—I, wherein Im represents an imidazole ring. To this crude reaction product was added 2.84 g (20 mmol) of ethyl trifluoroacetate, and yield by a $^{19}$F-NMR analysis based on ethyl trifluoroacetate was 79%.

$^{19}$F-NMR (CD$_3$COCD$_3$): δ−54.6 (2F), −94.2 (2F), −114.5 (2F), −122.0 (2F), −122.3 (4F), −123.2 (2F), −124.2 (2F), −126.7 (2F) ppm $^{1}$H-NMR (CD$_3$COCD$_3$): δ4.32 (2H, m), 7.20 (1H, s), 7.46 (1H, s), 8.02 (1H, s) ppm Synthesis Example 27

Into a 100 ml three-necked flask was poured 7.49 g (110 mmol) of imidazole, and evacuation and replacement by nitrogen were carried out three times at room temperature. After the inside of a system was replaced by nitrogen gas atmosphere, the inside temperature was elevated to 90° C., and a solution prepared by adding 50 ml of diglyme to 31.3 g (50 mmol) of tetrafluoroethylene oligomer:

was added dropwise over one hour. After completion of the addition, the temperature of the reaction system was elevated to 100° C., and stirring was continued. Eight hours after starting of the stirring, the inside of the reaction system was brought to room temperature. The crude reaction product was subjected to refining as it was with a developing solvent of hexane and ethyl acetate of 3:1 by using silica gel chromatography to obtain 23.6 g of a product (yield based on a diene compound: 71%).

According to a NMR analysis, it was confirmed that this product was 1,12-bis(1-imidazolyl)-2H,2H,11H,11H-perfluorododecane:

Im-CF$_2$CH$_2$—(CF$_2$)$_8$—CH$_2$CF$_2$-Im, wherein Im represents an imidazole ring. To this crude reaction product was added 2.84 g (20 mmol) of ethyl trifluoroacetate, and yield by a $^{19}$F-NMR analysis based on ethyl trifluoroacetate was 68%.

$^{19}$F-NMR (CD$_3$COCD$_3$): δ−92.9 (4F), −119.4 (4F), −122.7 (4F), −123.7 (4F), −124.2 (4F) ppm $^{1}$H-NMR (CD$_3$COCD$_3$): δ4.28 (4H, m), 7.22 (2H, s), 7.46 (2H, s), 8.01 (2H, s) ppm Synthesis Example 28

Into a 30 ml three-necked flask was poured 5.00 g (29.7 mmol) of 1-(1,1,2,2-tetrafluoroethyl)imidazole synthesized in Synthesis Example 1, and thereto was added dropwise 1.10 equivalents (5.36 g=32.7 mmol) of methyl trifluoromethane-sulfonate (Me-OTf) on ice bath at a temperature not exceeding 30° C. under nitrogen gas atmosphere. After completion of the addition, stirring was continued in such a state for one hour, and then a 6-hour reaction was continued at room temperature. Thereafter the inside of the system was evacuated and the inside temperature was elevated to 100° C., followed by 6-hour drying to obtain 9.31 g of a product (yield: 94%).

According to a NMR analysis, it was confirmed that this product was 1-methyl-3-(1,1,2,2-tetrafluoroethyl)imidazolium trifluoromethanesulfonate. The obtained product was a solid at room temperature.

$^{19}$F-NMR (CD$_3$COCD$_3$): δ−77.6 (3F), −98.7 (2F), −136.4 (2F) ppm $^1$H-NMR (CD$_3$COCD$_3$): δ4.21 (3H, s), 7.06 (1H, tt), 8.09 (1H, s), 8.19 (1H, s), 9.83 (1H, s) ppm

Synthesis Example 29

8.49 g of 1-(1,1,2,3,3,3-hexafluoropropyl)-3-methylimidazolium trifluoromethanesulfonate was prepared (yield: 97° A)) in the same manner as in Synthesis Example 28 except that 5.00 g (22.9 mmol) of 1-(1,1,2,3,3,3-hexafluoropropyl) imidazole synthesized in Synthesis Example 6 was used instead of 1-(1,1,2,2-tetrafluoroethyl)imidazole. The obtained product was a solid at room temperature.

$^{19}$F-NMR (CD$_3$COCD$_3$): δ−73.4 (3F), −74.5 (3F), −87.7 (1F), −93.5 (1F), −210.0 (1F) ppm $^1$H-NMR (CD$_3$COCD$_3$): δ4.24 (3H, s), 6.52 (1H, m), 8.09 (1H, s), 8.26 (1H, s), 9.82 (1H, s) ppm

Synthesis Example 30

8.31 g of 1-methyl-3-(1,1,2-trifluoro-2-trifluoromethoxyethyl) imidazolium trifluoromethanesulfonate was prepared (yield: 98%) in the same manner as in Synthesis Example 28 except that 5.00 g (21.4 mmol) of 1-(1,1,2-trifluoro-2-trifluoromethoxyethyl)imidazole synthesized in Synthesis Example 18 was used instead of 1-(1,1,2,2-tetrafluoroethyl) imidazole. The obtained product was a solid at room temperature.

$^{19}$F-NMR (CD$_3$COCD$_3$): δ−58.5 (3F), −77.1 (3F), −95.9 (1F), −97.8 (1F), −144.1 (1F) ppm $^1$H-NMR (CD$_3$COCD$_3$): δ4.21 (3H, s), 7.30 (1H, d), 8.08 (1H, s), 8.20 (1H, s), 9.77 (1H, s) ppm

Synthesis Example 31

6.38 g of 1-methyl-3-(2H-perfluoro-3,6-dioxa-5-methylnonyl)imidazolium trifluoromethanesulfonate was prepared (yield: 96%) in the same manner as in Synthesis Example 28 except that 5.00 g (10.0 mmol) of 1-(2H-perfluoro-3,6-dioxa-5-methylnonyl)imidazole synthesized in Synthesis Example 19 was used instead of 1-(1,1,2,2-tetrafluoroethyl)imidazole. The obtained product was a highly viscous liquid at room temperature.

$^{19}$F-NMR (CD$_3$COCD$_3$): δ−78.5 −81.5 (13F), −92.3 −96.3 (2F), −128.0 (2F), −143.2 −144.0 (3F) ppm $^1$H-NMR (CD$_3$COCD$_3$): δ7.48 (1H, dd), 8.11 (1H, s), 8.18 (1H, s), 9.82 (1H, s) ppm

Synthesis Example 32

6.83 g of 1-methyl-3-(2H-perfluoro-6,7-dichloro-3-oxaheptyl)imidazolium trifluoromethanesulfonate was prepared (yield: 98%) in the same manner as in Synthesis Example 28 except that 5.00 g (12.0 mmol) of 1-(2H-perfluoro-6,7-dichloro-3-oxaheptyl)imidazole synthesized in Synthesis Example 20 was used instead of 1-(1,1,2,2-tetrafluoroethyl) imidazole. The obtained product was a solid at room temperature.

$^{19}$F-NMR (CD$_3$COCD$_3$): δ−73.4 (3F), −62.3 (2F), −80.0 (2F)-92.2 (1F), −94.6 (1F), −115.9 (2F), −128.7 (1F), −145.3 (1F) ppm $^1$H-NMR (CD$_3$COCD$_3$): δ4.21 (3H, s), 7.01 (1H, dt), 7.19 (1H, s), 7.48 (1H, s), 8.04 (1H, s), 8.10 (1H, s), 8.21 (1H, s), 9.80 (1H, s) ppm

Synthesis Example 33

6.84 g of 1-methyl-3-(2H-perfluoro-3-oxa-6-heptenyl) imidazolium trifluoromethanesulfonate was prepared (yield: 93%) in the same manner as in Synthesis Example 28 except that 5.00 g (14.4 mmol) of 1-(2H-perfluoro-3-oxa-6-heptenyl)imidazole synthesized in Synthesis Example 21 was used instead of 1-(1,1,2,2-tetrafluoroethyl)imidazole. The obtained product was a solid at room temperature.

$^{19}$F-NMR (CD$_3$COCD$_3$): δ−76.1 (3F), −79.4 (2F), −90.2 (1F), −92.3 (1F), −94.2 (1F), −106.9 (1F), −120.2 (2F), −143.3 (1F), −190.7 (1F) ppm $^1$H-NMR (CD$_3$COCD$_3$): δ4.18 (3H, s), 6.36 (1H, dt), 8.10 (1H, s), 8.21 (1H, s), 9.80 (1H, s) ppm

Synthesis Example 34

6.89 g of 1-methyl-3-(2H-perfluoro-5-oxa-6-heptenyl) imidazolium trifluoromethanesulfonate was prepared (yield: 94%) in the same manner as in Synthesis Example 28 except that 5.00 g (14.4 mmol) of 1-(2H-perfluoro-5-oxa-6-heptenyl)imidazole synthesized in Synthesis Example 23 was used instead of 1-(1,1,2,2-tetrafluoroethyl)imidazole. The obtained product was a solid at room temperature.

$^{19}$F-NMR (CD$_3$COCD$_3$): δ−74.5 (311, −77.8 (2F), −83.7 (1F), −90.9 (1F), −111.2 (1F), −115.0 (2F), −120.9 (1F), −135.7 (1F), −211.2 (1F) ppm $^1$H-NMR (CD$_3$COCD$_3$): δ4.20 (3H, s), 6.41 (1H, m), 8.08 (1H, s), 8.19 (1H, s), 9.71 (1H, s) ppm.

Synthesis Example 35

6.56 g of 1-methyl-3-(2H,9H,9H-perfluoro-3,6-dioxa-5-methyl-8-nonenyl)imidazolium trifluoromethanesulfonate was prepared (yield: 95%) in the same manner as in Synthesis Example 28 except that 5.00 g (11.7 mmol) of 1-(2H,9H,9H-perfluoro-3,6-dioxa-5-methyl-8-nonenyl)imidazole: Im-CF$_2$CHFOCF$_2$CF(CF$_3$)OCF$_2$CF=CH$_2$ synthesized in Synthesis Example 24 was used instead of 1-(1,1,2,2-tetrafluoroethyl)imidazole. The obtained product was a highly viscous liquid at room temperature.

$^{19}$F-NMR (CD$_3$COCD$_3$): δ−72.2 (2F), −77.5 (3F), −78.8 (3F), −82.9 (2F), −95.2 (1F), −99.1 (1F), −123.7 (1F), −143.3 (1F), −144.3 (1F) ppm $^1$H-NMR (CD$_3$COCD$_3$): δ4.21 (3H, s), 5.42-5.61 (2H, m), 7.36-7.58 (1H, m), 8.12 (1H, s), 8.17 (1H, s), 9.83 (1H, s) ppm

Synthesis Example 36

5.35 g of 1-methyl-3-(2H,2H-perfluoro-10-iododecyl)imidazolium trifluoromethanesulfonate was prepared (yield: 86%) in the same manner as in Synthesis Example 28 except that 5.00 g (7.60 mmol) of 1-(2H,2H-perfluoro-10-iododecyl)imidazole synthesized in Synthesis Example 26 was used instead of 1-(1,1,2,2-tetrafluoroethyl)imidazole and THF was used as a solvent. The obtained product was a solid at room temperature.

$^{19}$F-NMR (CD$_3$COCD$_3$): δ−54.8 (2F), −74.1 (3F), −94.3 (2F), −114.4 (2F), −121.9 (2F), −122.3 (4F), −123.2 (2F), −123.9 (2F), −126.8 (2F) ppm $^1$H-NMR (CD$_3$COCD$_3$): δ4.21 (3H, s), 4.48 (2H, m), 8.10 (1H, s), 8.22 (1H, s), 9.79 (1H, s) ppm Synthesis Example 37

Preparation was carried out in the same manner as in Synthesis Example 28 except that 5.00 g (7.55 mmol) of 1,12-bis (1-imidazolyl)-2H,2H,11H,11H-perfluorododecane synthesized in Synthesis Example 27 was used instead of 1-(1,1,2,2-tetrafluoroethyl)imidazole, THF was used as a solvent, and 2.2 equivalents of methyl trifluoromethanesulfonate was used. Thus 6.89 g of a compound, in which the first position and the twelfth position of 2H,2H,11H,11H-perfluorotetradecane had been replaced by 1-methylimidazolium trifluoromethanesulfonate, was prepared (yield: 92%). The obtained product was a solid at room temperature.

$^{19}$F-NMR (CD$_3$COCD$_3$): δ−74.8 (6F), −90.8 (4F), −119.3 (4F), −122.5 (4F), −123.7 (4F), −124.3 (4F) ppm $^1$H-NMR (CD$_3$COCD$_3$): δ4.20 (6H, s), 4.53 (4H, m), 8.11 (2H, s), 8.27 (2H, s), 9.77 (2H, s) ppm Synthesis Example 38

Into a 50 ml three-necked autoclave were poured 10.0 g (59.4 mmol) of 1-(1,1,2,2-tetrafluoroethyl)imidazole prepared in Synthesis Example 1 and 20 ml of dichloromethane, and evacuation and replacement by nitrogen were carried out three times on dry ice/acetone bath. After the inside of a system was evacuated, 8.46 g (89.2 mmol) of methyl bromide was added thereto. After completion of the addition, a 6-hour reaction was continued at 60° C. Then the inside of the system was evacuated and the inside temperature was elevated to 100° C., followed by 6-hour drying to obtain 13.7 g of a product (yield: 88%). The obtained product was a solid at room temperature.

According to a NMR analysis, it was confirmed that this product was 1-methyl-3-(1,1,2,2-tetrafluoroethyl)imidazolium bromide.

$^{19}$F-NMR (CD$_3$COCD$_3$): δ−96.5 (2F), −134.1 (2F) ppm $^1$H-NMR (CD$_3$COCD$_3$): δ4.17 (3H, s), 7.04 (1H, a), 8.10 (1H, s), 8.21 (1H, s), 9.80 (1H, s) ppm Synthesis Example 39

Into a 50 ml three-necked autoclave were poured 10.0 g (45.9 mmol) of 1-(1,1,2,3,3,3-hexafluoropropyl)imidazole prepared in Synthesis Example 6 and 20 ml of dichloromethane, and evacuation and replacement by nitrogen were carried out three times on dry ice/acetone bath. After the inside of a system was evacuated, 6.53 g (68.8 mmol) of methyl bromide was added thereto. After completion of the addition, a 6-hour reaction was continued at 60° C. Then the inside of the system was evacuated and the inside temperature was elevated to 100° C., followed by 6-hour drying to obtain 12.9 g of a product (yield: 90%). The obtained product was a solid at room temperature.

According to a NMR analysis, it was confirmed that this product was 1-(1,1,2,3,3,3-hexafluoropropyl)-3-methylimidazolium bromide.

$^{19}$F-NMR (CD$_3$COCD$_3$): δ−75.1 (3F), −88.9 (1F), −92.0 (1F), −210.3 (1F) ppm $^1$H-NMR (CD$_3$COCD$_3$): δ6.51 (1H, m), 8.12 (1H, s), 8.27 (1H, s), 9.91 (1H, s) ppm Synthesis Example 40

Into a 50 ml two-necked flask were poured 2.50 g (9.50 mmol) of 1-methyl-3-(1,1,2,2-tetrafluoroethyl)imidazolium bromide synthesized in Synthesis Example 38 and 20 ml of dichloromethane, and thereto was added dropwise a solution prepared by dissolving 6.60 g (9.50 mmol) of silver carboxylate containing perfluoro polyether:

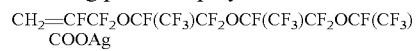

in 20 ml of dichloromethane. After completion of the addition, stirring was continued for one hour in such a state, and then the reaction solution was filtrated with sellaite and the temperature was elevated to 80° C. under reduced pressure, followed by 6-hour drying to obtain 7.17 g of a product (yield: 98%). The obtained product was a highly viscous liquid at room temperature.

According to a NMR analysis, it was confirmed that this product was 1-methyl-3-(1,1,2,2-tetrafluoroethyl)imidazolium 12H,12H-perfluoro-2,5,8-trimethyl-3,6,9-trioxa-11-dodecenoate.

$^{19}$F-NMR (CD$_3$COCD$_3$): δ−72.6 (2F), −87.5 −85.0 (13F), −96.5 (2F), −113.6 (1F), −123.2 (1F), −133.5 (2F), −144.3 (2F) ppm $^1$H-NMR (CD$_3$COCD$_3$): δ4.21 (3H, s), 5.42-5.62 (2H, m), 7.10 (1H, tt), 8.10 (1H, s), 8.19 (1H, s), 10.00 (1H, s) ppm Synthesis Example 41

5.88 g of 1-methyl-3-(1,1,2,2-tetrafluoroethyl)imidazolium perfluoro-3,6-dioxa-4-methyl-7-heptenesulfonate was prepared (yield: 99%) in the same manner as in Synthesis Example 40 by using 2.50 g (9.50 mmol) of 1-methyl-3-(1,1,2,2-tetrafluoroethyl)imidazolium bromide and 20 ml of dichloromethane except that 5.23 g (9.50 mmol) of silver sulfonate containing perfluoro polyether:

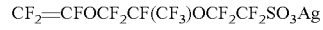

was used. The obtained product was a highly viscous liquid at room temperature.

$^{19}$F-NMR (CD$_3$COCD$_3$): δ−80.0 −87.0 (7F), −95.5 (2F), −113.3 (2F), −114.2 (1F), −122.8 (1F), −133.9 (2F), −136.8 (1F), −146.0 (1F) ppm $^1$H-NMR (CD$_3$COCD$_3$): δ4.18 (3H, s), 7.11 (1H, tt), 8.10 (1H, s), 8.20 (1H, s), 9.91 (1H, s) ppm Synthesis Example 42

Into a 50 ml two-necked flask were poured 1.71 g of poly (sodium methacrylate):

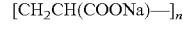

(weight average molecular weight: 6,500) and 20 ml of water, and thereto was added dropwise 5.00 g (19.0 mmol) of 1-methyl-3-(1,1,2,2-tetrafluoroethyl) imidazolium bromide. After completion of the addition, a polymer was precipitated. The precipitated polymer was washed with water, followed by 8-hour vacuum drying at 60° C. to obtain 5.02 g of a polymer.

According to a NMR analysis, it was confirmed that this polymer was poly[1-methyl-3-(1,1,2,2-tetrafluoroethyl)imidazolium methacrylate].

$^{19}$F-NMR (CD$_3$COCD$_3$): δ−94.8 (2F), −134.7 (2F) ppm $^1$H-NMR (CD$_3$COCD$_3$): δ1.30-1.55 (3H), 1.95-2.45 (2H), 3.97 (3H), 6.95-7.00 (1H), 8.10 (1H, s), 8.20 (1H), 10.0 (1H) ppm Synthesis Example 43

Into a 50 ml two-necked flask were poured 6.18 g (10.5 mmol) of carboxylic acid containing perfluoro polyether:

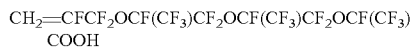

and 20 ml of tetrahydrofuran, and thereto was added dropwise 1.95 g (11.6 mmol) of 1-(1,1,2,2-tetrafluoroethyl)imidazole. After completion of the addition, one-hour stirring was continued in such a state, and then the temperature was elevated to 80° C. under reduced pressure, followed by 6-hour drying to obtain 7.77 g of a product (yield based on carboxylic acid: 98%). The obtained product was a highly viscous liquid at room temperature.

According to a NMR analysis, it was confirmed that this product was 1-(1,1,2,2-tetrafluoroethyl)imidazolium 12H,12H-perfluoro-2,5,8-trimethyl-3,6,9-trioxa-11-dodecenoate.

$^{19}$F-NMR (CD$_3$COCD$_3$): δ–72.4 (2F), 87.5-85.0 (13F), –96.2 (2F), –113.8 (1F), –122.9 (1F), –133.2 (2F), –143.6 (2F) ppm $^{1}$H-NMR (CD$_3$COCD$_3$): δ1.60 (1H), 5.42-5.62 (2H, m), 6.99 (1H, m), 8.10 (1H, s), 8.20 (1H, s), 9.82 (1H, s) ppm

Synthesis Example 44

6.31 g of 1-(1,1,2,2-tetrafluoroethyl)imidazolium perfluoro-3,6-dioxa-4-methyl-7-heptenesulfonate was prepared (yield: 98%) in the same manner as in Synthesis Example 42 by using 4.66 g (10.5 mmol) of sulfonic acid containing perfluoro polyether:

and 1.95 g (11.6 mmol) of 1-(1,1,2,2-tetrafluoroethyl)imidazole. The obtained product was a highly viscous liquid at room temperature.

$^{19}$F-NMR (CD$_3$COCD$_3$): δ–80.0-87.0 (7F), –94.9 (2F), –113.0 (2F), –113.9 (1F), –122.9 (1F), –133.6 (2F), –137.2 (1F), –145:0 (1F) ppm $^{1}$H-NMR (CD$_3$COCD$_3$): δ1.60 (1H), 7.07 (1H, tt), 8.08 (1H, s), 8.21 (1H, s), 9.79 (1H, s) ppm

Synthesis Example 45

7.61 g of a polymer was prepared in the same manner as in Synthesis Example 42 except that 20 ml of acetone was used as a solvent instead of water, and 3.87 g of poly(4-styrenesulfonic acid):

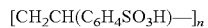

(MW: 70,000) and 3.90 g (23.2 mmol) of 1-(1,1,2,2-tetrafluoroethyl)imidazole were used.

According to a NMR analysis, it was confirmed that the obtained product was poly[1-(1,1,2,2-tetrafluoroethyl)imidazolium 4-styrenesulfonate] having the polymer side chain converted to imidazolium cation (yield: 98%).

$^{19}$F-NMR (CD$_3$COCD$_3$): δ–94.8 (2F), –134.7 (2F) ppm
$^{1}$H-NMR (CD$_3$COCD$_3$): δ1.40-1.60 (2H), 1.80-2.25 (2H), 6.30-7.10 (5H), 8.12 (1H, s), 8.22 (1H), 10.0 (1H) ppm

Synthesis Example 46

Into a 50 ml two-necked flask were poured 3.19 g (10.2 mmol) of 1-(1,1,2,3,3,3-hexafluoropropyl)-3-methylimidazolium bromide and 20 ml of dichloromethane, and thereto was added dropwise a solution prepared by dissolving 2.08 g (10.7 mmol) of silver tetrafluoroborate in 20 ml of dichloromethane. After completion of the addition, stirring was continued for one hour in such a state, and then the reaction solution was filtrated with sellaite and the temperature was elevated to 100° C. under reduced pressure, followed by 6-hour drying to obtain 3.10 g of a product (yield: 95%). The obtained product was a highly viscous liquid at room temperature.

According to a NMR analysis, it was confirmed that this product was 1-(1,1,2,3,3,3-hexafluoropropyl)-3-methylimidazolium tetrafluoroborate subjected to anion exchange of bromine with tetrafluoroboric acid.

$^{19}$F-NMR (CD$_3$COCD$_3$): δ–77.0 (3F), –87.8 (1F), –91.2 (1F), –150.0 (4F), –209.8 (1F) ppm
$^{1}$H-NMR (CD$_3$COCD$_3$): δ6.62 (1H, m), 8.09 (1H, s), 8.24 (1H, s), 9.79 (1H, s) ppm

Synthesis Example 47

Preparation was carried out in the same manner as in Synthesis Example 46 by using 3.19 g (10.2 mmol) of 1-(1,1,2,3,3,3-hexafluoropropyl)-3-methylimidazolium bromide except that 2.70 g (10.7 mmol) of silver hexafluorophosphate was used. Thus 3.70 g of 1-methyl-3-(1,1,2,3,3,3-hexafluoropropyl)imidazolium hexafluorophosphate subjected to anion exchange of bromine with hexafluorophosphoric acid was prepared (yield: 96%). The obtained product was a highly viscous liquid at room temperature.

$^{19}$F-NMR (CD$_3$COCD$_3$): δ–61.6 (6F), –73.6 (3F), –86.9 (1F), –94.6 (1F), –210.3 (1F) ppm
$^{1}$H-NMR (CD$_3$COCD$_3$): δ6.56 (1H, m), 8.10 (1H, s), 8.26 (1H, s), 9.88 (1H, s) ppm

Synthesis Example 48

Into a 50 ml two-necked flask were poured 3.19 g (10.2 mmol) of 1-(1,2,3,3,3-hexafluoropropyl)-3-methylimidazolium bromide and 20 ml of water, and thereto was added dropwise 3.50 g (12.2 mmol) of lithium bis(trifluoromethanesulfonyl)imide. Then the temperature inside a system was increased to 70° C., followed by 6-hour stirring. After the inside of the system was brought to room temperature, an organic layer was separated, followed by extraction with chloroform three times, drying with magnesium sulfate, removal of chloroform under reduced pressure, elevation of the inside temperature to 100° C. under reduced pressure, and then 6-hour drying. Thereby 4.70 g of a product was obtained (yield: 89%). The obtained product was a liquid at room temperature.

According to a NMR analysis, it was confirmed that this product was 1-(1,1,2,3,3,3-hexafluoropropyl)-3-methylimidazolium bis(trifluoromethanesulfonyl)imide subjected to anion exchange of bromine with bis(trifluoromethanesulfonyl)imidic acid.

$^{19}$F-NMR (CD$_3$COCD$_3$): δ–73.1 (3F), –79.0 (6F), –87.3 (1F), –93.3 (1F), –209.4 (1F) ppm
$^{1}$H-NMR (CD$_3$COCD$_3$): δ4.26 (3H, s), 6.78 (1H, m), 8.09 (1H, s), 8.25 (1H, s), 9.99 (1H, s) ppm

Synthesis Example 49

5.32 g of 1-(1,1,2,3,3,3-hexafluoropropyl)-3-methylimidazolium bis(pentafluoroethanesulfonyl)imide subjected to anion exchange of bromine with bis(pentafluoromethanesulfonyl)imidic acid was prepared (yield: 85%) in the same manner as in Synthesis Example 48 by using 3.19 (10.2 mmol) of 1-(1,1,2,3,3,3-hexafluoropropyl)-3-methylimidazolium bromide except that 4.93 g (12.2 mmol) of sodium bis(pentafluoroethanesulfonyl)imide was used. The obtained product was a highly viscous liquid at room temperature.

$^{19}$F-NMR (CD$_3$COCD$_3$): δ–74.2 (3F), –81.3 (6F), –87.3 (1F), –93.3 (1F), –123.1 (2F), –125.2 (2F), –209.4 (1F) ppm $^1$H-NMR (CD$_3$COCD$_3$): δ4.23 (3H, s), 6.79 (1H, m), 8.10 (1H, s), 8.26 (1H, s), 10.2 (1H, s) ppm Synthesis Example 50

5.40 g of 1-(1,1,2,3,3,3-hexafluoropropyl)-3-methylimidazolium tris(trifluoromethanesulfonyl)methide subjected to anion exchange of bromine with tris(trifluoromethanesulfonyl)carbonic acid was prepared (yield: 82%) in the same manner as in Synthesis Example 48 by using 3.19 (10.2 mmol) of 1-(1,1,2,3,3,3-hexafluoropropyl)-3-methylimidazolium bromide except that 5.10 g (12.2 mmol) of lithium tris(trifluoromethanesulfonyl)methide was used. The obtained product was a highly viscous liquid at room temperature.

$^{19}$F-NMR (CD$_3$COCD$_3$): δ−73.0 (3F), −78.5 (9F), −87.4 (1F), −91.7 (1F), −210.2 (1F) ppm
$^1$H-NMR (CD$_3$COCD$_3$): δ4.20 (3H, s), 6.79 (1H, m), 8.09 (1H, s), 8.24 (1H, s), 9.96 (1H, s) ppm Synthesis Example 51

2.47 g of 1-(1,1,2,3,3,3-hexafluoropropyl)-3-methylimidazolium dicyanamide subjected to anion exchange of bromine with dicyanimidic acid was prepared (yield: 81%) in the same manner as in Synthesis Example 48 by using 3.19 g (10.2 mmol) of 1-(1,1,2,3,3,3-hexafluoropropyl)-3-methylimidazolium bromide except that 1.09 g (12.2 mmol) of sodium dicyanimidate was used. The obtained product was a solid.

$^{19}$F-NMR (CD$_3$COCD$_3$): δ−74.4 (3F), −89.2 (1F), −94.1 (1F), −209.7 (1F) ppm
$^1$H-NMR (CD$_3$COCD$_3$): δ4.19 (3H, s), 6.81 (1H, m), 8.11 (1H, s), 8.23 (1H, s), 10.02 (1H, s) ppm Synthesis Example 52

3.55 g of 1-(1,1,2,3,3,3-hexafluoropropyl)-3-methylimidazolium hexafluoroacetylacetonate subjected to anion exchange of bromine with hexafluoroacetylacetonate was prepared (yield: 79%) in the same manner as in Synthesis Example 48 by using 3.19 g (10.2 mmol) of 1-(1,1,2,3,3,3-hexafluoropropyl)-3-methylimidazolium bromide except that 2.61 g (12.2 mmol) of lithium hexafluoroacetylacetonate was used. The obtained product was a highly viscous liquid.

$^{19}$F-NMR (CD$_3$COCD$_3$): δ−73.8 (3F), −77.4 (6F), −86.8 (1F), −92.6 (1F), −209.6 (1F) ppm
$^1$H-NMR (CD$_3$COCD$_3$): δ4.23 (3H, s), 6.40 (1H, s), 6.84 (1H, m), 8.09 (1H, s), 8.24 (1H, s), 9.80 (1H, s) ppm Synthesis Example 53

Into a 100 ml four-necked glass flask equipped with a stirrer and a thermometer were poured 9H,9H-perfluoro-3,6-dioxa-5-methylnonane-1,8-diene CH$_2$=CFCF$_2$OCF(CF$_3$)CF$_2$OCF=CF$_2$ (16.9 g) and 8.5 g of 8.0% by weight perfluorohexane solution of di(7H-perfluoroheptanoyl)peroxide: [H—(CF$_2$CF$_2$)$_3$COO]$_2$, and after sufficiently replacing the inside of the flask with nitrogen, stirring was carried out at 30° C. for five hours in a nitrogen gas stream, and a highly viscous solid was produced. The obtained solid was dissolved in acetone, and the solid dissolved in acetone was poured into hexane, followed by separation and vacuum drying to obtain 14.8 g of a colorless transparent polymer. According to $^{19}$F-NMR analysis, $^1$H-NMR analysis and IR analysis, it was confirmed that this polymer was a homopolymer of 9H,9H-perfluoro-3,6-dioxa-5-methylnonane-1,8-diene:

CH$_2$=CFCF$_2$OCF(CF$_3$)CF$_2$OCF=CF$_2$ polymer having —CF$_2$=CF$_2$ group in its side chain. A number average molecular weight measured by GPC analysis using tetrahydrofuran (THF) as a solvent was 11,000, and a weight average molecular weight was 13,000.

Example 1

Into a 100 ml three-necked flask were poured 1.36 g (20 mmol) of imidazole and 25 ml of diglyme, and evacuation and replacement by nitrogen were carried out three times at room temperature. After the inside of a system was replaced by nitrogen gas atmosphere, the inside temperature was elevated to 60° C., and a solution prepared by adding 25 ml of diglyme to 15.0 g of vinylidene fluoride polymer:

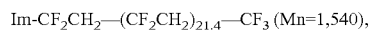

(Mn=1,500, —CH=CF$_2$ end: 63% by Mole) was added dropwise over one hour. After completion of the addition, stirring of the reaction system was continued at 60° C. Eight hours after starting of the stirring, the inside of the reaction system was brought to room temperature. The reaction solution was poured into hexane, and a precipitate was filtrated and subjected to vacuum drying at 60° C. to obtain 13.6 g of a polymer.

According to a NMR analysis, it was confirmed that —CH=CF$_2$ end ($^{19}$F-NMR: δ−72 −73 ppm (—CH=CF$_2$), $^1$H-NMR: δ4.7 ppm (—CH=CF$_2$)) had been completely consumed and this polymer was a vinylidene fluoride polymer having an imidazolyl group:

Im-CF$_2$CH$_2$—(CF$_2$CH$_2$)$_{21.4}$—CF$_3$ (Mn=1,540), wherein Im represents an imidazole ring.

$^{19}$F-NMR (CD$_3$COCD$_3$): δ−60.4, −90 −115, −95.9 ppm
$^1$H-NMR (CD$_3$COCD$_3$); δ2.70-4.00, 7.20, 7.45, 8.00 ppm Example 2

Into a 100 ml three-necked flask were poured 2.72 g (40 mmol) of imidazole and 25 ml of diglyme, and evacuation and replacement by nitrogen were carried out three times at room temperature. After the inside of a system was replaced by nitrogen gas atmosphere, the inside temperature was elevated to 60° C., and a solution prepared by adding 25 ml of diglyme to 17.0 g of vinylidene fluoride/hexafluoropropylene/tetrafluoroethylene copolymer:

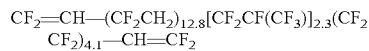

(Mn=1,700, —CH=CF$_2$ end: 79% by mole) was added dropwise over one hour. After completion of the addition, stirring of the system was continued at 60° C. Eight hours after starting of the stirring, the inside of the reaction system was brought to room temperature. The reaction solution was poured into hexane, and a precipitate was filtrated and subjected to vacuum drying at 60° C. to obtain 16.3 g of a polymer.

According to a NMR analysis, it was confirmed that —CH=CF$_2$ end ($^{19}$F-NMR: δ−72 −73 ppm (—CH=CF$_2$), $^1$H-NMR: 4.7 ppm (—CH=CF$_2$)) had been completely consumed and this polymer was a vinylidene fluoride/hexafluoropropylene/tetrafluoroethylene copolymer having an imidazolyl group:

(Mn=1,800),
wherein Im represents an imidazole ring.

$^{19}$F-NMR (CD$_3$COCD$_3$): δ −70.2, −90.0 −95.0, −96.2, −108.0 −115.0, −120.0 −123.0, −182.0, ppm
$^1$H-NMR (CD$_3$COCD$_3$); δ2.70-4.00, 7.20, 7.45, 8.00 ppm Example 3

Into a 100 ml four-necked glass flask equipped with a stirrer and a thermometer were poured 1.90 g of imidazole and 25 ml of diglyme, and evacuation and replacement by nitrogen were carried out three times at room temperature. After the inside of a system was replaced by nitrogen gas atmosphere, the inside temperature was elevated to 60° C., and a solution prepared by adding 25 ml of diglyme to a polymer (10.0 g) having —CF$_2$=CF$_2$ end:

was added dropwise over one hour. After completion of the addition, stirring of the reaction system was continued at 60° C. Eight hours after starting of the stirring, the inside of the reaction system was brought to room temperature. The reaction solution was poured into hexane, and a precipitate was filtrated and subjected to vacuum drying at 60° C. to obtain 11.2 g of a polymer. According to $^{19}$F-NMR analysis, $^1$H-NMR analysis and IR analysis, it was confirmed that the side chain of this polymer was an imidazoyl group. A number average molecular weight measured by GPC analysis using dimethylformamide (DMF) as a solvent was 12,000, and a weight average molecular weight was 14,000.

Example 4

5.20 g of vinylidene fluoride polymer (Mn=1,630) containing 1-methylimidazolium trifluoromethanesulfonate was prepared in the same manner as in Synthesis Example 28 except that 5.00 g of a vinylidene fluoride polymer (Mn=1,540) containing an end imidazolyl group of 63% by mole synthesized in Example 1 was used instead of 1-(1,1,2,2-tetrafluoroethyl)imidazole and THF was used as a solvent. The obtained product was a solid at room temperature.
$^{19}$F-NMR (CD$_3$COCD$_3$): δ −60.6, −75.3, −89.0 −115.0, −98.9 ppm
$^1$H-NMR (CD$_3$COCD$_3$): δ2.70-4.00, 4.20, 4.81, 8.08, 8.26, 9.82 ppm Example 5

5.63 g of vinylidene fluoride/hexafluoropropylene/tetrafluoroethylene copolymer (Mn=2,050) containing 1-methylimidazolium trifluoromethanesulfonate at both polymer ends was prepared in the same manner as in Synthesis Example 28 except that 5.00 g of a vinylidene fluoride/hexafluoropropylene/tetrafluoroethylene copolymer (Mn=1,800) containing an end imidazolyl group of 79% by mole synthesized in Example 2 was used instead of 1-(1,1,2,2-tetrafluoroethyl)imidazole and THF was used as a solvent. The obtained product was a solid at room temperature.
$^{19}$F-NMR (CD$_3$COCD$_3$): δ −70.3, −73.8, −90 −95, −96, −108.0 −115.0, −120 −123, −182.0 ppm
$^1$H-NMR (CD$_3$COCD$_3$): δ2.70-4.00, 4.20, 4.79, 8.10, 8.25, 9.77 ppm Example 6

Into a 100 ml four-necked glass flask equipped with a stirrer and a thermometer were poured 1-methyl-3-(2H,9H,9H-perfluoro-3,6-dioxa-5-methyl-8-nonenyl)-imidazolium trifluoromethanesulfonate: CH$_2$=CFCF$_2$OCF(CF$_3$)CF$_2$OCHFCF$_2$-Im$^+$-Me.CF$_3$SO$_3^-$ (27.9 g) and 8.5 g of 8.0% by weight perfluorohexane solution of di(7H-perfluoroheptanoyl)peroxide: [H—(CF$_2$CF$_2$)$_3$COO]$_2$, and after sufficiently replacing the inside of the flask with nitrogen, stirring was carried out at 30° C. for five hours in a nitrogen gas stream, and a highly viscous solid was produced. The obtained solid was dissolved in acetone, and the solid dissolved in acetone was poured into hexane, followed by separation and vacuum drying to obtain 23.0 g of a colorless transparent polymer. According to $^{19}$F-NMR analysis, $^1$H-NMR analysis and IR analysis, it was confirmed that this polymer was a homopolymer of 1-methyl-3-(2H,9H,9H-perfluoro-3,6-dioxa-5-methyl-8-nonenyl)-imidazolium trifluoromethanesulfonate: CH$_2$=CFCF$_2$OCF(CF$_3$)CF$_2$OCHFCF$_2$-Im$^+$-Me.CF$_3$SO$_3$. A number average molecular weight measured by GPC analysis using dimethylformamide (DMF) as a solvent was 13,000, and a weight average molecular weight was 17,000.

Example 7

Into a 100 ml four-necked glass flask equipped with a stirrer and a thermometer were poured a homopolymer (10.0 g) of 1-(2H,9H,9H-perfluoro-3,6-dioxa-5-methyl-8-nonenyl)-imidazole: CH$_2$=CFCF$_2$OCF(CF$_3$)CF$_2$OCHFCF$_2$-Im of Example 3 and 30 ml of THF, and thereto was added dropwise methyl trifluoromethanesulfonate (4.62 g) on ice bath. After completion of the addition, stirring was continued at 25° C. over five hours in a nitrogen gas stream. The obtained solid was dissolved in acetone, and the solid dissolved in acetone was poured into hexane, followed by separation and vacuum drying to obtain 13.3 g of a colorless transparent polymer. According to $^{19}$F-NMR analysis, $^1$H-NMR analysis and IR analysis, it was confirmed that the side chain of the polymer was a methylimidazolium trifluoromethanesulfonate. A number average molecular weight measured by GPC analysis using dimethylformamide (DMF) as a solvent was 12,000, and a weight average molecular weight was 15,000.

INDUSTRIAL APPLICABILITY

According to the present invention, there can be provided an ionic group-containing fluorine-containing polymer usable as various materials comprising heteroaromatic ring compounds with a stable fluorine-containing heteroaromatic ring and having various functions, for example, solid or gel polymer electrolytes for fuel cell, secondary battery, capacitor, dye-sensitized solar cell and electrochromic device; electrochemical actuator element; reaction media having complex forming action and/or stabilizing action in chemical reactions; catalyst for chemical reactions; separating agent in gas separation and liquid separation; ion exchanging membrane; coating agent having sterilizing action and/or antistatic action; coating agent and ion exchange membrane for small parts for improving dispersibility and/or electrophoretic mobility of natural or synthetic fiber, woven fabric, knitted fabric, fleece, net, mat, film or sheet comprising or natural or synthetic fiber, and further there can be provided a fluorine-containing polymer having heteroaromatic ring useful as a starting material for the ionic group-containing fluorine-containing polymer or as a curing agent.

The invention claimed is:

1. A fluorine-containing polymer having a heteroaromatic ring which has a number average molecular weight of from 500 to 1,000,000 and is represented by the formula (1):

  (1)

in which the structural unit M is a structural unit derived from a fluorine-containing ethylenic monomer and represented by the formula (M):

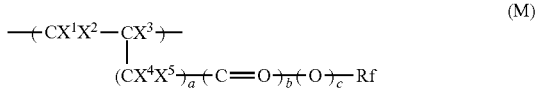  (M)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group, in which —Y (Y is:

where

is a moiety forming a heteroaromatic ring together with at least one nitrogen atom, and the whole or a part of its hydrogen atoms may be replaced by the same or different organic groups) is directly bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit N is a structural unit derived from a monomer copolymerizable with the fluorine-containing ethylenic monomer providing the structural unit M, and the structural unit M and the structural unit N are contained in amounts of from 0.1 to 100% by mole and from 0 to 99.9% by mole, respectively.

2. The fluorine-containing polymer of claim 1, wherein said —Y is:

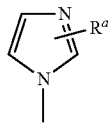

wherein $R^a$s are the same or different, and each is halogen atom, a functional group or an organic group and may be present or may not be present, and when $R^a$s are present, the whole or a part of hydrogen atoms of the heteroaromatic ring are substituted by them.

3. The fluorine-containing polymer of claim 1, wherein said —Y is bonded to a trunk chain and/or an end of a side chain of Rf.

4. The fluorine-containing polymer of claim 1, wherein said structural unit M is a structural unit M1 derived from a fluorine-containing ethylenic monomer and represented by the formula (M1):

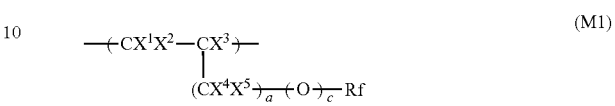  (M1)

wherein $X^1$, $X^2$, $X^3$, $X^4$, $X^5$, Rf, a and c are as defined in the formula (M).

5. The fluorine-containing polymer of claim 1, wherein said structural unit M is a structural unit M2 derived from a fluorine-containing ethylenic monomer and represented by the formula (M2):

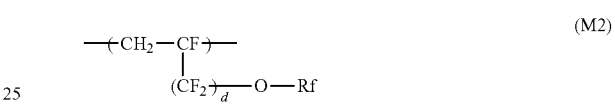  (M2)

wherein Rf is as defined in the formula (M); d is an integer of 1 to 3.

6. The fluorine-containing polymer of claim 1, wherein said structural unit M is a structural unit M3 derived from a fluorine-containing ethylenic monomer and represented by the formula (M3):

  (M3)

wherein Rf is as defined in the formula (M).

7. The fluorine-containing polymer of claim 1, wherein said structural unit M is a structural unit M4 derived from a fluorine-containing ethylenic monomer and represented by the formula (M4):

  (M4)

wherein Rf is as defined in the formula (M).

8. The fluorine-containing polymer of claim 1, wherein said structural unit M is a structural unit M5 derived from a fluorine-containing ethylenic monomer and represented by the formula (M5):

  (M5)

wherein Rf is as defined in the formula (M); e is 0 or 1.

* * * * *